US012482255B1

(12) United States Patent
Azad et al.

(10) Patent No.: US 12,482,255 B1
(45) Date of Patent: Nov. 25, 2025

(54) ACTIVITY-BASED PERSON IDENTIFICATION USING BIOMETRIC DISENTANGLEMENT

(71) Applicant: University of Central Florida Research Foundation, Inc., Orlando, FL (US)

(72) Inventors: Shehreen Azad, Orlando, FL (US); Yogesh Singh Rawat, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 19/242,011

(22) Filed: Jun. 18, 2025

Related U.S. Application Data

(60) Provisional application No. 63/685,014, filed on Aug. 20, 2024.

(51) Int. Cl.
*G06V 10/82* (2022.01)
*G06F 18/24* (2023.01)
(Continued)

(52) U.S. Cl.
CPC .............. *G06V 10/82* (2022.01); *G06F 18/24* (2023.01); *G06N 3/08* (2013.01); *G06V 10/74* (2022.01);
(Continued)

(58) Field of Classification Search
CPC .... G06V 10/82; G06V 10/7715; G06V 20/46; G06V 40/20
See application file for complete search history.

(56) References Cited

U.S. PATENT DOCUMENTS

2019/0311099 A1* 10/2019 Baldwin .............. G06N 3/0464

OTHER PUBLICATIONS

P. K. Sarker, Q. Zhao and M. K. Uddin, "Transformer-Based Person Re-Identification: A Comprehensive Review," in IEEE Transactions on Intelligent Vehicles, vol. 9, No. 7, pp. 5222-5239, Jul. 2024, doi: 10.1109/TIV.2024.3350669. (Year: 2024).*

(Continued)

*Primary Examiner* — Ross Varndell
(74) *Attorney, Agent, or Firm* — Anton J. Hopen; Smith & Hopen, P. A.

(57) ABSTRACT

A system and method for person identification from video data by disentangling biometric identity features from non-biometric appearance and activity features are disclosed. The system processes RGB video sequences depicting individuals performing various activities to extract spatio-temporal features. These features are separated into distinct biometric identity representations and non-biometric features related to appearance and performed activities. To achieve this separation and minimize appearance bias, the system utilizes an auxiliary supervisory model. At least two implementations of this supervisory model are disclosed: one using semantic supervision via structured embeddings processed through a vision-language model, and another employing silhouette-based feature distillation from a silhouette-trained neural network. Joint training for biometric identification and activity classification ensures accurate identification of individuals independently of facial visibility, clothing differences, or activity variations.

13 Claims, 25 Drawing Sheets

(51) Int. Cl.
*G06N 3/08* (2023.01)
*G06V 10/74* (2022.01)
*G06V 10/77* (2022.01)
*G06V 20/40* (2022.01)
*G06V 40/20* (2022.01)

(52) U.S. Cl.
CPC .......... *G06V 10/7715* (2022.01); *G06V 20/46* (2022.01); *G06V 40/20* (2022.01)

(56) References Cited

OTHER PUBLICATIONS

Fernando, Tharindu, et al. "Using Auxiliary Information for Person Re-Identification—A Tutorial Overview." arXiv preprint arXiv:2211. 08565 (2022). (Year: 2022).*

Wang, Tao, et al. "Pose-guided feature disentangling for occluded person re-identification based on transformer." Proceedings of the AAAI conference on artificial intelligence. Vol. 36. No. 3. 2022. (Year: 2022).*

Azad, Shehreen, and Yogesh Singh Rawat. "Activity-biometrics: Person identification from daily activities." Proceedings of the IEEE/CVF Conference on Computer Vision and Pattern Recognition. 2024. (Year: 2024).*

Li, Junnan, et al. "Blip-2: Bootstrapping language-image pre-training with frozen image encoders and large language models." International conference on machine learning. PMLR, 2023. (Year: 2023).*

\* cited by examiner

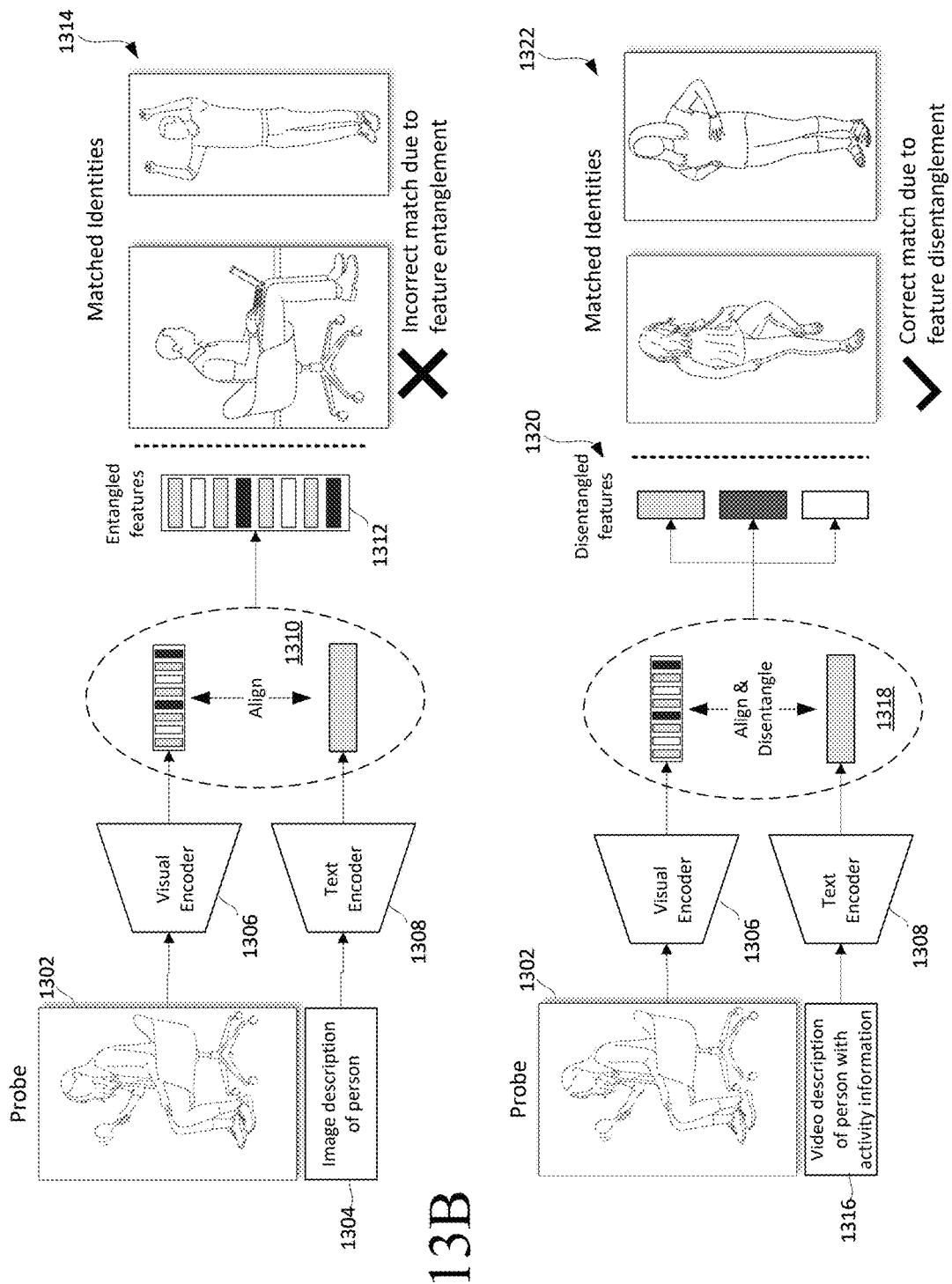

Fig. 17
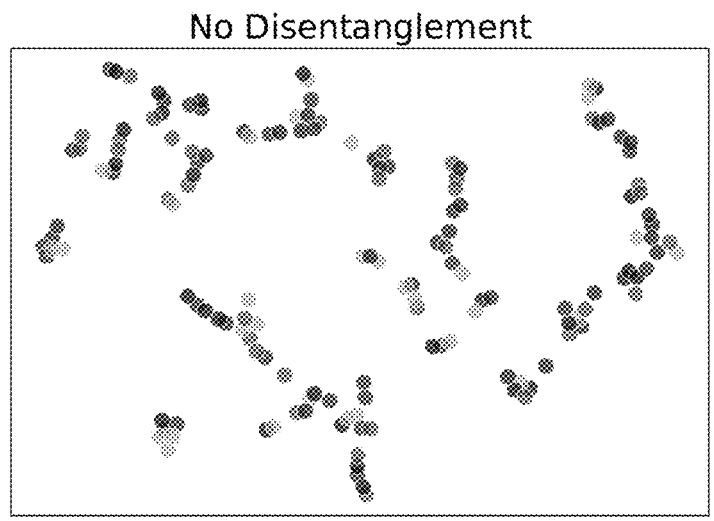
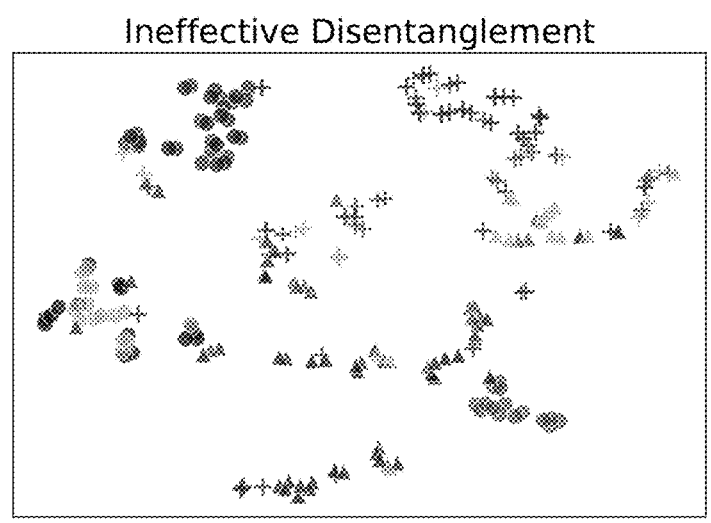
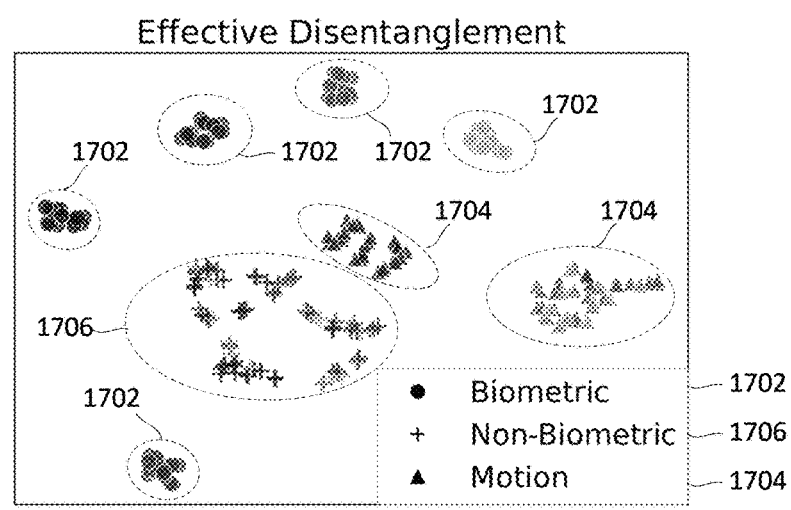

Biometrics: A lean-built person with upright posture, arms raised above head and legs slightly bent. — 2002

Motion: Performing the action of "cheer up" by raising both arms enthusiastically while slightly lifting off ground. — 2004

Non-Biometrics: A black long-sleeved shirt and black pants with dark sneakers. — 2006

Biometrics: A medium-built person with upright posture, standing with one hand raised to the side of the neck. — 2102

Motion: Performing the action of "neck pain" by placing one hand on the neck while slightly tilting the head to one side. — 2104

Non-Biometrics: A yellow graphic t-shirt and dark shorts with sports shoes with orange accents. — 2106

ACTIVITY-BASED PERSON IDENTIFICATION USING BIOMETRIC DISENTANGLEMENT

PRIORITY INFORMATION

This nonprovisional application is a continuation of and claims priority to Provisional Application No. 63/685,014, entitled "Activity-Based Person Identification Using Biometric Disentanglement," filed Aug. 20, 2024.

GOVERNMENT INTEREST

This invention was made with Government support under Grant No. 2022-21102100001 awarded by the Intelligence Advanced Research Projects Activity (IARPA) and Grant No. 2331319 awarded by the National Science Foundation (NSF). The Government has certain rights in the invention.

BACKGROUND OF THE INVENTION

1. Field of the Invention

The described embodiments relate generally to person identification through video analysis. Specifically, the described embodiments relate to systems and methods for identifying individuals based on their biometric and non-biometric features captured during daily activities, using techniques including bias-less distillation and bias learning.

2. Brief Description of the Related Art

In the field of person identification, traditional methods predominantly rely on facial recognition techniques. These techniques have seen significant advancements and are widely used in security, surveillance, and various authentication systems. However, face recognition systems encounter substantial limitations in scenarios where the face is not visible, such as when individuals are at long distances, wearing masks, or facing away from the camera.

To address the limitations of facial recognition, whole-body identification methods have been explored. These methods typically focus on gait recognition, which analyzes the walking patterns of individuals to identify them. Gait recognition has proven to be effective in certain controlled environments but often relies on silhouette-based approaches that capture the shape and movement of the body. Some recent advancements have incorporated RGB frames to enhance the recognition process, yet these approaches remain largely confined to analyzing walking patterns.

Existing whole-body identification methods are primarily image-based and do not sufficiently address the complexities of identifying individuals engaged in various daily activities beyond walking. Real-world scenarios often require identifying individuals performing diverse actions such as sitting, bending, or interacting with objects. These activities present additional challenges due to the presence of appearance biases, such as variations in clothing, background, and lighting conditions, which can significantly affect the accuracy of identification.

While video-based methods for person identification have been developed, they are still in their infancy compared to image-based methods. The current video-based approaches often aggregate frame features using techniques like Long Short-Term Memory (LSTM) networks or employ 3D Convolutional Neural Networks (3D CNNs) to capture spatio-temporal features. However, these methods are typically focused on specific activities, mainly walking, and do not effectively handle the broad range of daily activities that individuals may perform.

There is a need for systems and methods that can robustly identify individuals based on their biometric and non-biometric features while performing a wide variety of daily activities. Such systems must be capable of disentangling biometric features (such as body shape and movement) from non-biometric features (such as clothing and background) to ensure accurate and reliable identification across different scenarios and conditions.

BRIEF SUMMARY OF THE INVENTION

This invention introduces a novel approach to identifying individuals from video data based on their daily activities, specifically addressing scenarios where facial recognition is ineffective due to factors such as distance, occlusion, masks, or uncooperative subjects. The invention utilizes both biometric features, such as gait patterns or body shapes, and non-biometric features, including clothing or background elements, extracted from input RGB video sequences.

The invention first receives a training video sequence of a person performing an activity and, for each frame, applies a segmentation algorithm—implemented as background-subtraction or transformer-based segmentation—to isolate a binary silhouette mask so that clothing, texture, and background are removed.

The resulting silhouette sequence is supplied to a bias-less silhouette teacher neural network that has been pre-trained on human-silhouette data to recognize identity from gait or body shape, thereby producing first appearance-invariant biometric features. In parallel the original video sequence, and an augmented version created by applying an elastic or other geometric distortion that alters body shape or pose while preserving appearance attributes, are fed to a student biometric feature-extraction network that outputs second features.

Those second features are decomposed into (i) a biometric representation and (ii) an appearance representation. Training iteratively updates student parameters by: (a) minimizing a divergence-based knowledge-distillation loss between the teacher's first features and the student's second features; (b) minimizing an identity-classification loss and a metric-learning loss that pull embeddings of the same person together and push different-person embeddings apart; (c) minimizing an activity-classification loss generated by an activity-recognition head operating on the second features; and (d) minimizing a contrastive bias-separation loss that pulls together a positive pair formed by the biometric representations of the original and distorted sequences, while pushing apart a negative pair formed by the appearance representation of the original sequence and the biometric representation of the distorted sequence, thereby encouraging strict separation of intrinsic biometric information from appearance-induced cues.

A dedicated bias feature-extraction network derives the appearance-bias embedding used in that contrastive objective. Optimization continues until the student network produces biometric identity embeddings that are invariant to appearance changes and robust across different activities. During inference the trained student alone—without the silhouette masks or teacher—extracts the biometric embedding from an input video and compares it with gallery references to identify the person. A corresponding system comprises one or more processors and memory storing instructions that implement silhouette generation, teacher inference, student inference, distillation-loss computation, activity classification, bias-separation learning, identity and metric losses, and iterative parameter updates during training, while disabling the silhouette branch for inference.

A second aspect employs a multimodal pipeline in which training data consist of video samples labelled with person identity and activity. Frames are encoded by an image encoder and compressed by a query-transformer module (Q-Former) containing multiple learnable query vectors into a set of query embeddings. The query vectors are partitioned into a first subset dedicated to identity cues and a second subset dedicated to activity cues. The embeddings enter a vision-language model, e.g., BLIP, CLIP, Flamingo, or combinations thereof, comprising an image-feature encoder and a language model, which simultaneously outputs (i) an activity feature representation, optionally expressed as a natural-language description or as a vector in a joint visual-text embedding space, and (ii) a biometric feature representation of the person that is distinct from the activity representation. Training optimizes: (a) an identity loss formed by a classification term over known identities and/or a metric-learning term that clusters same-person embeddings; (b) an activity loss realized as classification, captioning, or text-contrastive alignment between the activity representation and the ground-truth activity label; and (c) a disentanglement loss or adversarial regularization that penalizes mutual information or predictive power between the two representations so the activity vector cannot infer identity and the biometric vector cannot infer activity.

Auxiliary regularization guarantees minimal informational overlap between the identity-specific and activity-specific query subsets. After convergence, inference proceeds by passing an input video through the image encoder, Q-Former, and vision-language model to extract a biometric embedding that remains stable regardless of the subject's activity; that embedding is then compared against biometric references stored in a database to recognize the person. A hardware system embodiment provides processors, memory, and data storage configured to execute video reception, feature extraction, query generation, multimodal processing, dual-branch optimization, disentanglement regularization, and database matching, while ensuring that the activity representation cannot be used to predict identity and the biometric representation cannot be used to predict activity.

Moreover, the invention includes a non-transitory computer-readable medium storing executable instructions, enabling processors to implement this method of video-based, activity-informed, bias-resilient biometric identification.

BRIEF DESCRIPTION OF THE DRAWINGS

For a fuller understanding of the invention, reference should be made to the following detailed description, taken in connection with the accompanying drawings, in which:

FIG. 13A is a diagrammatic view of existing multimodal person identification.

FIG. 13B is a diagrammatic view of an embodiment of the present invention relating to feature disentanglement.

FIG. 17 illustrates the effectiveness of the DisenQ mechanism on feature disentanglement using a visualization such as a t-SNE clustering plot. In this figure, features corresponding to identity-related biometrics, motion patterns, and non-biometric context form separate clusters, demonstrating that DisenQ separates these feature types in the embedding space.

Figure 1:
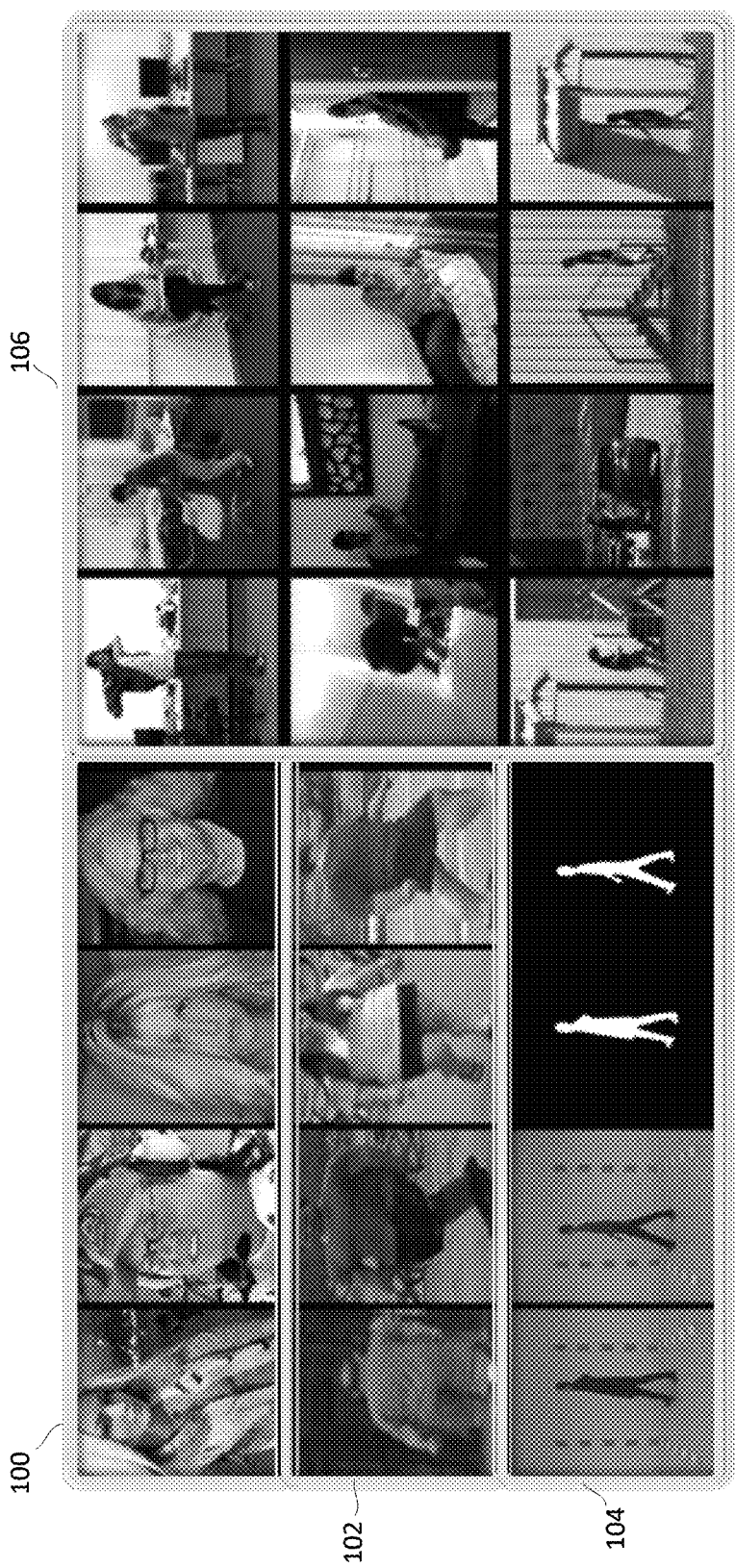
FIG. 1 shows various approaches for person identification, including photos of face recognition, whole body recognition, and gait recognition, as well as photos and computer-enhanced images from datasets used for studying person identification during daily activities.

| REFERENCE NUMERALS: | |
| --- | --- |
| 100 | face recognition samples |
| 102 | whole body recognition samples |
| 104 | gait recognition samples |
| 106 | daily activity samples |
| 202 | silhouette sequence |
| 204 | Input RGB video |
| 206 | distorted video |
| 208 | silhouette encoder |
| 210 | first video encoder |
| 212 | second video encoder |
| 214 | silhouette feature |
| 216 | spatio-temporal feature |
| 218 | activity head A |
| 220 | activity head B |
| 222 | distorted spatio-temporal feature |
| 224 | active head DB |
| 226 | activity dead DA |
| 228 | activity feature AC |
| 230 | actor feature BT |
| 232 | distorted actor feature DBT |
| 234 | distorted activity feature DAC |
| 236 | activity prior |
| 238 | biometric feature BB |
| 240 | appearance feature BA |
| 242 | distorted appearance feature DBB |
| 244 | distorted biometric feature DBA |
| 246 | activity loss AC |
| 248 | distillation loss KD |
| 250 | biometric loss BIO |
| 252 | distortion loss DIS |
| 302 | undistorted sample |
| 304 | biometric distorted sample |
| 402 | distortion amount $\alpha = 0$ |
| 404 | distortion amount $\alpha = 50$ |
| 406 | distortion amount $\alpha = 100$ |
| 408 | distortion amount $\alpha = 150$ |
| 410 | distortion amount $\alpha = 250$ |
| 412 | distortion amount $\alpha = 300$ |
| 414 | distortion amount $\alpha = 350$ |
| 602 | first inaccurate retrieval |
| 604 | second inaccurate retrieval |
| 606 | ABNet probes |
| 802 | distortion $\alpha = 0$ |
| 804 | distortion $\alpha = 50$ |
| 806 | distortion $\alpha = 100$ |
| 808 | distortion $\alpha = 150$ |
| 810 | distortion $\alpha = 200$ |
| 812 | distortion $\alpha = 250$ |
| 814 | distortion $\alpha = 300$ |
| 816 | distortion $\alpha = 0$ |
| 818 | distortion $\alpha = 50$ |
| 820 | distortion $\alpha = 100$ |
| 822 | distortion $\alpha = 150$ |
| 824 | distortion $\alpha = 200$ |

| | REFERENCE NUMERALS: |
|---|---|
| 826 | distortion α = 250 |
| 828 | distortion α = 300 |
| 902 | distortion α = 200 |
| 904 | distortion α = 225 |
| 906 | distortion α = 250 |
| 908 | distortion α = 275 |
| 910 | distortion α = 300 |
| 912 | distortion α = 325 |
| 914 | distortion α = 350 |
| 1002 | hue shifting for NTU RGB-AB |
| 1004 | hue shifting for PKKU MMD-AB |
| 1006 | hue shifting for Charades-AB |
| 1008 | hue shifting for ACC-MM1-AB |
| 1202 | inaccurate retrievals |
| 1302 | probe |
| 1304 | image description of person |
| 1306 | visual encoder |
| 1308 | text encoder |
| 1310 | alignment |
| 1312 | entangled features |
| 1314 | mismatched identities |
| 1316 | video description of person with activity information |
| 1318 | align and disentangle |
| 1320 | disentangled features |
| 1322 | matched identities due to feature disentanglement |
| 1402 | first model action |
| 1404 | second model action |
| 1406 | third model action |
| 1408 | fourth model action |
| 1410 | prompt |
| 1412 | VLM |
| 1414 | text encoder |
| 1416 | biometrics textual feature |
| 1418 | motion textual feature |
| 1420 | non-biometrics textual feature |
| 1422 | Disentangling Q-Former (DisenQ) |
| 1424 | vision encoder |
| 1426 | visual feature F |
| 1428 | biometrics query |
| 1430 | motion query |
| 1432 | non-biometrics query |
| 1434 | identification head |
| 1502 | self attention |
| 1504 | cross attention |
| 1602 | biometric text description |
| 1604 | motion text description |
| 1606 | non-biometric text description |
| 1902 | ABNet incorrect matches |
| 1904 | DisenQ match |
| 2002 | biometric text description |
| 2004 | motion text description |
| 2006 | non-biometric text description |
| 2102 | biometric text description |
| 2104 | motion text description |
| 2106 | non-biometric text description |
| 2402 | Person Performing Activity – subject captured in the input video sequence |
| 2404 | Generate Silhouette From Video – module that removes appearance details to yield binary silhouette frames |
| 2406 | Extract First Features with Bias-less Teacher Network – teacher CNN/ViT that outputs appearance-invariant biometric embeddings |
| 2408 | Extract Second Features with Student Network – student CNN/ViT that produces biometric embeddings from full-frame video |
| 2410 | Minimize Distillation Loss to Train Student Network – optimization step aligning student embeddings to teacher embeddings |
| 2412 | Activity Recognition Head Predicts Activity – classifier branch that infers the activity class from student features |
| 2502 | Obtain Training Data of Video Samples Labeled by Person ID and Activity – data-ingest stage supplying paired identity and activity labels |
| 2504 | Extract Visual Features with Image Encoder – backbone CNN/ViT producing spatiotemporal feature maps from video frames |
| 2506 | Generate Query Embeddings via Q-Former – query-transformer that compresses visual features into a fixed set of learnable queries |
| 2508 | Process Query Embeddings with Vision-Language Model to Generate Activity and Biometric Feature Representations – VLM decouples (i) activity semantics and (ii) biometric identity cues |
| 2510 | Optimize Model with Dual Supervision to Disentangle Identity and Activity Features – joint loss: identity CE on biometric branch + activity CE on activity branch |
| 2512 | Use Trained Model to Identify Person in Input Video – infer biometric embedding, compare against gallery, output recognized identity |

DETAILED DESCRIPTION

Person identification is an important task with a wide range of applications in security, surveillance, and various domains where recognizing individuals across different locations or time frames is essential. The inventors have seen great progress in face recognition; however, scenarios exist where faces may not be visible, such as at long distances, with uncooperative subjects, under occlusion, or due to mask-wearing. This limitation prompts the exploration of whole-body-based person identification methods where most of the existing works are often restricted to image-based approaches, overlooking crucial motion patterns. Video-based methods for person identification is a comparatively recent area where most of the work is focused on gait recognition; mostly silhouette-based, with some recent works on RGB frames. However, these works are mainly focused on the walking style of individuals.

In FIG. 1, different approaches for personal identification are shown. Specifically, (left) samples for existing person identification problems such as face recognition 100, whole body recognition 102, and gait recognition 104. At right, the focus is on person identification from daily activities 106, which presents more challenges beyond learning walking or facial patterns. The figure includes some samples from datasets used to study this problem (top: NTU RGB-AB, middle: Charades-AB, bottom: ACC-MM1-Activities).

The inventors approached a novel problem which focuses on face-restricted person identification during routine activities. The current landscape of image-based and video-based whole-body person identification methods predominantly centers around analyzing human walking patterns from images or videos. However, in real-world scenarios, the individual requiring identification might not always be engaged in walking; instead, they could be involved in various daily activities. It is crucial to acknowledge the significance of capturing and understanding motion cues that extend beyond simple walking patterns to ensure accurate and reliable identification in diverse and complex situations. These activities may offer unique cues that can prove instrumental in identifying individuals even without explicit facial information, paving the way for diverse applications in real-world scenarios, like increased surveillance in public spaces, workplace security and productivity, assistance for people requiring special needs, and smart home automation.

Learning biometrics from videos of daily activities presents several inherent challenges. Learning from such diverse activities amplifies the difficulty in capturing essential biometric features. Among the crucial challenges lies the necessity to prioritize biometric features while mitigating appearance biases present in RGB video frames, including background variations, clothing color, and other external factors. Striking a balance between extracting pertinent biometric cues and disregarding irrelevant appearance-related biases is essential in developing robust and accurate video-based biometrics identification methods.

A novel framework ABNet is disclosed which addresses some of these challenges and provides effective biometrics representation for person identification from videos of daily activities. It relies on two main components: 1) feature disentanglement and 2) joint activity-biometrics learning. Feature disentanglement aims at avoiding appearance biases while learning the biometric features. It explicitly learns biometric and non-biometric features with the help of a) distillation from a bias-less teacher, and b) bias learning using biometric distortion. Joint activity-biometrics learning provides activity prior for biometrics where the knowledge of performed activity helps in person identification.

Image-based identification: Most of the existing person identification methods use image-based approaches. Moreover, most of these methods are designed towards learning better features in terms of body shape, clothes, appearance, etc. In recent years, learning cloth-invariant features has been found to be a promising direction in person identification with several works trying to address this issue. For example, one of the most popular person identification approaches uses adversarial loss to learn cloth-invariant features. On the other hand, SCNet uses a tri-stream network to learn semantically invariant features. Some works also attempt to use multiple modalities (e.g., silhouettes, skeletons, 3D shape) for better feature representation. Even though image-based methods can have better performance than some video-based methods, this performance is measured on very specific datasets, which might or might not generalize to more complex datasets where the person in consideration is performing some other activities rather than walking.

Video-based identification: The key for video-based person identification is to extract representations robust to spatial and temporal distractors. These methods incorporate temporal information in their learned features and generally have better performance than image-based methods. Several previous works have exploited temporal cues by aggregating frame features via LSTM networks. However, instead of using aggregated features extracted by RNNs, 3D CNNs perform better in terms of directly extracting spatio-temporal features that are more robust for person identification. Following current research directions, the disclosed work is also based on 3D CNN.

Gait recognition: Gait recognition is a very active area of research where the goal is to identify individuals using their walking style. Existing methods mostly utilize silhouettes to avoid interference of appearance, which limits their applicability on real-world RGB videos. There are some approaches making use of RGB for gait recognition, but they do require silhouettes in addition to RGB data. In the disclosed method, the inventors only use silhouettes during training, and they are not required for inference.

Knowledge distillation: It is one of the most common techniques to transfer knowledge from a large model (teacher) to a smaller model (student) for compression and efficient learning. It has also been found very effective for semi-supervised learning where the models can learn from unlabeled samples under a student-teacher setup. In some recent efforts, it was also explored for person identification to offer effective cross-view and cross-scene representation learning. It has been mostly explored within the same modality, whereas the inventors perform cross-modal distillation to leverage the teacher's knowledge of a different data modality to improve the performance of the student.

The goal is to identify an individual given an RGB video of that individual performing some activity. The inventors are using a face-restricted setting to perform this task, where the face of the individual is blurred so as to avoid learning any of the facial features. Avoiding the explicit learning of facial features is motivated by acknowledging potential issues like wearing accessories (masks, sunglasses), privacy concerns, and individuals' unwillingness to reveal their faces.

Problem formulation: Given a dataset D containing elements of v, $y^A$, $y^B$ with N samples, the inventors train a person identification model M which can provide a latent feature $F_{AB}$ for each video v which can be used for matching it with the person id $y^B$. Here $v \in R^{nXCXHXW}$ represents an RGB video, where n is the number of frames, C, H, W are the number of channels, height and width of the video, and $y^B$ is its ground truth actor label that is performing some activity $y^A$. Once trained, the model M will be evaluated on a gallery $G \in v, y^b$ and probe $P \in v, y^b$. The goal is to match the id of the person $y^b$ in probe video v with the correct id in videos from gallery.

Figure 2:
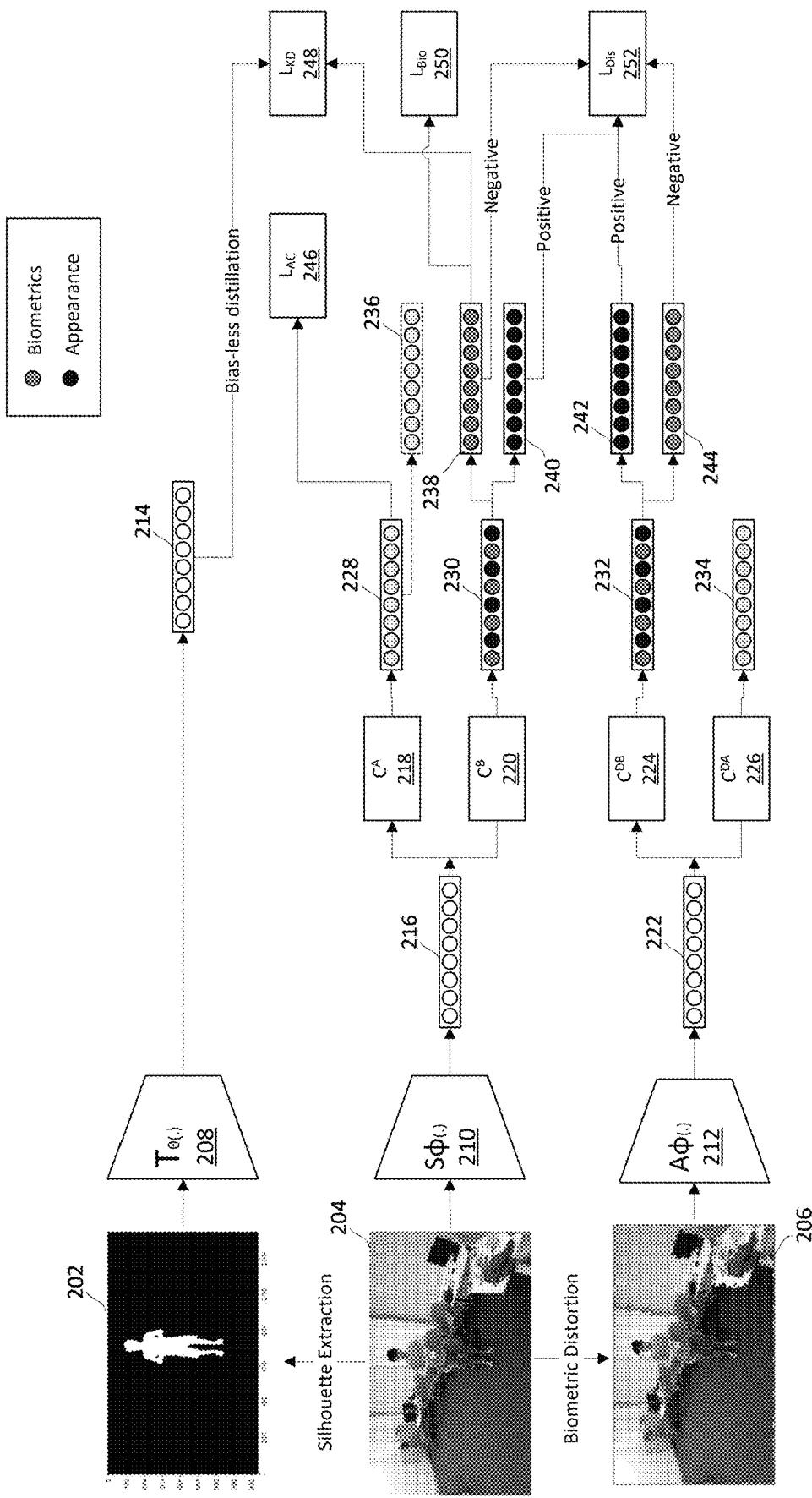
FIG. 2 shows a diagrammatic view of the ABNet method, detailing the process of extracting and disentangling biometric and appearance features from RGB videos using a bias-less teacher and distortion network.

In FIG. 2, an overview of the method ABNet is shown. RGB video is passed to a video encoder for spatio-temporal feature extraction, which is then passed to the activity head and the actor head. The actor head captures both biometrics (in red) and appearance (in green) features. To disentangle features, a bias-less teacher encoder distills biometrics knowledge from corresponding silhouettes. The appearance feature bias is learned via a distortion network using an encoder on the distorted video input. Similar to the actor head, the distorted actor head also captures both distorted biometrics (in red) and distorted appearance (in green) features. Green and red denote positive and negative features. Joint training is performed using both the activity and actor heads, but during inference, only the dashed box highlighted branch is utilized.

The inventors developed ABNet, Activity Biometrics Network, denoted as M to solve this problem. ABNet performs biometrics-bias disentanglement and make use of activity prior to learn a discriminative identity feature for person identification. Given a video v, the model M first extracts spatio-temporal features $F_{AB}$ with the help of a video encoder $S_\varphi(\cdot)$. The spatio-temporal feature $F_{AB}$ is split into two segments and are passed to the actor head $C^B$ for person identification as well as the activity head $C^A$ for activity recognition. Joint biometrics and activity learning enables the use of activity-prior for biometrics. We get actor features $F_{BT}$ from $C^B$ that contains both biometrics and appearance feature entangled with each other. Now to make the model robust to appearance bias while learning accurate biometrics features, we introduce two different components 1) distillation from a bias-less teacher and learning the bias using biometrics distortion. The actor feature $F_{BT}$ are disentangled into biometrics feature $f_{bb}$ and appearance feature $f_{ba}$. This disentanglement for biometrics feature $f_{bb}$ is performed using distillation from a bias-less teacher T. On the contrary, the disentanglement for appearance feature $f_{ba}$ is done by constraining it using a distortion network A.

Referring to FIG. 2, an embodiment of the activity-aware person-identification architecture is illustrated. The system begins with a silhouette sequence 202 that is generated from an input RGB clip by conventional foreground segmentation. The silhouette frames are supplied to a silhouette encoder 208, denoted Tθ(•), which produces a condensed silhouette feature vector 214 containing only biometric shape and motion cues. In parallel, the original input RGB video 204 is delivered to a primary three-dimensional video encoder 210 (Sφ). Encoder 210 extracts a high-dimensional spatio-temporal feature tensor 216 representing both appearance and dynamics observed within the clip.

The tensor 216 is routed to two downstream decoder branches. A first branch, termed an activity head 218 ($C^A$), classifies the action exhibited in the clip and outputs an activity feature 228. Neural-network training of the head 218 is driven by an activity loss 246 ($L_{AC}$), thereby enforcing sensitivity to behavioral context. The second branch, an actor head 220 ($C^B$), refines the same tensor 216 into an actor feature embedding 230 that is subsequently parted into a biometric vector 238 and an appearance vector 240. A supervised biometric loss 250 ($L_{BIO}$) comprising cross-entropy and metric-learning terms optimizes the biometric vector 238 for inter-subject separability.

To teach the network how appearance differs from identity, the clip 204 is also subjected to elastic spatial warping that preserves color and texture while disrupting body morphology, yielding a distorted video 206. The distorted clip is processed by a weight-shared secondary encoder 212 (Aφ) to obtain a distorted spatio-temporal tensor 222. That tensor feeds a distorted actor head 224 ($C^{DB}$) and a distorted activity head 226 ($C^{DA}$). Head 224 produces a distorted actor embedding 232 that is divided into a distorted appearance sub-vector 242 and a distorted biometric sub-vector 244; head 226 produces a distorted activity feature 234. Because geometric distortion retains clothing, vectors 240 and 242 represent the same appearance and are treated as positive pairs, whereas vectors 238 and 244 represent disparate biometrics and are treated as negative pairs. A margin-based distortion loss 252 ($L_{Dis}$) therefore compresses the distance between 240 and 242 while simultaneously enlarging the distance between 238 and 244, thereby forcing appearance information to reside exclusively inside the appearance sub-space and keeping biometric information uncontaminated.

The bias-free silhouette feature 214 produced by encoder 208 supervises the biometric learning in the RGB branch by way of a Kullback-Leibler distillation loss 248 ($L_{KD}$) that compels the distribution implied by the biometric vector 238 to mimic that of the silhouette-only teacher. Consequently, biometric vector 238 inherits appearance-invariant decision boundaries without sacrificing the richer motion information available in color video.

During inference, only the elements enclosed by the dashed outline are evaluated. Specifically, encoder 210, actor head 220, and activity head 218 remain active whereas the silhouette path 202-214 and distortion path 206-244 are bypassed. Activity feature 228 and biometric vector 238 are concatenated to form an activity-conditioned biometric descriptor 236, which is compared against a gallery of stored descriptors for final identity resolution. This composite representation improves discrimination when the subject's gait changes across actions, because the activity component provides contextual weighting while the biometric component delivers clothing-invariant identity cues.

Through the cooperative action of the silhouette-guided distillation loss 248, the activity loss 246, the biometric loss 250, and the distortion loss 252, encoder 210 learns a feature hierarchy that cleanly separates biometric structure from superficial appearance while preserving temporal information germane to action recognition. The disclosed arrangement therefore yields robust person identification across diverse activities, camera viewpoints, and wardrobe variations without requiring facial visibility, satisfying critical operational constraints in surveillance and access-control scenarios.

Biometrics bias disentanglement. Appearance bias in biometrics arises when the models overly rely on superficial visual cues, such as clothing or specific accessories for identification. This leads to challenges such as limited generalization across appearances, vulnerability to adversarial attacks, and reduced robustness to environmental variations. This bias can result in biased matching decisions, and inconsistent performance across cameras. There has been extensive research done to avoid clothing features for person reidentification, however, appearance bias can come from features other than clothes as well. To deal with this issue of appearance bias, we introduce two different aspects; 1) bias-less distillation from a teacher network, and 2) learning the bias using negative mining through biometrics distortion.

Bias-less distillation. One split segment of the extracted feature $F_{AB}$ is fed to the actor head $C^B$, which contains $D^B$ that is a standard transformer decoder. The transformer decoder $D^B$ processes the spatio-temporal features using multiple layers of multi-head self-attention and position-wise feed-forward networks. This architecture allows the model to contextualize temporal patterns across frames, capturing long-range dependencies in the video that are indicative of identity-specific movement signatures. The decoder's attention mechanism can dynamically focus on key postures or transitions unique to each subject, thereby enhancing the discriminative power of the learned identity embedding. The final output of the decoder is projected into two separate subspaces corresponding to biometric and appearance-related features, enabling effective bias disentanglement. This use of transformer decoding layers is particularly advantageous in the context of activity-rich videos, where complex and temporally extended motion cues are essential for accurate person identification.

We get actor feature $F_{BT}$ from $D^B$, which contains biometrics feature $f_{bb}$ and appearance feature $f_{ba}$. $D^B$ uses self-attention to process the input sequence and then projects the attention output into $f_{bb}$ and $f_{ba}$ using separate linear layers. Now to disentangle the biometrics features from the appearance features, we use silhouette features to perform bias-less distillation using teacher network T. T is termed as bias-less because it is trained on binary silhouette video $b_s \in R^{nXCXHXW}$ that corresponds to RGB video v, and thus have no knowledge of appearance-based features. T contains a silhouette encoder $T_\theta(•)$ that takes $b_s$ as input and extracts $F_s$ features. We use the standard Kullback-Leibler (KL) divergence loss to minimize the discrepancy between the probability distributions of the teacher T and our model M. The distillation loss $L_{KD}$ is formulated as below:

$$L_{KD} = \tau^2 KL(y^T \| y_S), \quad (1)$$

where, $y_T$ and $y_S$ are the probability distribution of the teacher T and our model M. τ is the temperature parameter that controls the softness of the teacher's output. Along with this distillation loss $L_{KD}$, $C^B$ has its own biometrics loss $L_{Bio}$ formulated as below:

$$L_{Bio} = L_{ce} + L_{tri}, \quad (2)$$

where, $L_{ce}$ and $L_{tri}$ are standard triplet and cross-entropy losses for person identification formatted as below:

$$L_{ce}=-y \log \hat{y}, L_{ce}=-y \log \hat{y} \qquad (3)$$

$$L_{tri}=\max(D(f_a,f_p)-D(f_a,f_n)+m),0), \qquad (4)$$

where, y and ŷ are the ground truth and predicted label, fp and fn are the positive and negative features for an anchor feature fa within the same batch, D(•) is the Euclidean distance function, and m is the margin of triplet loss.

Bias learning. To make the model robust to appearance bias, we introduce the distortion network A, which is identical to M and shares weights. The distortion network A enables the creation of hard negative samples for biometric training by modifying only the identity-defining features while retaining the original appearance cues. By applying this distortion to the morphology of the subject's body, such as through non-rigid deformations or spatial warping, the visual identity is obfuscated without altering superficial attributes like clothing, lighting, or background. These distorted inputs simulate impostors with identical appearance but distinct biometric structure. During training, the model is taught to treat these distorted samples as different individuals, effectively sharpening its ability to separate biometric identity from appearance. This process enhances the resilience of the identity embedding to visual bias and ensures that the network generalizes well to individuals wearing similar clothing or appearing under different lighting conditions.

Figure 3:
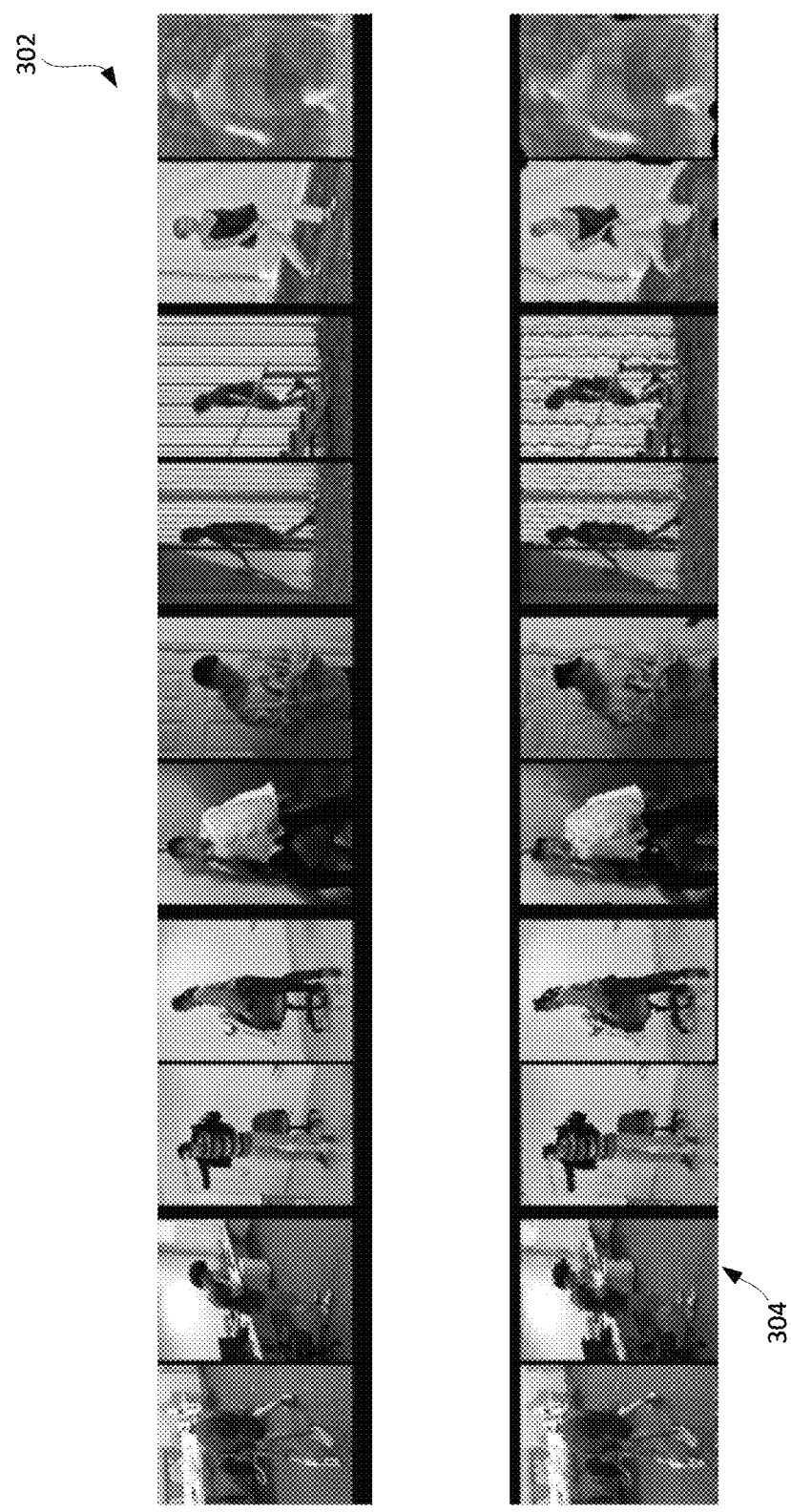
FIG. 3 shows original video samples in the top row and their corresponding distorted samples in the bottom row, demonstrating the biometrics distortion process across different datasets.

It contains video encoder $A\varphi(\bullet)$ that takes distorted video $\hat{v} \in \mathbb{R}^{nXCXHXW}$ that corresponds to the original video v. The key idea is to distort the identity of the person while preserving the appearance. We rely on elastic transform which randomly transforms the morphology of objects in images and produces a see-through-water-like effect in the image still preserving the appearance. It is used to generate "negative" or "distractor" samples in the training dataset where the distorted samples will have the same appearance while changing the identity. Some sample distorted images are shown in FIG. 3.

This morphological transformation strategy introduces controlled variability into the identity features while preserving consistency in appearance attributes. When passed through the distortion network, the resulting features are contrasted with those from the original input in the loss function. The contrastive loss encourages the network to push apart biometric embeddings from the original and distorted inputs while simultaneously pulling together the corresponding appearance embeddings. This dual constraint enforces a clear separation between the identity-relevant and bias-relevant components in the representation space. By systematically generating and training on these adversarial-like inputs, the model becomes capable of robustly disentangling biometric signatures from appearance features, leading to improved generalization in real-world applications where superficial visual cues often fluctuate.

Similar to M, this distortion network A also extracts spatio-temporal feature $$f\frac{D}{AB}$$

using encoder $A\varphi(\bullet)$. Since this branch is designed for bias-learning, thus the activity head $C^{DA}$ of A is not utilized. On the contrary, A's actor head $C^{DB}$ extracts distorted biometrics feature $$f\frac{D}{bb}$$

and distorted appearance feature $$f\frac{D}{ba}.$$

Due to the distortion, $f_{ba}$ and $$f\frac{D}{ba}$$

are treated as positive samples, whereas, $f_{bb}$ and $$f\frac{D}{bb}$$

as hard negative samples. The goal is to pull together positive pairs (i.e. similar features) and push apart negative pairs (i.e. dissimilar features). We use this distorted augmentation loss $L_{Dis}$ for bias learning and it is described as, $$L_{Dis}=\max(D(f_{ba},f_{ba}^D)-D(f_{bb},f_{bb}^D)+m),0) \qquad (5)$$

where D(•) is the Euclidean distance function and m is the margin for the contrastive loss.

Joint biometrics and activity learning. Jointly training a network for both activity recognition and person identification can benefit person identification when the training data includes activities by enabling the model to learn shared representations. By learning to understand contextual cues from activities alongside actor features, the network can develop richer embeddings, thereby enhancing the model's ability to accurately identify individuals across varying activity contexts. Thus we perform joint learning of the activity and actor branch of ABNet. One segment of feature $F_{AB}$ is fed to activity head $C^A$ that contains de-coder DA/$\Omega$ that learns features $F_{Ac}$. $C^A$ is trained using $L_{Ac}$ which is a standard cross-entropy loss for the activity labels regardless of the actor labels. This joint training also enables ABNet to utilize activity priors for biometrics, where we use knowledge of activity for person identification. This is accomplished by concatenating the activity features $F_{AC}$ with biometrics features $f_{bb}$ during testing.

Finally the model M is optimized by combining all the losses which include, biometrics loss $L_{Bio}$, distillation loss $L_{KD}$, distortion loss $L_{Dis}$ and activity loss $L_{Ac}$ and we get the total loss L formulated as, $$L=L_{Bio}+\lambda_1 L_{Ac}+\lambda_2 L_{KD}+\lambda_3 L_{Dis} \qquad (6)$$

where $\lambda_i$, i∈[1, 2, 3] are the weights for each of the losses.

We perform our experiments on five different datasets which are derived from existing activity recognition benchmarks. 1) NTU RGB-AB is derived from NTU RGB+D which is a large-scale benchmark for activity recognition. We ignore mutual activities and consider 94 activity classes with 88692 samples from NTU RGB-AB. The activity classes are divided into daily activities and medical conditions performed by a total of 106 subjects across 32 different setups, 155 different views which are shown with 3 cameras. We use the official cross-subject split for the train test separation. 2) PKU MMD-AB is derived from PKU-MMD which is another large-scale benchmark for activity recognition. Similar to NTU RGB-AB, we ignore mutual activities from PKU-MMD and PKU MMDAB has 41 activity categories with almost 17,000 labeled activity instances.

These activities are performed by 66 actors in 3 different camera views and we use the official cross-subject split for our experiments. 3) Charades-AB contains all the 9,848 annotated videos from Charades with approximately 6.8 activities per video performed by 267 actors across 157 activity classes from a single viewpoint. We use the official train-test split for our experiments. 4) ACC-MM1-Activities is a recently curated daily activities dataset which contains 1378 annotated videos where 7 daily activities are being performed by 200 subjects from a single view-point. These activities are enter/exit car, pull/push door, walk upstairs/downstairs, and texting. We use the official train-test split for our experiments. 5) BRIAR-BGC3 is a large-scale, in-the-wild person identification dataset containing samples across varying distances, environment conditions. It is mainly focused on walking/standing scenario and consists of 3 different walking conditions (structured walk, random walk and standing) performed by 1055 subjects in outdoor settings from different ranges and angle of elevation. BRIAR-BGC3 contains over 1300 hours of labeled training videos from 1055 subjects in indoor/outdoor settings. We use a 20K subset of this dataset for training with official face restricted testing set for evaluation.

The videos from all five datasets undergo an arbitrarily chosen value of hue shifting. Training a model on hue-shifted data, even when appearance features are not explicitly utilized, serves to enhance the model's robustness and generalization capabilities. This hue shifting operation is implemented by altering the hue component of each RGB frame while preserving its luminance and saturation levels. Specifically, the RGB frame is converted to HSV (Hue, Saturation, Value) color space, and the hue channel is uniformly rotated by a randomly selected offset, then converted back to RGB space. This augmentation ensures that the color of clothing and background elements varies substantially across training samples, even for the same identity and activity. As a result, the model is prevented from associating fixed color cues with identity, thus further mitigating appearance bias. Importantly, this transformation does not alter the structural or motion-based biometric signals in the frame, which ensures that the spatio-temporal features extracted by the encoder remain aligned with the individual's true biometric profile. The randomized color profiles force the model to become invariant to superficial visual attributes, improving its generalization to unseen attire and lighting conditions.

To facilitate face restricted person identification the faces are blurred using Gaussian blur for both the test and train split of all datasets. In FIG. 3, biometrics distortion is illustrated. Original samples are shown in the top row, and their corresponding distorted samples are in the bottom row. From left to right, every two columns contain samples from the NTU RGB-AB, PKU MMD-AB, Charades-AB, ACC-MM1-Activities, and BRIAR-BGC3 datasets, respectively.

Implementation and training details. The method is implemented using Pytorch. We use ResNet3D-50 as the backbone of the video encoder $S_\varphi(\cdot)$ and GaitGL for the teacher's silhouette encoder $T_\theta(\cdot)$. The silhouettes of the RGB videos are extracted using Mask2Former to use as input to $T_\theta(\cdot)$. We create RGB video clips from each original video by randomly selecting 8 frames with a stride of 4. Every input frame undergoes resizing to dimensions of 256λ128. We train the model with a batch size of 32 with each batch containing 8 person and 4 clips for each person. Adam is used as the optimizer with weight decay of $5\times10^{-4}$ and learning rate of 3.5×10-4. The model is trained for 150 epochs with a decay factor 0.1 after every 40 epochs. The triplet loss margin m is set to 0.3 and $\lambda_i$, $i\in[1, 2, 3]$ in Eq. (6) is set to 0.01. During inference the activity feature $F_{AC}$ is concatenated with the biometrics feature $f_{bb}$ that acts as the activity prior.

This activity prior provides contextual information that aids in resolving ambiguity in the identity embedding, particularly when biometric signals are weak due to limited movement or occlusions. By incorporating the learned representation of the action being performed, the model conditions its identification decision on both who the subject is and what they are doing. For instance, a user's walking style may vary between running and ascending stairs; incorporating the activity vector helps the model distinguish between activity-induced variance and true biometric identity. This combined feature vector is then matched against a reference gallery, enabling more robust and context-aware identification across diverse scenarios.

Evaluation protocol. For all datasets except BRIAR-BGC3, we randomly split the test set into gallery and probe (more details in supplementary). We use two different evaluation protocols; 1) same activity inclusive, and 2) crossactivity. For the first one, we use all the activities in the gallery whereas in cross-activity we exclude the activity in the probe while retrieval. Similarly, we also evaluate for same-view (View$^+$) and cross-view (View$^-$) for NTU RGB-AB and PKU MM-AB where view information is available. For BRIAR-BGC3, we use the official protocol for face-restricted evaluation.

Evaluation metrics. For a thorough assessment of the model's performance, we employ rank 1 accuracy, rank 5 accuracy, mean average precision (mAP), and TAR@0.1% FAR. While the first three evaluation metrics are more popular to evaluate a person identification model, the latter metric is also crucial to check the model's ability to minimize the false acceptance rate.

TABLE 1

Comparison with state-of-the-art person identification methods:
Evaluation shown on NTU RGB-AB, PKU MMD-AB, Charades-AB, and ACC-MM1-
Activities on same-activity,

|  | | | NTU RGB-AB | | PKU MMD-AB | | Charades-AB | | ACC-MM1-Activities | |
|---|---|---|---|---|---|---|---|---|---|---|
|  | Methods | Venue | Rank 1 | mAP | Rank 1 | mAP | Rank 1 | mAP | Rank 1 | mAP |
| Image | CAL | CVPR22 | 73.79 | 28.40 | 81.31 | 49.45 | 43.84 | 25.81 | 69.83 | 42.81 |
|  | PSTR | CVPR22 | 69.14 | 34.14 | 84.33 | 47.52 | 37.15 | 24.69 | 57.41 | 34.48 |
|  | SCNet | ACM MM23 | 69.89 | 31.47 | 79.53 | 43.55 | 31.73 | 21.89 | 64.68 | 39.79 |
|  | AIM | CVPR23 | 71.37 | 35.41 | 82.52 | 48.89 | 40.13 | 28.31 | 74.79 | 49.14 |
| Video | TSF | AAAI20 | 71.79 | 31.80 | 76.43 | 37.50 | 35.38 | 21.89 | 49.41 | 29.73 |
|  | VKD | ECCV20 | 67.41 | 35.63 | 78.35 | 38.54 | 36.31 | 20.71 | 55.38 | 29.57 |
|  | BiCnet-TKS | CVPR21 | 72.71 | 34.45 | 80.79 | 38.52 | 40.31 | 27.34 | 60.44 | 32.79 |
|  | STMN | ICCV21 | 72.98 | 35.08 | 76.55 | 47.92 | 38.72 | 24.49 | 59.44 | 39.68 |
|  | PSTA | ICCV21 | 67.41 | 34.78 | 77.44 | 50.42 | 42.89 | 28.32 | 71.41 | 50.31 |
|  | SINet | CVPR22 | 69.41 | 30.68 | 79.58 | 40.80 | 40.31 | 26.90 | 65.39 | 45.41 |
|  | Video-CAL | CVPR22 | 75.49 | 39.86 | 79.59 | 49.42 | 43.91 | 28.51 | 77.48 | 50.08 |
| Baselines | GaitGL† | — | 61.51 | 28.89 | 65.38 | 33.78 | 18.43 | 6.81 | 39.41 | 18.51 |
|  | ResNet3D-50 | — | 64.23 | 26.89 | 69.70 | 32.64 | 32.25 | 17.42 | 44.31 | 22.54 |
|  | MViTv2 | — | 63.87 | 26.41 | 68.37 | 28.52 | 28.51 | 15.39 | 40.59 | 21.52 |
|  | ABNet (ours) | — | 78.76 | 40.31 | 86.83 | 57.31 | 45.84 | 31.58 | 80.43 | 52.71 |

View+ evaluation protocol.
†this model was trained on silhouettes.

Baseline methods. We consider ResNet3D-50, MViTv2 and GaitGLas baselines. To further demonstrate the effectiveness of our model, we compare it against several state-of-the-art image based (CAL, PSTR, SCNet and AIM) and video based (TSF, VKD, BiCnet-TKS, STMN, PSTA, SINet, Video-CAL) person identification methods.

Results. In Table 1, we present rank 1 accuracy and mAP metrics for different baselines and state-of-the-art person identification methods across NTU RGB-AB, PKU MMD-AB, Charades-AB, and ACC-MM1-Activities datasets, using the same activity View+ evaluation protocol. ABNet consistently outperforms both the best SOTA models and baselines across all four datasets. Table 3 compares ABNet with top-performing identification methods and baselines on the BRIAR-BGC3 dataset.

For a detailed evaluation, Table 2 shows ABNet's performance across NTU RGB-AB, PKU MMD-AB, Charades-AB, and ACC-MM1-Activities datasets. This includes both same activity and cross activity evaluation protocols, featuring View+ and View-settings for NTU RGB-AB and PKU MMD-AB. As view information is unavailable for Charades-AB and ACC-MM1-Activities datasets, the evaluation focuses solely on same and cross activity protocols.

From Tables 1 and 3, it's clear that existing methods are primarily focused on identifying individuals based on walking patterns in various settings, lacking optimization for diverse activities. Our ABNet consistently outperforms existing models across all datasets. ABNet demonstrates approximately 2% to 4% higher rank 1 accuracy compared to the best existing method. This consistent superiority highlights ABNet's effectiveness in person identification across diverse activity scenarios.

In Table 2, ABNet shows relatively stable performance across different evaluation protocols, except for ACC-MM1-Activities, which has fewer activity classes leading to larger performance gaps. The presence of overlapping activities in Charades-AB video samples reduces its performance compared to other datasets. Despite these challenges, ABNet consistently delivers strong results. Even on the predominantly walking-focused BRIAR-BGC3 dataset, ABNet outperforms the best SOTA model by 4% in rank 1 accuracy. Overall, ABNet demonstrates robust performance, particularly on datasets with diverse activity classes.

Ablations. To verify the effectiveness of ABNet and each of its components, we perform ablation study on the NTU RGB-AB dataset in Table 4 on the same activity evaluation protocol. Refer to the supplementary for ablation study on the cross-activity evaluation protocol. Here, B/L stands for the baseline which is just the backbone model taking RGB video as input. K/D stands for bias-less distillation, A/P stands for activity prior, and lastly F/D stands for the bias learning.

Effect of bias-less distillation. Introducing bias-less distillation, either independently (row 2) or with an activity prior (row 4), leads to notable performance improvements over the baseline. However, combining bias-less distillation and activity prior demonstrates superior performance over independent use of distillation, showcasing their synergistic effect on model enhancement.

Effect of bias learning. Incorporating bias learning through a distorted video encoder branch boosts model performance even more (row 5). Similar to bias-less distillation, combining bias learning with an activity prior yields the best overall performance (row 6), highlighting the importance of their synergy in enhancing model robustness and disentangling biometrics and appearance information.

TABLE 2

Comprehensive performance evaluation of ABNet: results shown on NTU RGB-AB, PKU MMD-AB, Charades and ACC-MM1-Activities. We observe that cross-view and cross-activity setup is the most challenging with some performance drop when compared with same activity and same view setup.

|  |  | R@1 | | R@5 | | mAP | | TAR @ 0.1% FAR | |
| --- | --- | --- | --- | --- | --- | --- | --- | --- | --- |
| Dataset | Evaluation Protocol | View+ | View− | View+ | View− | View+ | View− | View+ | View− |
| NTU RGB-AB | Same activity | 78.76 | 77.81 | 85.31 | 82.41 | 40.31 | 38.80 | 39.83 | 35.68 |
|  | Cross activity | 77.01 | 76.43 | 81.37 | 80.37 | 37.64 | 36.14 | 34.92 | 33.79 |
| PKU MMD-AB | Same activity | 86.83 | 81.41 | 91.37 | 87.73 | 57.31 | 51.74 | 42.79 | 40.31 |
|  | Cross activity | 81.44 | 79.41 | 89.31 | 84.83 | 51.79 | 46.30 | 37.31 | 34.38 |
| Charades | Same activity | 45.84 | — | 51.04 | — | 31.58 | — | 25.39 | — |
|  | Cross activity | 44.82 | — | 52.01 | — | 28.78 | — | 22.61 | — |
| ACC-MM1-Activities | Same activity | 80.43 | — | 89.31 | — | 52.71 | — | 43.72 | — |
|  | Cross activity | 68.31 | — | 76.39 | — | 38.83 | — | 35.32 | — |

TABLE 3

Performance comparison on BRIAR-BGC3 against best state-of-the-art person identification and baselines.

| Model | R@1 | mAP | TAR@ 0.1% FAR |
| --- | --- | --- | --- |
| Image-CAL | 30.57 | 17.44 | 25.38 |
| Video-CAL | 28.32 | 15.43 | 24.16 |
| PSTA | 27.75 | 13.78 | 21.54 |
| GaitGL | 12.61 | 9.51 | 6.44 |
| ResNet3D-50 | 22.50 | 12.83 | 19.71 |
| MViTv2 | 11.78 | 10.21 | 8.44 |
| ABNet (ours) | 34.38 | 18.78 | 26.42 |

TABLE 4

Ablation studies of each component of ABNet on NTU RGB-AB on same activity evaluation protocol.

|  |  |  |  | View+ | | View− | |
| --- | --- | --- | --- | --- | --- | --- | --- |
| B/L | K/D | A/P | F/D | R@1 | mAP | R@1 | mAP |
| ✓ |  |  |  | 64.23 | 26.89 | 62.10 | 22.45 |
| ✓ | ✓ |  |  | 69.31 | 28.01 | 66.57 | 24.29 |
| ✓ |  | ✓ |  | 69.43 | 27.97 | 67.37 | 24.77 |
| ✓ | ✓ | ✓ |  | 72.89 | 32.38 | 70.17 | 30.68 |
| ✓ | ✓ |  | ✓ | 76.70 | 36.21 | 73.82 | 33.18 |
| ✓ | ✓ | ✓ | ✓ | 78.76 | 40.31 | 77.81 | 38.80 |

TABLE 5

Effect of distortion on model performance for NTU RGB-AB on the same activity evaluation protocol

|  | View+ | | View− | |
| --- | --- | --- | --- | --- |
| Distortion amount | R@1 | mAP | R@1 | mAP |
| α = 200 | 78.23 | 38.31 | 76.81 | 37.91 |
| α = 250 | 78.76 | 40.31 | 77.81 | 38.80 |
| α = 300 | 75.24 | 31.42 | 73.17 | 29.84 |

Effect of activity prior. Incorporating activity and biometrics features during inference significantly enhances performance compared to using only the baseline model (row 3). This integration consistently improves model efficacy across various model configurations demonstrating the role of activity recognition for biometrics.

Figure 4:
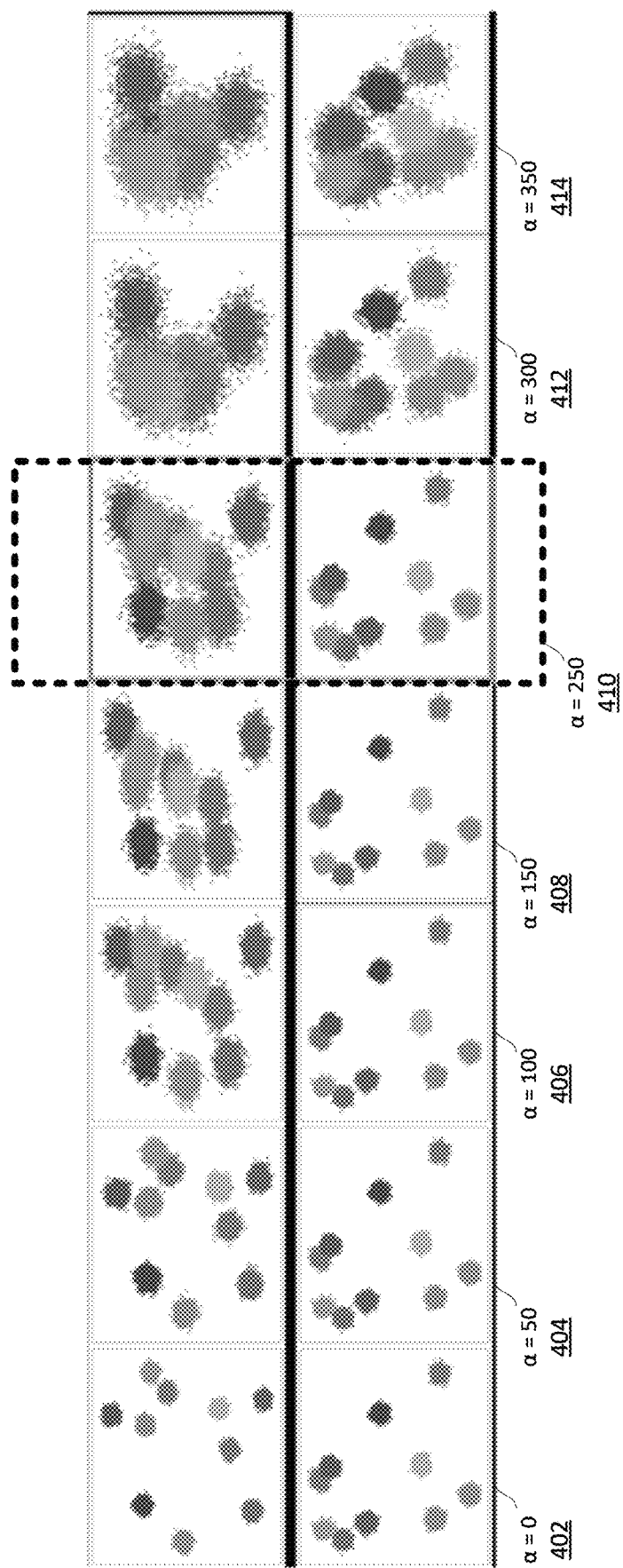
FIG. 4 shows the effect of varying distortion amounts on the feature space, with t-SNE plots illustrating the impact on biometric (top row) and appearance (bottom row) features for ABNet, highlighting the optimal distortion amount.

Effect of distortion. FIG. 4 eight representative t-SNE visualizations illustrate the evolution of the learned embedding as the distortion magnitude a is swept from zero to a large warp. Panel 402 corresponds to α=0, meaning no geometric perturbation; in this condition biometric clusters are well separated and appearance clusters are likewise distinct. When the distortion is increased to α=50, panel 404 shows the first signs of biometric-cluster convergence, yet the appearance groupings remain intact. A further increase to α=100 in panel 406 and to α=150 in panel 408 progressively forces biometric points belonging to different subjects to drift toward one another, whereas the appearance points, which are treated as positives in the contrastive formulation, still delineate consistent islands. Panel 410 depicts the α=250 setting enclosed by a dashed border; here biometric clusters exhibit sufficient overlap to supply a strong negative signal for the distortion loss while the appearance clusters are still largely coherent. Raising the distortion to α=300, shown in panel 412, begins to degrade appearance cohesion, introducing unwanted mixing, and by α=350, panel 414 demonstrates that both biometric and appearance embeddings collapse into indiscriminate clouds. Empirically, therefore, α=250 delivers the desired trade-off: biometric overlap that maximizes the hard-negative effect and appearance stability that preserves positive-pair structure. Quantitative results reported in Table 5 corroborate the visual trend observed across panels 402 through 414, with model accuracy peaking at the distortion level depicted in panel 410 and declining beyond that point.

Figure 5:
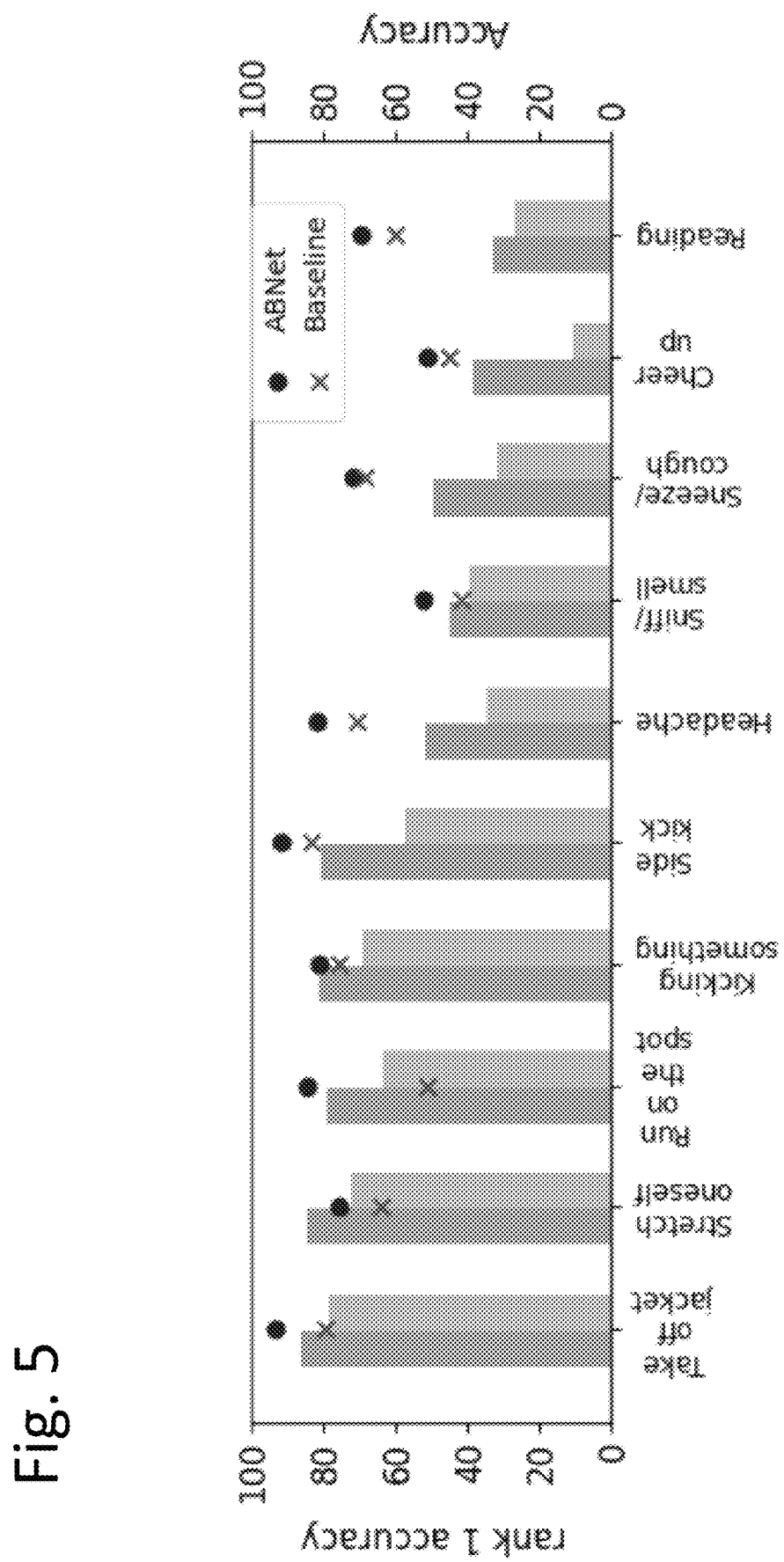
FIG. 5 shows a performance analysis across activities, with a bar plot illustrating rank 1 identification accuracy of ABNet versus baseline for 10 activities, and a scatter plot depicting activity recognition accuracy for the corresponding classes.

Performance analysis across activities. FIG. 5 illustrates the comparison between our method and the baseline across selected activities, encompassing the top five best and bottom five worst instances in person identification performance. Notably, activities posing challenges for person identification, resulting in lower performance, also exhibit reduced accuracy in activity recognition, except for a few exceptional activity classes. This correlation underscores the consistent relationship between the difficulty of identifying individuals within activities and the corresponding accuracy of recognizing those activities.

Effect of face restriction. Table 6 illustrates the model's performance on the same activity evaluation protocol, indicating a minimal increase in performance despite the presence of facial features. This suggests the model's resilience to facial variations, showcasing its capability to identify individuals based on non-facial cues. ABNet demonstrates stability in performance even after the removal of facial appearance cues, highlighting its reliance on other distinguishing features, such as activity-related cues.

TABLE 6

Effect of face restriction on model performance for NTU RGB-AB on same activity evaluation protocol.

| Face Restricted | View+ R@1 | mAP | View− R@1 | mAP |
|---|---|---|---|---|
| Yes | 78.76 | 40.31 | 77.81 | 38.80 |
| No | 79.24 | 41.64 | 78.87 | 40.04 |

Figure 6:
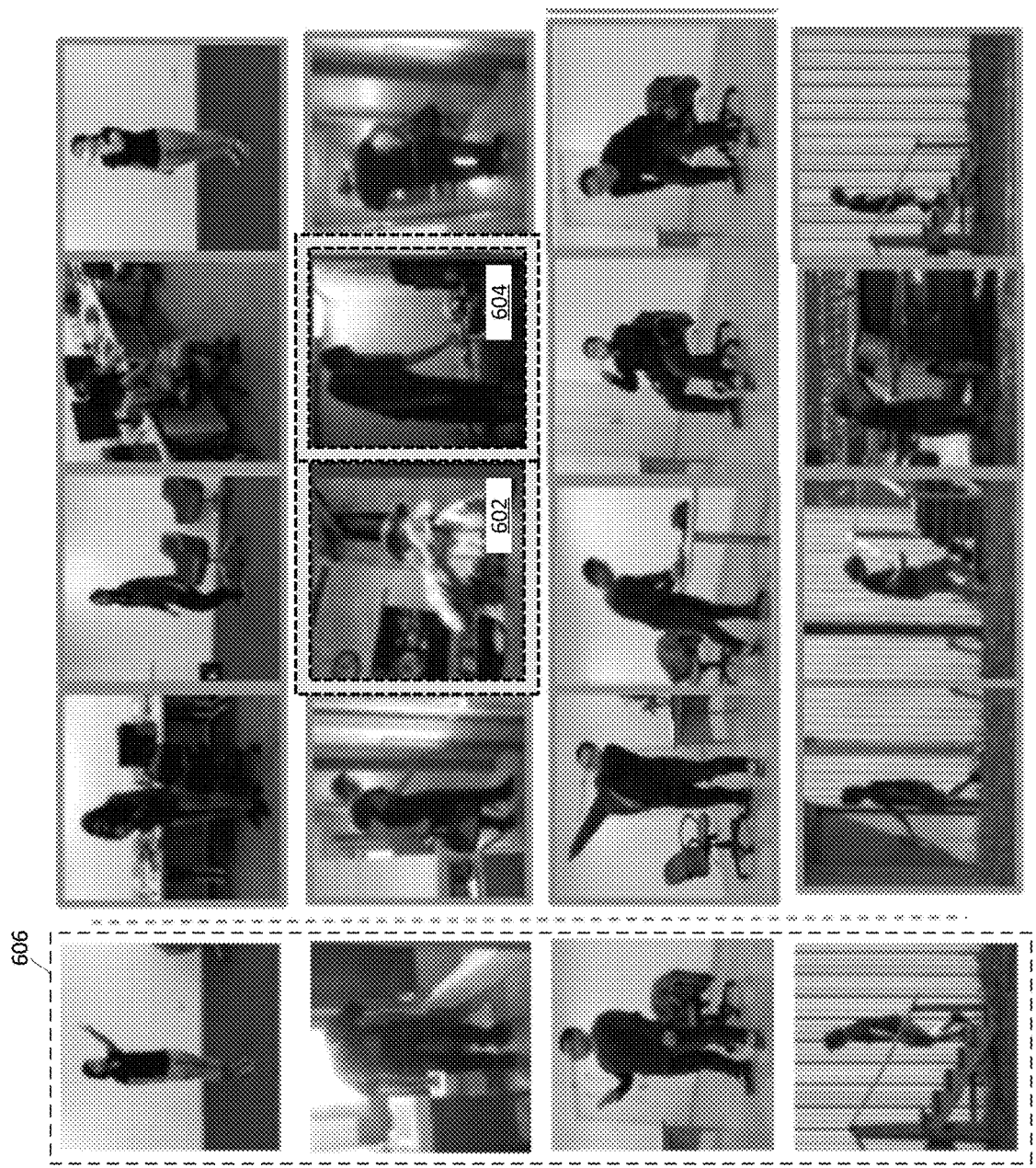
FIG. 6 shows top 4 rank retrieval samples for ABNet across various datasets, with probe images in the leftmost column and retrieved images in the subsequent columns, highlighting accurate retrievals in green and inaccurate ones bounded in red.
Figure 7:
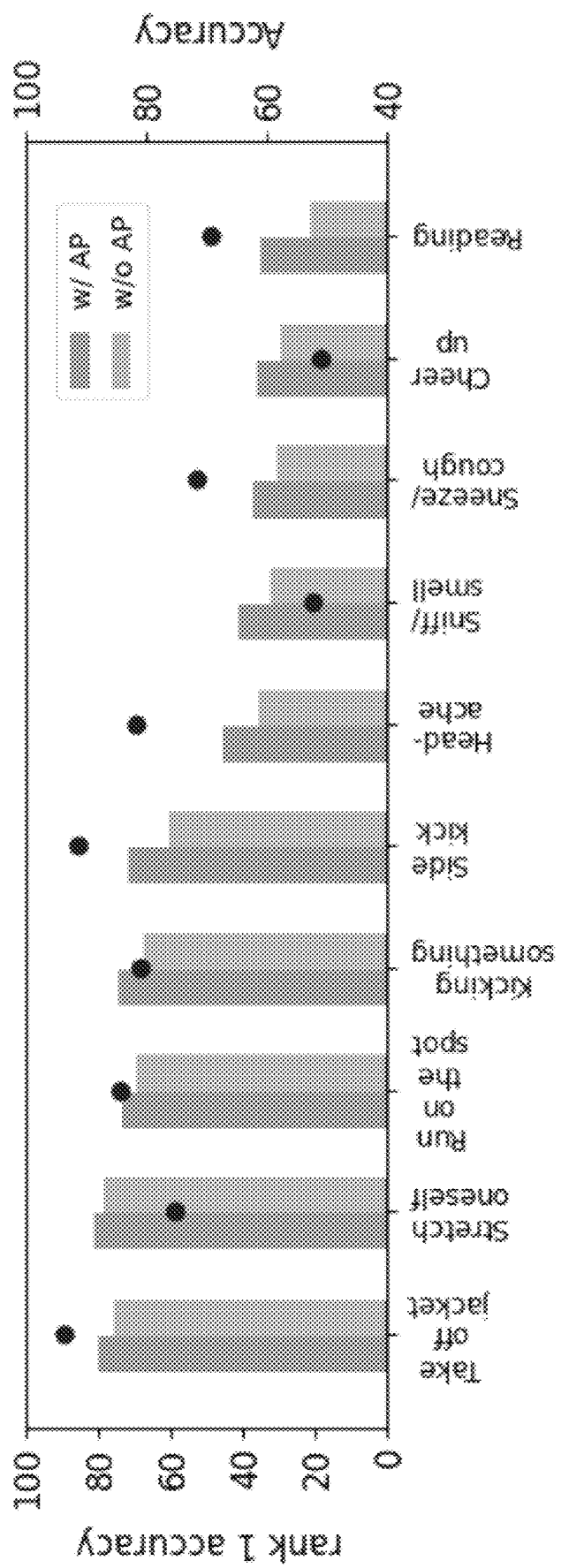
FIG. 7 shows a performance analysis with and without activity prior, where bars represent biometrics rank 1 accuracy and dots represent activity accuracy across different activities.

Qualitative results. In addition to the quantitative results, we show top 4 rank retrieval results in FIG. 6. Each row in this figure corresponds to a probe (left, 606) and the identities retrieved (right) by ABNet. The retrieval list shows accurate person identification (inaccurate noted as 602 and 604) across a variety of activities and appearance, effectively highlighting ABNet's ability to learn from activity cues rather than appearance.

Gallery Probe Setup. We evaluate the performance in terms of same activity and cross activity. In the same activity evaluation protocol, probe and gallery contains all the activities, however, probe contains a smaller subset of samples and the rest are placed in gallery. In the cross activity evaluation protocol, probe and gallery contains mutually exclusive activities, where probe contains a smaller subset of samples and rest of the samples from those activities are discarded; on the contrary the gallery contains all samples with inclusion/exclusion of probe view from gallery is not relevant in these case. Table 7 illustrates a detailed description of all the datasets.

TABLE 7

Dataset statistics

| Dataset | Split | #actors | #activities | #samples |
|---|---|---|---|---|
| NTU RGB-AB | train | 85 | 94 | 70952 |
|  | gallery | 21 |  | 14192 |
|  | probe |  |  | 3548 |
| PKU MMD-AB | train | 53 | 41 | 13634 |
|  | gallery | 13 |  | 2727 |
|  | probe |  |  | 681 |
| Charades-AB | train | 214 | 157 | 45111 |
|  | gallery | 53 |  | 9022 |
|  | probe |  |  | 2256 |
| ACC-MM1-Activities | train | 182 | 7 | 7717 |
|  | gallery | 45 |  | 1543 |
|  | probe |  |  | 386 |
| BRIAR-BGC3 | train | 870 | 3 | 20000 |
|  | gallery | 130 |  | 4171 |
|  | probe |  |  | 922 |

We present the comparison of different state-of-the-art methods against our ABNet to show its effectiveness across NTU RGB-AB, PKU MMD-AB, Charades-AB and ACM-MM1-Activities datasets on the cross-activity View+ evaluation protocol in Table 8 which corresponds to Table 1 supra.

TABLE 8

Comparison with state-of-the-art person identification methods: Evaluation shown on NTU RGB-AB, PKU MMD-AB, Charades-AB, and ACC-MM1-Activities on cross-activity.

|  | Methods | Venue | NTU RGB-AB Rank 1 | mAP | PKU MMD-AB Rank 1 | mAP | Charades-AB Rank 1 | mAP | ACC-MM1-Activities Rank 1 | mAP |
|---|---|---|---|---|---|---|---|---|---|---|
| Image | CAL | CVPR22 | 70.31 | 24.08 | 78.31 | 43.43 | 40.13 | 21.23 | 67.33 | 38.21 |
|  | PSTR | CVPR22 | 68.34 | 32.54 | 77.98 | 41.23 | 35.12 | 20.32 | 53.46 | 30.18 |
|  | SCNet | ACM MM23 | 68.82 | 26.31 | 73.91 | 39.65 | 27.42 | 17.61 | 55.38 | 32.42 |
|  | AIM | CVPR23 | 72.79 | 30.21 | 79.22 | 44.90 | 35.56 | 26.36 | 66.81 | 38.14 |
| Video | TSF | AAAI20 | 67.81 | 26.88 | 71.61 | 33.22 | 30.21 | 18.29 | 41.31 | 21.43 |
|  | VKD | ECCV20 | 66.33 | 31.46 | 72.19 | 34.34 | 31.89 | 18.81 | 51.26 | 22.16 |
|  | BiCnet-TKS | CVPR21 | 69.13 | 30.21 | 77.13 | 33.32 | 38.33 | 23.34 | 58.41 | 30.21 |
|  | STMN | ICCV21 | 70.21 | 30.13 | 71.53 | 42.21 | 33.89 | 20.81 | 57.61 | 37.61 |
|  | PSTA | ICCV21 | 65.13 | 31.42 | 72.43 | 47.42 | 38.72 | 24.84 | 67.31 | 37.33 |
|  | SINet | CVPR22 | 66.21 | 27.81 | 74.11 | 26.21 | 37.31 | 21.90 | 61.32 | 36.41 |
|  | Video-CAL | CVPR22 | 73.31 | 31.73 | 77.34 | 45.72 | 41.50 | 25.81 | 67.48 | 38.23 |
| Baselines | GaitGL† | — | 57.04 | 27.13 | 61.22 | 27.84 | 14.51 | 4.85 | 35.13 | 16.31 |
|  | ResNet3D-50 | — | 62.80 | 23.52 | 65.12 | 29.41 | 27.35 | 14.89 | 39.89 | 19.83 |
|  | MViTv2 | — | 59.27 | 21.38 | 61.40 | 25.31 | 21.89 | 12.79 | 37.31 | 17.80 |
|  | ARNet fours) | — | 77.0 | 3764 | 81.44 | 51.79 | 44.82 | 28.78 | 68.31 | 38.83 |

View+ evaluation protocol.
†this model was trained on silhouettes.

from a certain activity. Here for each actor there are multiple activity samples, and each activity again has different viewpoint or setup variation (for NTU RGB-AB and PKU MMD-AB). The samples are randomly selected for gallery and probe sets. For NTU RGB-AB and PKU MMD-AB two variations are checked probe view included in gallery (View+) and probe view excluded from gallery (View-) in case of both same activity and cross activity protocol. However, since Charades and ACC-MM1-Activities does not contain multiple view points, the evaluation protocol Similar to the quantitative comparisons presented in the main paper, in case of cross-activity evaluation protocol as well, ABNet outperforms all the existing methods and baselines by a competitive margin in terms of both evaluation metrics. This shows the robustness of our method against same or cross activity evaluation.

Ablations on cross-activity evaluation protocol. Table 9 illustrates the effect of each component of our ABNet on NTU RGB-AB dataset on the cross-activity evaluation protocol.

TABLE 9

Ablation studies of each component of ABNet on NTU
RGB-AB on cross activity evaluation protocol

| | | | | View⁺ | | View⁻ | |
|---|---|---|---|---|---|---|---|
| B/L | K/D | A/P | F/D | R@1 | mAP | R@1 | mAP |
| ✓ | | | | 62.80 | 23.52 | 61.71 | 21.41 |
| ✓ | ✓ | | | 66.90 | 23.94 | 63.03 | 22.01 |
| ✓ | | ✓ | | 66.24 | 23.81 | 64.61 | 22.48 |
| ✓ | ✓ | ✓ | | 69.21 | 31.01 | 66.41 | 30.43 |
| ✓ | ✓ | | ✓ | 74.33 | 33.79 | 72.85 | 31.68 |
| ✓ | ✓ | ✓ | ✓ | 77.01 | 37.64 | 76.43 | 36.14 |

This table is an extension of Table 4 supra and similar to the same-activity evaluation protocol, the performance of the model remains stable in case of cross-activity and also each modification component gives a performance boost to the model, which finally contributes to the overall model's performance. Now, some activities might be easier to recognize and hence, we perform an experiment on top 5 best and top 5 worst performing activities with and without the activity prior (AP) to see whether the easily recognizable activities introduce any bias through the activity information.

In FIG. 11a-d we see that the performance pattern remains consistent across activities with or without AP which indicates that AP consistently helps and the difficulty level of activities do not introduce any bias. The bar plot on left axis shows rank 1 identification accuracy for given activity of ABNet against baseline PKU MMD-AB (11a), Charades AB (11b), ACC-MM1-Activities (11c) and BRIAR-BGC3 (11d) datasets. The scatter plot with markers on right axis shows activity recognition accuracy for corresponding classes.

Figure 8:
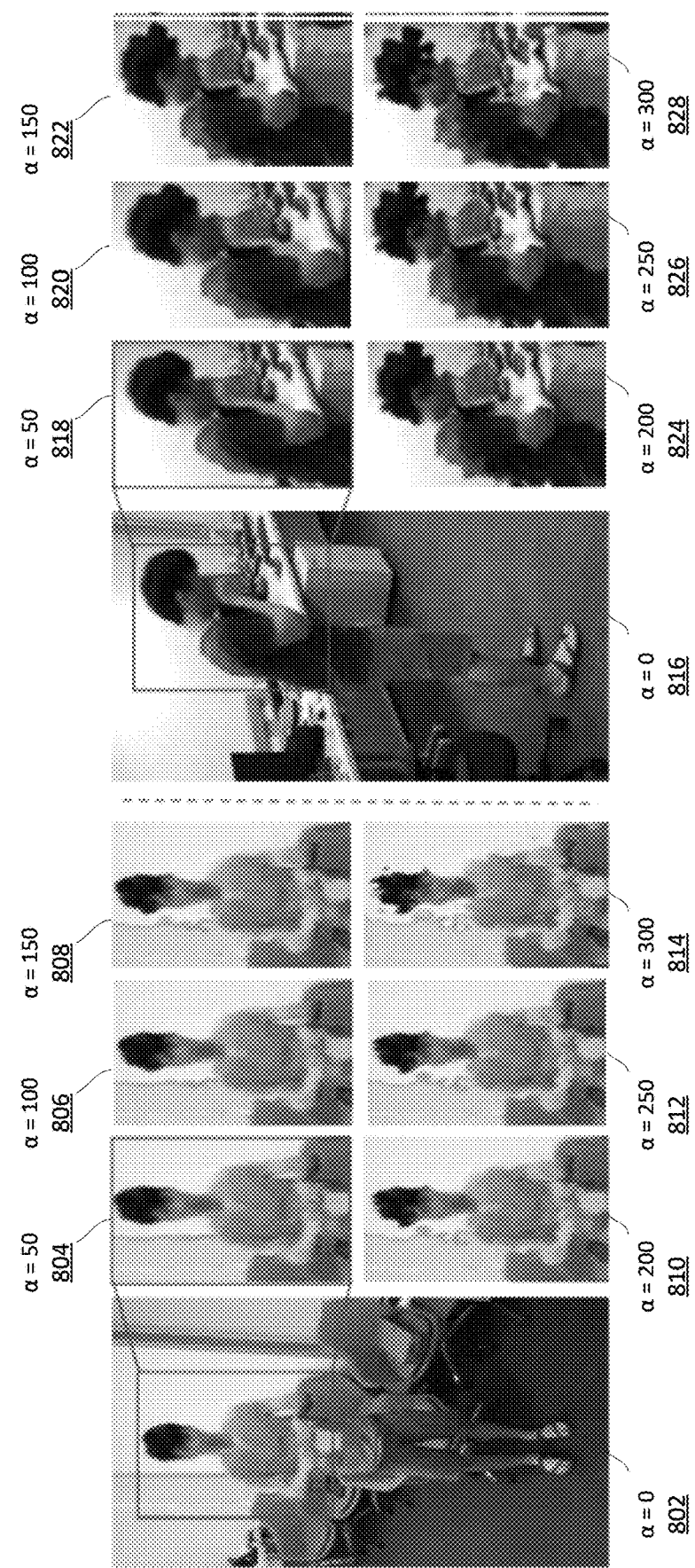
FIG. 8 shows the effect of distortion amount on original samples, zoomed in to illustrate the impact of varying distortion levels ($\alpha$=50, 100, 150 at the top, and $\alpha$=200, 250, 300 at the bottom), demonstrating increasing distortion with higher a values.

Effect of distortion. Table 10 reports the effect of distortion on cross-activity evaluation protocol on the NTU RGB-AB dataset which is an extension of Table 5 supra. In FIG. 8 two representative clips are depicted to illustrate the progressive impact of elastic-transform distortion on visual quality. The left-hand column shows an undistorted reference frame 802 followed, in the upper row, by enlargements of the same head-and-torso region after distortion magnitudes $\alpha=50$, 100, 150, indicated respectively at 804, 806, and 808. Corresponding enlargements for larger magnitudes $\alpha=200$, 250, 300 appear beneath 810, 812, and 814. As the value of a increases, background structure becomes increasingly fluid and limb boundaries exhibit water-like warping; nevertheless, at $\alpha=250$ (panel 812) clothing texture and color remain discernible, permitting the appearance branch to regard panel 812 as a positive sample while the biometric branch must treat it as a hard negative. At $\alpha=300$ (panel 814) the subject's body shape becomes so severely distorted that even coarse limb proportions are obscured, rendering the sample unsuitable for effective bias learning.

The same progression is reproduced for a second subject in the right-hand half of the figure. An undistorted frame 816 precedes zoomed crops at $\alpha=50$ (818), $\alpha=100$ (820), and $\alpha=150$ (822) in the upper row, with $\alpha=200$ (824), $\alpha=250$ (826), and $\alpha=300$ (828) beneath. Visual inspection confirms the trend observed in the first example: moderate distortion up to $\alpha\approx 250$ perturbs biometric outline while preserving garment detail, whereas distortion at $\alpha=300$ obliterates identity-bearing morphology. These qualitative observations support the quantitative selection of $\alpha=250$ as the optimal operating point for the distortion loss described with respect to FIG. 4.

Figure 9:
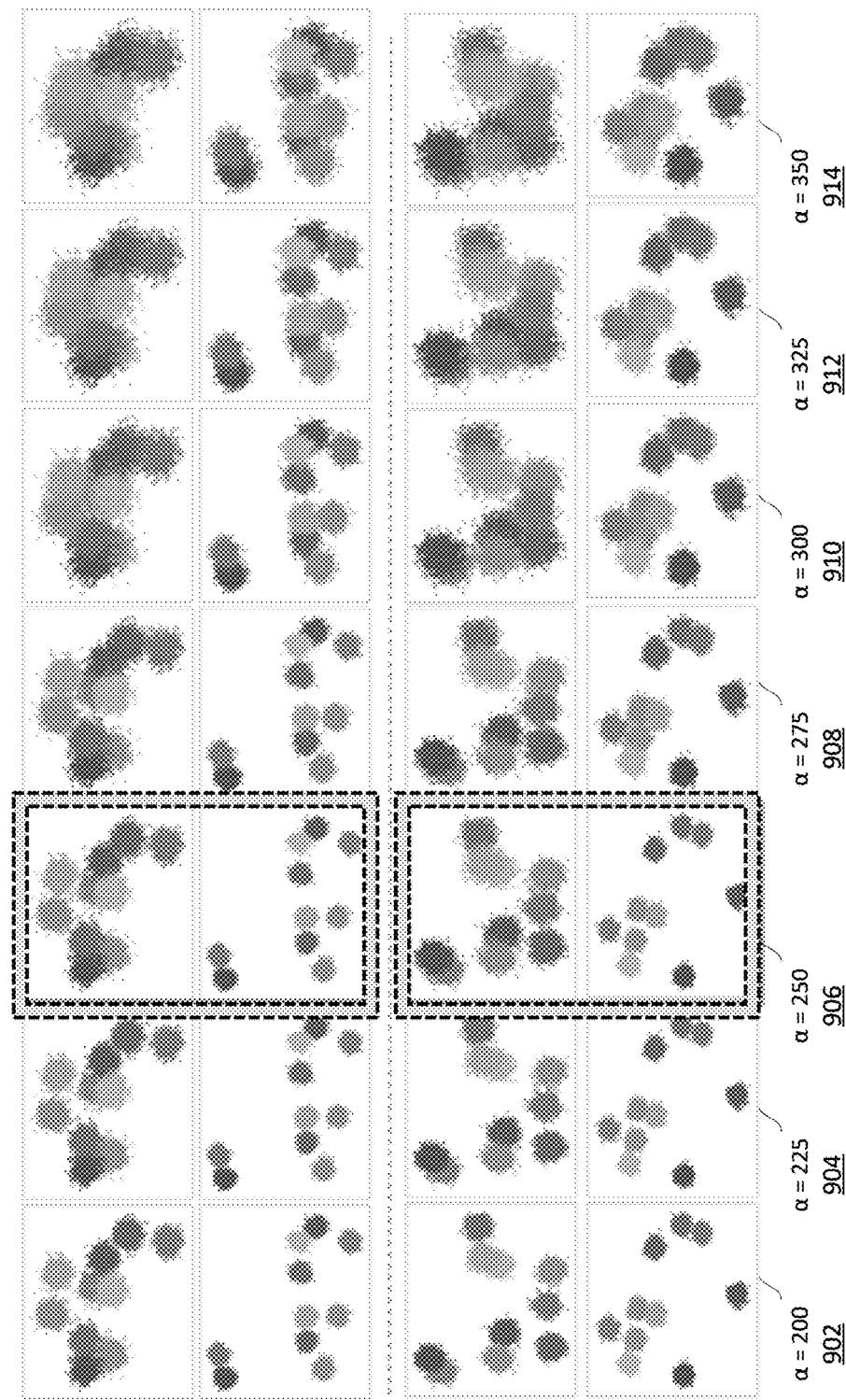
FIG. 9 shows the effect of distortion on feature space with t-SNE plots illustrating the impact of varying distortion amounts on biometric (top) and appearance (bottom) features of ABNet for Charades-AB and BRIAR-BGC3 datasets, highlighting the optimal distortion level at $\alpha$=250.

FIG. 9 depicts two independent t-SNE projections that quantify the influence of distortion magnitude a on the learned embedding for ten randomly selected identities in the Charades-AB benchmark (upper half of the figure) and ten identities in the BRIAR-BGC3 benchmark (lower half of the figure). For each benchmark, successive columns correspond to $\alpha=200$ (902), $\alpha=225$ (904), $\alpha=250$ (906), $\alpha=275$ (908), $\alpha=300$ (910), $\alpha=325$ (912), and $\alpha=350$ (914). Within every panel the light-gray points denote appearance embeddings and the dark points denote biometric embeddings.

At the leftmost distortion setting 902 the biometric clusters are beginning to contract, yet the appearance clusters remain compact and well separated. A moderate increase to 904 continues this trend, reducing intra-identity biometric variance while preserving clear garment-based groupings. When the distortion reaches 906 the desired balance is achieved; biometric embeddings from different subjects have collapsed into a single confluent region that furnishes strong negative supervision, whereas the appearance embeddings still form discrete, clothing-driven islands. Columns 908, 910, 912, and 914 demonstrate that additional warping degrades appearance cohesion: at 908 slight mixing appears, at 910 the overlap becomes pronounced, and by 912-914 both biometric and appearance distributions lose separability, indicating that excessive geometric perturbation corrupts the positive-pair signal needed for effective disentanglement.

Because the same qualitative crossover point occurs in both the Charades-AB and BRIAR-BGC3 rows, the data confirm that $\alpha\approx 250$ is a robust operating point across markedly different recording conditions. Distortion levels beyond that threshold erode the distinction between clothing-specific vectors and identity-specific vectors, validating the choice of $\alpha=250$ adopted for the experiments reported earlier.

TABLE 10

Effect of distortion on model performance for NTU RGB-AB on
the cross activity evaluation protocol

| | View⁺ | | View⁻ | |
|---|---|---|---|---|
| Distortion amount | R@1 | mAP | R@1 | mAP |
| $\alpha = 200$ | 75.91 | 37.04 | 75.12 | 35.83 |
| $\alpha = 250$ | 77.01 | 37.64 | 76.43 | 36.14 |
| $\alpha = 300$ | 72.70 | 29.01 | 71.03 | 28.94 |

TABLE 11

Effect of face restriction on model performance for NTU RGB-AB
on cross activity evaluation protocol

| | View⁺ | | View⁻ | |
|---|---|---|---|---|
| Face Restricted | R@1 | mAP | R@1 | mAP |
| Yes | 77.01 | 37.64 | 76.43 | 36.14 |
| No | 77.70 | 39.01 | 76.98 | 38.84 |

TABLE 12

Activity recognition performance of different datasets on ABNet.
x-sub and x-view respectively denote cross-subject and cross-view
evaluation protocols for its corresponding dataset, if applicable.

| Dataset | x-sub | x-view |
|---|---|---|
| NTU RGB-AB | 88.71 | 89.50 |
| PKU MMD-AB | 91.42 | 94.21 |
| Charades-AB | 41.31 | — |
| ACC-MM1-Activities | 71.08 | — |
| BRIAR-BGC3 | 79.31 | — |

Effect of face restriction on cross-activity evaluation protocol is reported in Table 11 on the NTU RGB-AB dataset. Similar to the results reported supra, even in case of the cross-activity evaluation protocol, the model performance remains stable even when faces are restricted showing the learning of non-facial cues across cross-activity evaluation protocol.

Choice of backbone. The performance comparison of different backbone networks is shown in Table 13, where the backbone model takes the silhouette/RGB video frames as input respectively for the teacher/student network for the task of person identification. Here this experiment is run only on the baseline where none of the modification components are present. This selection of backbones ensures that the teacher network contributes its expertise to the specific task it is designed for in the student network. Moreover, similar to existing recent work in person identification, in our case also CNN based backbones outperform transformer based ones. From this experiment, we pick the best performing backbone for both networks.

TABLE 13

Choice of Backbone. Performance comparison of different backbones on NTU RGB-AB.

| | | Same activity | | | | Cross activity | | | |
|---|---|---|---|---|---|---|---|---|---|
| | | View+ | | View− | | View+ | | View− | |
| Network | Backbone | R@1 | mAP | R@1 | mAP | R@1 | mAP | R@1 | mAP |
| Teacher | GaitGL | 61.51 | 28.89 | 57.78 | 26.78 | 57.04 | 27.13 | 55.80 | 26.41 |
| | GaitPart | 54.79 | 16.73 | 53.93 | 15.91 | 52.18 | 15.01 | 46.89 | 13.84 |
| | GaitBase | 60.21 | 28.02 | 59.04 | 26.76 | 59.90 | 26.31 | 57.91 | 25.96 |
| Student | MVIT v2 | 63.87 | 26.41 | 61.01 | 23.81 | 59.27 | 21.38 | 59.16 | 20.01 |
| | VIVIT | 58.81 | 20.41 | 57.10 | 16.42 | 57.30 | 12.41 | 52.01 | 9.68 |
| | Swin | 59.20 | 21.68 | 58.41 | 19.41 | 58.70 | 16.91 | 54.31 | 11.47 |
| | ResNet3D-50 | 64.23 | 26.89 | 62.10 | 22.45 | 62.80 | 23.52 | 61.71 | 21.41 |
| | ResNet3D-34 | 63.90 | 25.93 | 60.45 | 21.87 | 60.21 | 22.74 | 59.79 | 20.47 |

Performance of action recognition. Table 12 reports the performance of ABNet on activity recognition results for different datasets. Here the reported evaluation metric is accuracy on cross-subject and cross-view evaluation protocol. NTU RGB-AB and PKU MMD-AB are evaluated on these two protocols, however, since there is no explicit view information for rest of the three datasets, the accuracies are reported in terms of cross-subject because the test and train split contains mutually exclusive actors/subjects.

FIGS. 11a-d compare ABNet and the baseline across the top five best and bottom five worst performing activities in person identification for PKU MMD-AB (11a) and Charades (11b). The bottom row shows person identification performance across all 7 activities of the ACC-MM1-Activities dataset (11c) and all 3 activities of BRIAR-BGC3 dataset (11d). The bar plot on left axis shows rank 1 identification accuracy for given activity of ABNet against baseline PKU MMD-AB (11a), Charades AB (11b), ACC-MM1-Activities (11c) and BRIAR-BGC3 (11d) datasets. The scatter plot with markers on right axis shows activity recognition accuracy for corresponding classes. It is observed that activities with minimal overall body movement pose greater challenges for individual identification, whereas more overall body movement contribute to higher person identification accuracy. This highlights the significance of incorporating activity prior in our model. Moreover, it also emphasizes the importance of activity cues demonstrating the efficacy of our joint training approach in effectively learning such cues.

Accuracy of silhouette extractor and effectiveness of silhouettes. The accuracy of the silhouette extraction process will indeed affect model's performance and to explore that we perform an experiment using Grounded-SAM which is an open-world segmentation model. The results are reported on a small subset (10 action classes) of the NTU-RGB-AB dataset on the same activity View+ setting in Table 14.

TABLE 14

Performance with varying silhouette extractors

| Silhouette extractor | Rank 1 | mAP |
|---|---|---|
| Mask2Former | 85.2 | 87.3 |
| Grounded-SAM | 87.8 | 88.5 |

It is observed that with Grounded-SAM as silhouette extractor the performance does go up, which can be attributed to it being an open-world model and thus being more robust. Similarly, a 3% rank 1 accuracy gain is seen in case of a small subset of the Charades-AB dataset when using Grounded-SAM as opposed to Mask2Former. Nevertheless, even with a weaker silhouette extractor our model still performs well and since this extraction process is not part of the inference stage, training the model with a better silhouette extractor will provide some benefits. The main motivation behind using silhouette features is to distill appearance-less knowledge, e.g. purely biometrics information that not only contains gait; but also pose, body shape, structure etc information to aid disentanglement. The recognition performance of the two decoupled features is reported in Table 15 for the Charades-AB dataset.

TABLE 15

Performance of disentangled features

| Feature | Rank 1 | mAP |
| --- | --- | --- |
| Biometrics | 45.8 | 31.6 |
| Non-biometrics | 2.8 | 0.4 |
| Biometrics w/ distorted sils | 21.4 | 10.5 |

The huge performance gap between the biometrics and non-biometrics features shows that the non-biometrics features do not have meaningful information to perform person identification; essentially proving the effectiveness of the disentanglement process. To demonstrate the effectiveness of using silhouette features in our method, we distort the silhouettes and distill that knowledge to the biometrics features, which resulted in a huge performance drop (about 24%) (row 3 of Table 15). This shows that even in case of activities beyond walking, the silhouette-based biometrics features contribute to a great extent in accurate recognition. We specifically select the Charades-AB dataset for this experiment as it is a real-world dataset encompassing a diverse range of appearance variations.

Figure 10:
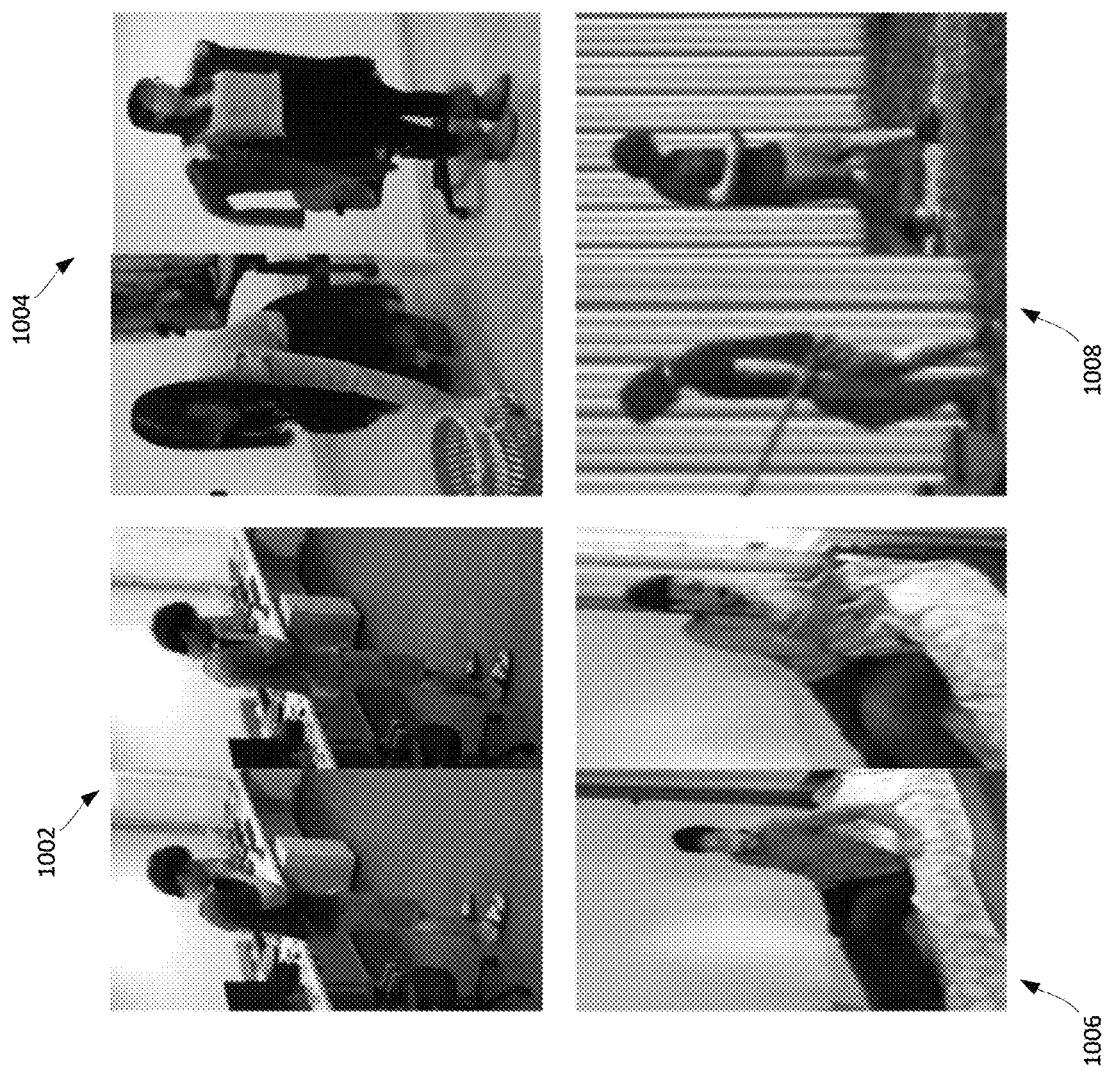
FIG. 10 shows dataset samples with each pair of images displaying different hue shifting values for the same video from NTU RGB-AB (top-left), PKU MMD-AB (top-right), Charades-AB (bottom-left), and ACC-MM1-AB (bottom-right), with all faces blurred.
Figure 11A:
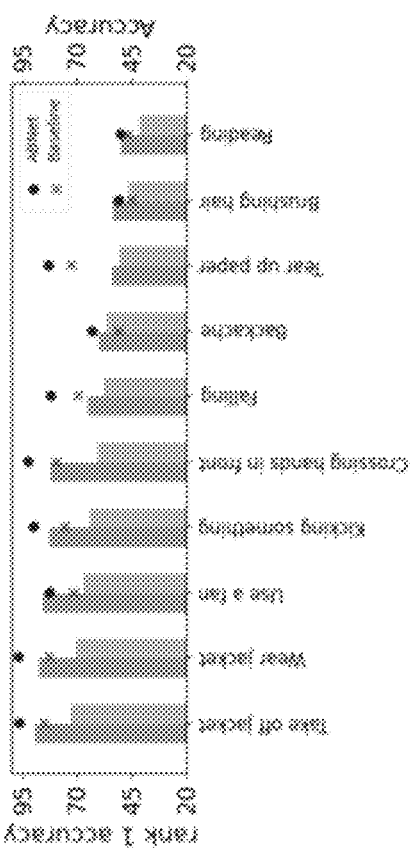
FIG. 11a shows performance analysis across activities for the PKU MMD-AB dataset, with a bar plot on the left axis indicating rank 1 identification accuracy of ABNet against the baseline, and a scatter plot on the right axis representing activity recognition accuracy for corresponding classes.
Figure 11B:
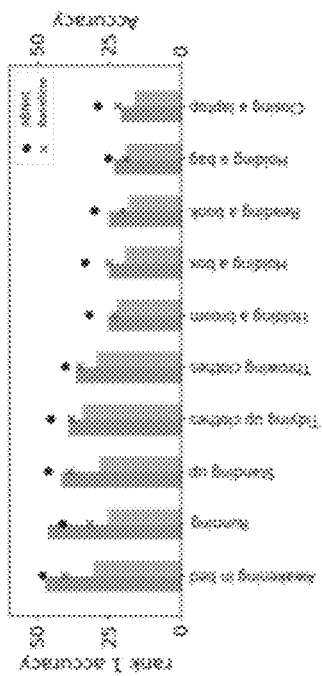
FIG. 11b shows performance analysis across activities for the Charades-AB dataset, with a bar plot on the left axis indicating rank 1 identification accuracy of ABNet against the baseline, and a scatter plot on the right axis representing activity recognition accuracy for corresponding classes.
Figure 11C:
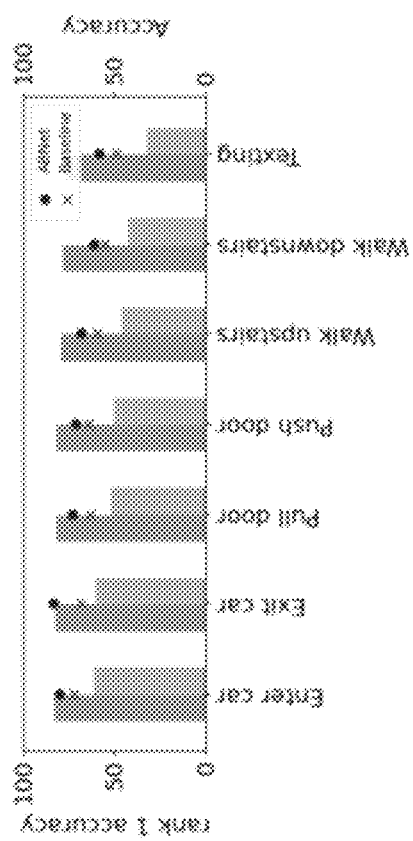
FIG. 11c shows performance analysis across activities for the ACC-MM1-Activities dataset, with a bar plot on the left axis indicating rank 1 identification accuracy of ABNet against the baseline, and a scatter plot on the right axis representing activity recognition accuracy for corresponding classes.
Figure 11D:
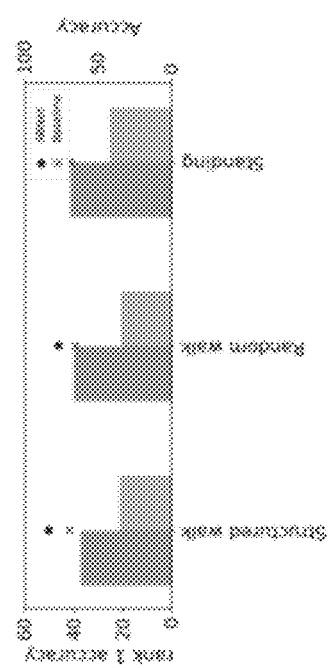
FIG. 11d shows performance analysis across activities for the BRIAR-BGC3 dataset, with a bar plot on the left axis indicating rank 1 identification accuracy of ABNet against the baseline, and a scatter plot on the right axis representing activity recognition accuracy for corresponding classes.

Qualitative analysis. FIG. 10 presents representative frame pairs after application of the hue-shifting augmentation described above. In exemplar set 1002, two frames of the same NTU RGB-AB sequence are shown after independent hue rotations; although geometry and pose are identical, the chromatic rendition of the flooring, walls, and clothing varies markedly, forcing the encoder to ignore color while preserving motion cues. Exemplar set 1004 depicts frames from the PKU MMD-AB corpus in which the subject is bending and then donning a jacket; again, the global hue offset differs between frames, demonstrating that the augmentation preserves temporal continuity while decorrelating appearance. Exemplar set 1006 originates from the indoor Charades-AB dataset and shows the subject lying down and then reaching forward; the hue-shift produces divergent bedding and shirt tones without altering edge structure. Exemplar set 1008 comes from the outdoor BRIAR-BGC3 benchmark, where consecutive walking frames exhibit distinct sky and façade coloration, illustrating that the technique remains effective under natural illumination.

Figure 12B:
FIG. 12b shows top 4 rank retrieval samples for ABNet on the Charades-AB dataset, with probe samples in the leftmost column and retrieved samples in the following four columns, highlighting accurate retrievals in green and inaccurate ones in red.
Figure 12D:
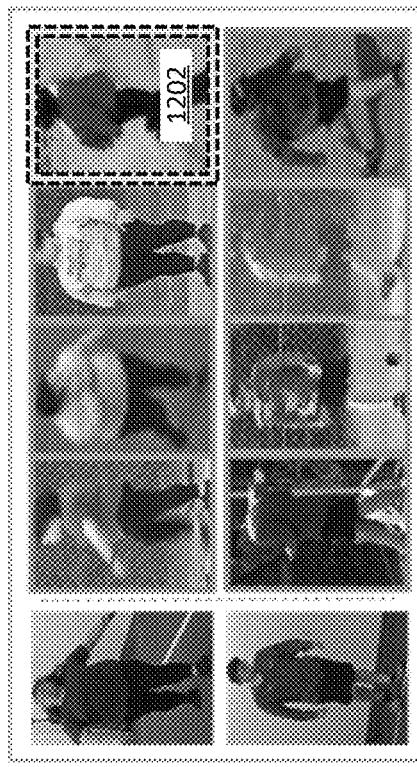
FIG. 12d shows top 4 rank retrieval samples for ABNet on the BRIAR-BGC3 dataset, with probe samples in the leftmost column and retrieved samples in the following four columns, highlighting accurate retrievals in green and inaccurate ones in red.
Figure 12A:
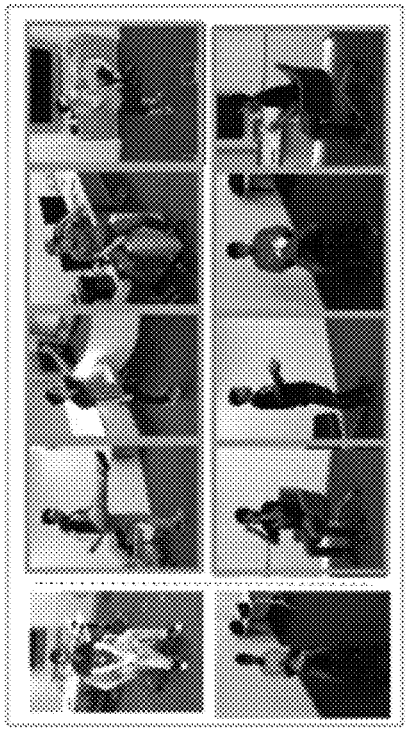
FIG. 12a shows top 4 rank retrieval samples for ABNet on the NTU RGB-AB dataset, with probe samples in the leftmost column and retrieved samples in the following four columns, highlighting accurate retrievals in green and inaccurate ones in red.
Figure 12C:
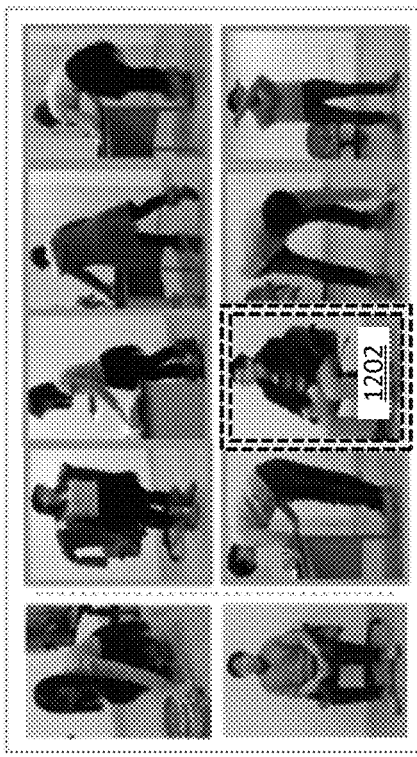
FIG. 12c shows top 4 rank retrieval samples for ABNet on the PKU MMD-AB dataset, with probe samples in the leftmost column and retrieved samples in the following four columns, highlighting accurate retrievals in green and inaccurate ones in red.

The quantitative impact of the augmentation is demonstrated in FIGS. 12a-12d. In each sub-figure the left-most column contains a probe clip that has been subjected to a random hue rotation, and the four columns to the right display the highest-ranked gallery matches returned by the model for NTU RGB-AB (FIG. 12a), Charades-AB (FIG. 12b), PKU MMD-AB (FIG. 12c), and BRIAR-BGC3 (FIG. 12d). Correct identity retrievals are outlined with a dashed border, while any incorrect retrieval is marked with reference numeral 1202. Across all four datasets the network retrieves the correct individual in most cases, even when the gallery clips exhibit markedly different color statistics from the probe. Misidentifications indicated by 1202 remain isolated and do not cluster around any particular hue offset, underscoring that the model has learned to ignore superficial chromatic variation. These results, together with the qualitative evidence in FIG. 10, confirm that the hue-shifting augmentation effectively suppresses color-based bias without compromising the motion and shape information required for reliable person identification.

Some of the failure cases is seen for having difficulty performing accurate retrieval due to the absence of a lot of overall body movement (e.g. probe activity is sitting in first sample of Charades-AB and second sample of PKU MMD-AB). Moreover, another failure case is seen in case of the second sample of Charades-AB which shows the inherent challenges present in the dataset, e.g. data quality, no standard way of performing an activity etc. Despite these challenges, from the figure it is observed that accurate retrieval is done in most cases irrespective of viewpoint, activity and appearance, which shows the effectiveness of ABNet. The left most columns for each dataset samples hold the probe samples and the following four columns to that probe are its retrieval list. Accurate retrieval is shown with green box and inaccurate with red.

Disentangling Q-Former (DisenQ).

The disclosed system incorporates a Disentangling Q-Former (DisenQ) module to achieve improved visual-language feature alignment and disentanglement. DisenQ leverages a multi-query attention mechanism to isolate different types of features from the visual input.

Visual feature extraction. Given a sequence of frames from a video V, each frame $v_i \in \mathbb{R}^{H \times W \times 3}$, where H and W represent its height and width, is processed through a visual encoder to extract visual features $f_i \in \mathbb{R}^{N \times D}$. Here, N denotes the number of extracted visual tokens per frame, and D is the hidden dimension of each token. Here, each visual feature $f_i$ has temporal ordering information associated with it through a position embedding layer. Finally, temporal attention pooling is applied on all frame features to get a global video-level feature F.

Prompt generation and textual feature extraction. To generate structured and semantically consistent language description, we use a frozen VLM to generate prompts from the key-frame of the input video during only training, without requiring the VLM during inference. These descriptions are categorized into three distinct components following pre-defined templates: Biometrics prompt ($P_b$), describing identity-specific traits such as body shape, posture, and notable physical characteristics; Motion prompt ($P_m$) describing the action label and movement; and Non-biometrics ($P_{\hat{b}}$), describing clothing, and accessories. To maintain consistency, biometrics descriptions are generated only once per unique identity and reused in all subsequent videos of the same actor by storing and iteratively refining it by updating the stored description using a running average. This prevents major description drift and ensures stable identity representation across varied activities and appearances.

The generated prompts are then encoded using a pre-trained frozen text-encoder to obtain textual embeddings ($T_b$, $T_m$, $T_{\hat{b}}$) which serve as language-driven supervision for visual feature disentanglement. DisenQ separates biometrics, motion and non-biometrics features in the visual domain by aligning visual representations with structured textual cues. Adapted from the original Q-Former, DisenQ introduces three separate sets of learnable queries: $z_b$ (biometrics), $z_m$ (motion) and $z_{\hat{b}}$ (non-biometrics); instead of a single query set, enabling explicit disentanglement. Each query set shares the same self-attention and cross-attention layers while leveraging textual guidance, ensuring effective feature separation. However, they explicitly attend to different information without interaction, preserving distinct feature representations for biometrics, motion and non-biometrics. The learned queries are then utilized for activity-based person identification, improving the model's ability to distinguish individuals based on biometrics while leveraging motion cues and remaining invariant to non-biometrics attributes.

Biometrics feature disentanglement. To extract identity-related features, the biometrics query $z_b$ attends to itself through self-attention to refine itself. Then the refined query performs cross-attention with the visual feature F and biometrics textual supervision features $T_b$ with query, key and value being used as Equation 7.

$$Q_b = Wz_b, K_b = W[F,T_b], V_b = W[F,T_b]. \quad (7)$$

Here, $[F, T_b]$ denotes concatenation of F and $T_b$, followed by a linear projection.

Motion feature disentanglement. To extract motion-specific representations, the motion query $z_m$, similar to biometrics query $z_b$, first undergoes self-attention, ensuring it refines motion-related patterns independently. Subsequently, the motion query cross-attends to the visual feature F and its corresponding textual feature $T_m$ with query, key and value acting as Equation 8.

$$Q_m = Wz_m, K_m = W[F,T_m], V_m = W[F,T_m]. \quad (8)$$

Non-biometrics feature disentanglement. To separate non-biometrics features, the non-biometrics query $z_{\hat{b}}$ similar to others, also, first undergoes self-attention, refining itself without influence from other feature categories. Following this, the non-biometrics queries cross-attend to the visual feature F and non-biometrics textual feature $T_{\hat{b}}$ with query, key and value acting as Equation 9.

$$Q_{\hat{b}} = Wz_{\hat{b}}, K_{\hat{b}} = W[F,T_{\hat{b}}], V_{\hat{b}} = W[F,T_{\hat{b}}]. \quad (9)$$

The learned query embeddings $z_b$, $z_m$ and $z_{\hat{b}}$ go through mean pooling to form single vectors, denoted as $F_b$, $F_{\hat{b}}$, and $F_m$ among which only $F_b$ and $F_m$ is used for final identification.

Loss Functions. During training, the model is optimized to refine $F_b$ using a combination of standard cross-entropy ($L_{ID}$), and triplet loss ($L_{Tri}$) following [3, 17]. These losses are defined as Equation 10 and Equation 11.

$$L_{ID} = -y \log \hat{y} \cong L_{Act}, \quad (10)$$

$$L_{Tri} = \max(D(F_b^a, F_b^p) - D(F_b^a, F_b^n) + m, 0), \quad (11)$$

Here, y and ŷ denote the ground truth and predicted labels. $F_b^p$ and $F_b^n$ represent the positive and negative biometrics features for an anchor biometrics feature $F_b^a$ within the same batch. D(•) computes the Euclidean distance, and m is the margin in the triplet loss.

Since the motion feature $F_m$ contributes to identity recognition, it is explicitly trained to preserve motion-related information while remaining independent of biometrics attributes. The model is optimized for $F_m$ using the cross-entropy loss ($L_{Act}$) of Equation 10.

Furthermore, to reinforce the independence of biometrics and non-biometrics features, an orthogonality constraint is imposed between $F_b$ and $F_{\hat{b}}$ as Equation 12.

$$L_{Orth} = \|F_b^T F_{\hat{b}}\|. \quad (12)$$

The overall loss function is defined as Equation 13.

$$L = \lambda_1 L_{ID} + \lambda_2 L_{Tri} + \lambda_3 L_{Orth} + \lambda_4 L_{Act}. \quad (13)$$

Here, $\lambda_{i \in 1, \ldots, 4}$ is weighting factor for each loss term.

Identity Similarity Computation. To enhance identity matching, we introduce an adaptive weighting mechanism that integrates motion features into the similarity calculation, unlike traditional methods that rely solely on biometrics. Instead of fixed weights, we use a lightweight MLP to dynamically adjust the contribution of biometrics and motion features based on their relevance. Given a probe identity A and gallery identity B, we compute cosine similarities for both biometrics and motion features, concatenate them, and pass them through the MLP with ReLU activations and a softmax function. This enables the model to leverage motion cues to guide biometrics matching, prioritizing motion when it provides meaningful identity information and relying more on biometrics when motion cues are less discriminative. The final similarity score is computed as Equation 8.

$$Sim(A,B) = \alpha_1 Sim_b(A,B) + \alpha_2 Sim_m(A,B). \quad (14)$$

Here, $\alpha_{i \in 1,2}$ are the weighing factors. Inference. DisenQ operates without textual supervision during inference, relying solely on the learned query embeddings acquired during training. It utilizes self-attention to retain query-specific information and cross-attention to extract relevant visual features, ensuring effective disentanglement of biometrics, non-biometrics and activity features purely from visual embeddings.

Datasets. We evaluate our model on NTU RGB-AB, PKU MMD-AB, and Charades-AB, following previous work. NTU RGB-AB consists of 106 actors performing 94 actions across 88.7 k samples, while PKU MMD-AB includes 66 actors, 41 actions, and 17 k samples. Charades-AB features 267 actors with 157 actions across 9.8 k videos, averaging 6.8 activities per video. To assess the generalization capability of our model on more challenging real-world scenarios, we evaluate it on MEVID, which includes 158 actors and 8 k tracklets, incorporating greater viewpoint, distance, and lighting variations, making it a more complex benchmark for video-based identification.

Evaluation Protocol and Metrics. We follow the same evaluation protocol and dataset splits as previous work for NTU RGB-AB, PKU MMD-AB, and Charades-AB, employing two evaluation protocols: same-activity and cross-activity. Additionally, due to view information explicitly being available for NTU RGB-AB and PKU MMD-AB, we evaluate including and excluding same-view settings too. For MEVID, we use the official protocol and splits. We report rank 1, rank 5 accuracies, and mAP as evaluation metrics.

We use 8 frames which are randomly selected with a stride of 4 from each original video to create an RGB clip. Each frame is resized to 224×224 and horizontal flipping is used for data augmentation, following prior methods. We use pre-trained VIT G/14 from EVA-CLIP as the visual encoder and BERT as the frozen text encoder. Additionally, we use LLaVA 1.5 7B as the frozen VLM to generate prompts. We initialize DisenQ with pre-trained weights from InstructBLIP. We train the model for 60 epochs with a batch size of 32, each batch containing 8 persons and 4 clips per person. AdamW is used as the optimizer with weight decay of 5e-2 and base learning rate of 1e-4 with β values as [0.9, 0.999]. The triplet loss margin m is set to 0.3, and λ values in Equation 13 are set as 0.01.

Performance on activity-biometrics benchmarks. Table 16 presents the performance comparison of our framework against other existing methods. Across all datasets, our model outperforms the previous best-performing approach, improving Rank-1 accuracy and mAP across all evaluation protocols on NTU RGB-AB, PKU MMD-AB, and Charades-AB. Notably, we observe an average Rank-1 accuracy improvement of 3.7%, 2.4%, and 3.9% respectively on NTU RGB-AB, PKU MMD-AB, and Charades-AB, demonstrating the effectiveness of our approach.

TABLE 16

| Methods | Venue | NTU RGB-AB | | | | PKU MMD-AB | | | | Charades-AB | | | |
| --- | --- | --- | --- | --- | --- | --- | --- | --- | --- | --- | --- | --- | --- |
| | | Same | | Cross | | Same | | Cross | | Same | | Cross | |
| | | R@1 | mAP | R@1 | mAP | R@1 | mAP | R@1 | mAP | R@1 | mAP | R@1 | mAP |
| Models with only visual modality | | | | | | | | | | | | | |
| TSF | AAAI 20 | 71.8 | 31.8 | 67.8 | 26.9 | 76.4 | 37.5 | 71.6 | 33.2 | 35.4 | 21.9 | 30.2 | 19.0 |
| VKD | ECCV 20 | 67.4 | 35.6 | 66.3 | 31.5 | 78.4 | 38.5 | 72.2 | 34.3 | 36.3 | 20.7 | 31.9 | 18.8 |
| BiCnet-TKS | CVPR 21 | 72.7 | 34.5 | 69.1 | 30.2 | 80.8 | 38.5 | 77.1 | 33.3 | 40.3 | 27.3 | 38.3 | 23.3 |
| PSTA | ICCV 21 | 67.4 | 34.8 | 65.1 | 31.4 | 77.4 | 50.4 | 72.4 | 47.4 | 42.9 | 28.3 | 38.7 | 24.8 |
| STMN | ICCV 2 | 73.0 | 35.1 | 70.2 | 30.1 | 76.6 | 47.9 | 71.5 | 42.2 | 38.7 | 24.5 | 33.9 | 20.8 |
| SINet | CVPR 22 | 69.4 | 30.7 | 66.2 | 27.8 | 79.6 | 40.8 | 74.1 | 26.2 | 40.3 | 26.9 | 37.3 | 21.9 |
| CAL | CVPR 22 | 73.8 | 28.4 | 70.3 | 24.0 | 81.3 | 49.4 | 78.3 | 43.4 | 43.8 | 25.8 | 40.1 | 21.2 |
| Video-CAL | CVPR 22 | 75.5 | 39.9 | 73.3 | 31.7 | 79.6 | 49.4 | 77.3 | 45.7 | 43.9 | 28.5 | 41.5 | 25.8 |
| PSTR | CVPR 22 | 69.1 | 34.1 | 68.3 | 32.5 | 84.3 | 47.5 | 78.0 | 41.2 | 37.2 | 24.7 | 35.1 | 20.3 |
| AIM | CVPR 23 | 71.4 | 35.4 | 72.8 | 30.2 | 82.5 | 48.9 | 79.2 | 44.9 | 40.1 | 28.3 | 35.6 | 26.7 |
| SCNet | ACM MM 23 | 69.9 | 31.5 | 68.8 | 26.3 | 79.5 | 43.6 | 73.9 | 39.7 | 31.7 | 21.9 | 27.4 | 17.6 |
| ABNet | CVPR 24 | 78.8 | 40.3 | 77.0 | 37.6 | 86.8 | 57.3 | 81.4 | 51.8 | 45.8 | 31.6 | 44.8 | 28.8 |
| Models with visual + language modality | | | | | | | | | | | | | |
| CLIP ReID | AAAI 23 | 77.1 | 40.2 | 75.2 | 33.7 | 82.3 | 52.1 | 81.2 | 50.8 | 44.2 | 31.3 | 42.1 | 27.7 |
| CCLNet | ACM MM 23 | 75.2 | 36.1 | 74.3 | 33.1 | 83.2 | 51.4 | 80.1 | 47.5 | 42.1 | 29.3 | 38.8 | 23.4 |
| TF-CLIP | AAAI 24 | 77.3 | 41.2 | 74.8 | 31.3 | 83.4 | 52.3 | 80.8 | 50.1 | 40.2 | 28.1 | 39.7 | 26.0 |
| TVI-LFM | NeurIPS 24 | 76.2 | 38.1 | 75.9 | 34.1 | 85.2 | 53.9 | 81.5 | 52.1 | 45.7 | 30.1 | 42.8 | 28.3 |
| Instruct-ReID | CVPR 24 | 78.2 | 41.5 | 75.9 | 33.4 | 84.3 | 53.1 | 81.7 | 52.3 | 44.8 | 28.3 | 40.1 | 25.3 |
| EVA-CLIP | | 71.2 | 35.1 | 69.1 | 28.3 | 73.8 | 46.2 | 67.4 | 39.4 | 38.1 | 26.1 | 31.3 | 21.8 |
| Ours | | 82.2 | 43.8 | 80.9 | 41.3 | 89.2 | 59.3 | 84.1 | 56.9 | 49.9 | 34.8 | 48.4 | 32.5 |

Generalization to traditional video-based benchmark. Table 17 presents the identification results of our model compared to concurrent methods on MEVID, a large-scale traditional video-based identification dataset primarily focused on walking sequences. Unlike NTU RGB-AB, PKU MMD-AB, and Charades-AB, which contain diverse activities, MEVID lacks activity variability, making activity-based identification less impactful.

TABLE 17

| Methods | Venue | R@1 | R@5 | mAP |
| --- | --- | --- | --- | --- |
| Models with only visual modality | | | | |
| Attn-CL | AAAI 20 | 42.1 | 56.0 | 18.6 |
| Attn-CL + rerank | AAAI 20 | 46.5 | 59.8 | 25.9 |
| AP3D | ECCV 20 | 39.0 | 56.0 | 15.9 |
| TCLNet | ECCV 20 | 48.1 | 60.1 | 23.0 |
| BiCnet-TKS | CVPR 21 | 19.0 | 35.1 | 6.3 |
| STMN | ICCV 21 | 31.0 | 54.4 | 11.3 |
| PSTA | ICCV 21 | 46.9 | 60.8 | 21.2 |
| PiT | TII 22 | 34.2 | 55.4 | 13.6 |
| CAL | CVPR 23 | 52.5 | 66.5 | 27.1 |
| ShARc | WACV 24 | 59.5 | 70.3 | 29.6 |
| ABNet | CVPR 24 | 58.3 | 68.4 | 30.1 |
| Models with visual + language modality | | | | |
| CLIP ReID | AAAI 23 | 51.2 | 64.2 | 28.3 |
| CCLNet | ACM MM 23 | 50.8 | 60.3 | 27.1 |
| TVI-LFM | NeurIPS 24 | 49.2 | 61.8 | 23.7 |
| Instruct-ReID | CVPR 24 | 53.8 | 59.4 | 28.4 |
| EVA-CLIP | | 53.1 | 59.2 | 26.9 |
| Ours | | 60.7 | 70.3 | 30.4 |

Despite this, our model remains competitive, achieving a 1.2% improvement in Rank-1 accuracy. This demonstrates that while our framework is designed for activity-biometrics, it generalizes well to traditional video-based identification scenarios by effectively disentangling identity from appearance, ensuring robust performance even in real-world unconstrained settings.

Ablation Studies. We conduct ablation studies on NTU RGB-AB and Charades-AB datasets on the same activity, including same view evaluation protocol, and present the results in Table 18. While NTU RGB-AB provides a controlled setting with diverse clothing and activity variations, Charades-AB contains much more real-world complexity, including varied lighting, occlusions, and higher appearance variations, which better tests model generalization.

TABLE 18

| Method | NTU RGB-AB | | Charades-AB | |
| --- | --- | --- | --- | --- |
| | Rank 1 | mAP | Rank 1 | mAP |
| Contribution of each component | | | | |
| Vision encoder | 73.2 | 36.2 | 40.1 | 29.2 |
| + Text encoder | 77.7 | 40.6 | 46.5 | 31.8 |
| + DisenQ | 82.2 | 43.8 | 49.9 | 34.8 |
| Ablation of different type of feature disentanglement | | | | |
| No disentanglement | 74.2 | 38.2 | 42.3 | 29.9 |
| $F_b$ and $F_{\bar{b}}$ | 76.6 | 40.9 | 44.7 | 31.9 |
| $F_b$ and $F_m$ | 79.2 | 41.1 | 48.2 | 32.9 |
| $F_b, F_{\bar{b}}$ and $F_m$ | 82.2 | 43.8 | 49.9 | 34.8 |
| Performance of each disentangled feature | | | | |
| Biometrics | 80.4 | 43.0 | 48.1 | 32.0 |
| Non-biometrics | 3.8 | 1.2 | 1.3 | 0.1 |
| Motion | 76.3 | 39.4 | 44.2 | 27.1 |
| Biometrics + Motion | 82.2 | 43.8 | 49.9 | 34.8 |

Contribution of each component is presented in Table 18 (top). A vision encoder alone struggles due to entangled identity, appearance, and motion features leading to poor performance. Introducing text supervision via cross-attention and projecting features into distinct spaces improves identity retention by mitigating the influence of appearance variability. However, the most substantial gains come from DisenQ which explicitly separates biometrics, non-biometrics, and motion features. By aligning separate learnable queries with structured textual priors, DisenQ establishes a well-structured feature representation that significantly enhances activity-biometrics performance.

Ablation of different type of feature disentanglement, illustrated in Table 18 (middle), presents their individual impact on performance. When biometrics and non-biometrics features are disentangled, the model effectively mitigates clothing bias but struggles with variations in motion, resulting in improved yet suboptimal performance across different actions. Disentangling biometrics and motion features enhances stability by preserving identity-specific movement patterns, crucial for reliable identification across activities. The most comprehensive performance is achieved when all three feature types are disentangled, ensuring identity-related features remain distinct while controlling appearance and motion influences.

Individual performance of each disentangled feature, illustrated in Table 18 (bottom), provides further insights into their discriminative power for activity-based identification. Biometrics features alone exhibit the highest performance among each individual feature type, highlighting their intrinsic value in accurately identifying individuals. In contrast, non-biometric features significantly degrade performance, indicating that our disentanglement was effective in removing identity-related information from this feature space. Motion features offer moderate performance, providing additional context but lacking the distinctiveness of biometric attributes. The synergy between biometric and motion features yields the most effective results, leveraging both identity cues and dynamic movement patterns for robust identification across challenging scenarios.

Effect of disentanglement on feature space. FIG. 17 visualizes the latent-feature distribution obtained under three successive ablation settings so as to demonstrate the contribution of the Disentangling Q-Former. The upper panel shows the baseline encoder with no disentanglement; biometric tokens, non-biometric tokens, and motion tokens are all drawn with identical circular glyphs, and the plot exhibits an amorphous cloud with extensive intermixing of subjects. In this condition biometric information is contaminated by clothing color and instantaneous pose, preventing reliable identity clustering.

The center panel corresponds to a naïve "projection-only" approach that appends fixed cross-attention to the encoder but omits prompt guidance. Three marker types are introduced-solid circles for biometric vectors, crosses for non-biometric vectors, and triangles for motion vectors-yet even with this coarse separation, biometric samples remain interspersed with non-biometric clusters whenever two individuals wear similar garments or perform the same pose. The result is an ineffective disentanglement in which identity cues are still confounded by appearance bias.

The lower panel depicts the proposed architecture with full DisenQ supervision. Here biometric embeddings form tight, well-defined clusters 1702 circled in dashed lines; the clusters are compact and mutually exclusive, indicating that identity information has been isolated from all nuisance factors. Non-biometric embeddings 1705 congregate in their own regions, reflecting garment texture and background cues but showing no correlation with the biometric clusters. Motion embeddings 1704 occupy a third portion of the space, grouping by action class rather than by identity or clothing. The clear geometric separation among 1702, 1705, and 1704 verifies that DisenQ enforces orthogonality between the three feature sub-spaces, thereby eliminating appearance-induced false matches while simultaneously preserving motion semantics for activity awareness.

Impact of design choice for disentanglement. We explore different architectural variations of DisenQ to evaluate the trade-off between complexity and effectiveness. A variant using three independent Q-Formers—each learning biometrics, non-biometrics, or motion features separately—yields only a marginal 0.23% Rank-1 accuracy gain on NTU RGB-AB while tripling the parameter count, suggesting that our original design is already sufficient for disentanglement. To test whether additional parameters could still be beneficial, a deeper DisenQ variant with the same parameter count as the three-Q-Former setup results in a 3.8% drop due to overfitting, indicating that simply increasing model capacity does not guarantee better feature separation. These findings highlight that structured learning is more critical than model size, and our DisenQ architecture strikes an optimal balance between effectiveness and computational cost for activity-based person identification.

Figure 18:
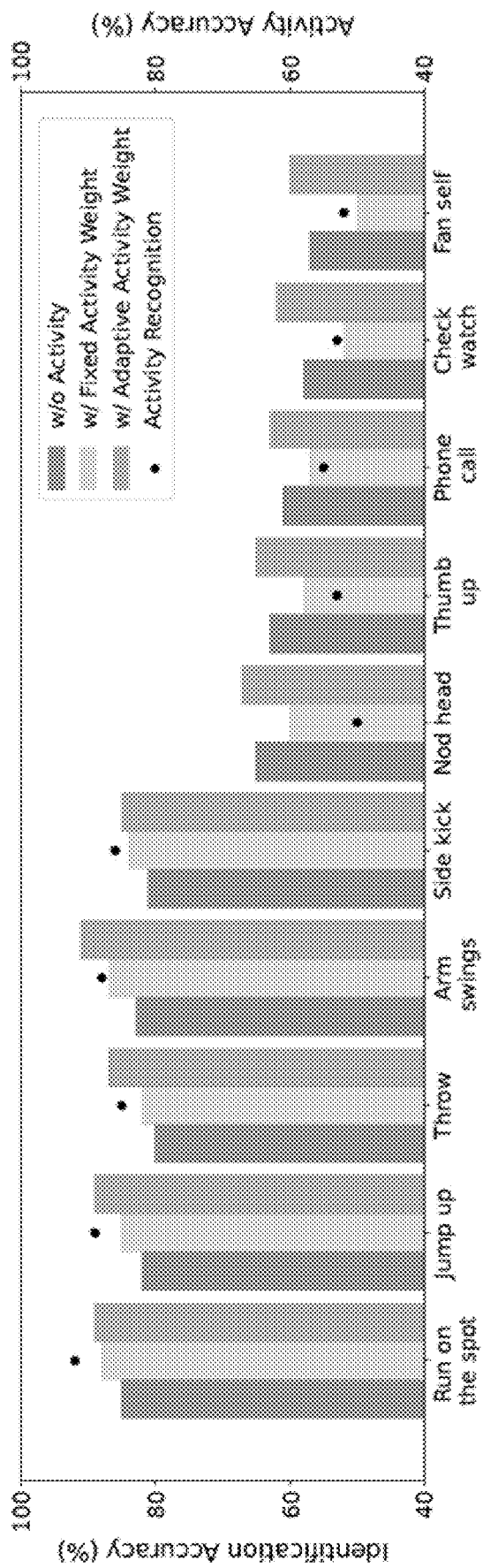
FIG. 18 shows attention visualizations for feature attribution per modality. For each of the three feature types (biometric, motion, non-biometric), the figure highlights the regions of the input that the model attends to most. These attention heatmaps illustrate which parts of the image are prioritized by each branch (e.g., faces or body shape for biometrics, motion-related limbs for the motion branch, and clothing or background for non-biometric features).

Performance analysis across activities. To examine the impact of different activities on person identification, we analyze performance across activity classes by identifying the five best and worst-performing actions. While activities involving significant body movements (e.g., running, jumping) provide distinctive motion patterns that aid recognition, they can introduce biases if overemphasized. Conversely, subtle activities (e.g., minor hand/head gestures) may lower accuracy due to weaker motion cues. Our findings (FIG. 18) show that fixed weighting ($\alpha_1=\alpha_2=0.5$ in Equation 14) of biometric and motion features can negatively affect identification for low-motion activities, whereas adaptive weighting ensures motion features contribute only when beneficial, stabilizing performance. Notably, highly distinctive actions retain high person identification accuracy even without explicit motion cues, confirming that motion serves as a complementary rather than dominant factor. Likewise, challenging activities do not inherently degrade identification performance, as the model prioritizes biometrics features when necessary, ensuring balanced identification.

Utility and quality of the generated prompts. To assess the impact of accurate textual prompts on disentanglement, we replace non-biometrics descriptions with random clothing details, leading to a 9.2% drop in Rank-1 accuracy on NTU RGB-AB, highlighting the necessity of precise appearance descriptions. Additionally, we assess prompt consistency by generating descriptions for the same key-frame over five runs on a subset of NTU RGB-AB (10 identities and 10 action classes) and report the average results in Table 19.

TABLE 19

| Ft. | Sim. | St. Dev. |
|---|---|---|
| $T_b$ | 0.92 | 0.03 |
| $T_{\bar{b}}$ | 0.79 | 0.12 |
| $T_m$ | 0.68 | 0.17 |

TABLE 20

| Model | Size | NTU RGB-AB | | Charades-AB | |
|---|---|---|---|---|---|
| | | R1 | mAP | R1 | mAP |
| Vision encoders | | | | | |
| SigLIP-L | 0.3B | 80.2 | 41.6 | 48.3 | 33.7 |
| ViT-1B | 1B | 83.4 | 42.1 | 49.2 | 34.7 |
| ViT-G/14 | 1.8B | 82.2 | 43.8 | 49.9 | 34.8 |
| Visual Language Models (VLMs) | | | | | |
| GPT-4V | — | 82.3 | 43.7 | 49.8 | 34.9 |
| InstructBLIP | 7B | 82.1 | 43.8 | 49.7 | 34.8 |
| LLaVA 1.5 | 7B | 82.2 | 43.8 | 49.9 | 34.8 |

Choice of vision encoder and VLM. Our model supports various vision encoder architectures. To identify the best performer, we evaluated three popular vision encoders: SigLIP-L, VIT-1B from InternVideo2, and ViT-G/14 from EVA-CLIP and find ViT-G/14 to be the best performing model (Table 20 (top)). Additionally, we show robustness of our approach across various VLMs, where we observe that changing the VLM does not contribute to significant changes (Table 20 (bottom)), thus we select LLaVA for its efficiency and open-source property.

Figure 19:
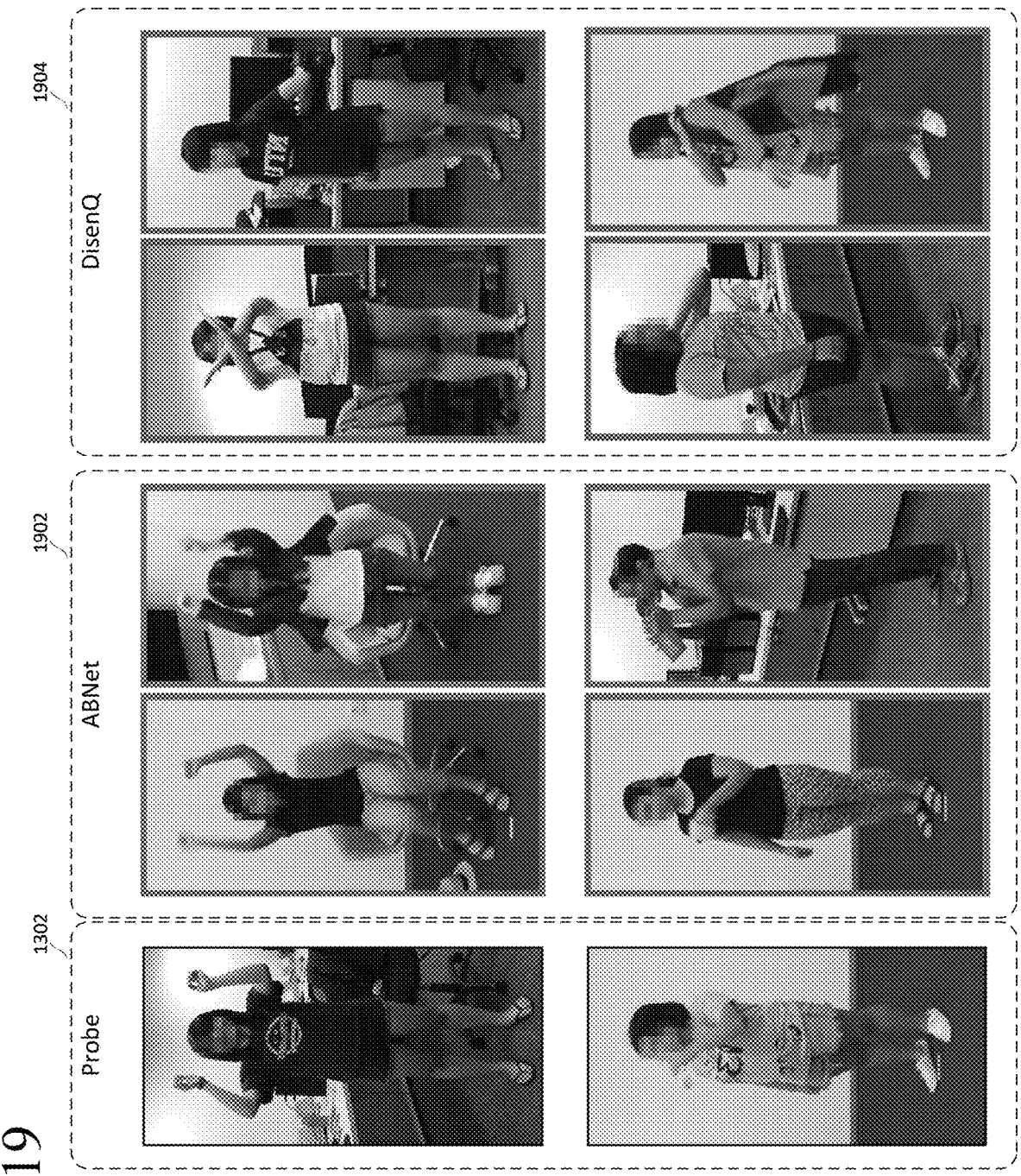
FIG. 19 provides a visual comparison of outputs from the prior art method (ABNet) and the present DisenQ approach on the same probe input. This figure qualitatively contrasts the entangled feature output produced by ABNet with the disentangled outputs produced by DisenQ, highlighting improvements such as clearer focus on identity-specific features and reduced interference from irrelevant attributes.

Qualitative results. FIG. 19 compares the prior-art ABNet baseline and the disclosed DisenQ architecture. The dashed region 1302 (left) presents the probe RGB frame of the query subject. The central dashed region 1902 encloses the top-two candidates returned by ABNet. Both images correspond to different individuals who happen to be executing activities visually similar to the probe (e.g., "hands-raised celebration" in the upper row and "arm lift/beverage pickup" in the lower row).

These erroneous matches illustrate ABNet's propensity to prioritise motion context over subject-specific biometric cues. The right-hand dashed region 1904 contains the top-two candidates retrieved by the DisenQ system. Despite the candidates exhibiting different activities from the probe (e.g., "arms-crossed" and "shoulder stretch"), DisenQ correctly recognizes the underlying identity, evidencing that the proposed disentanglement mechanism isolates biometric information while suppressing spurious correlations with instantaneous motion.

Details of Prompt Generation Analyze the given image where action label is <action label> and extract the following details: Biometrics: A <physique/body shape> person with <posture>, such as arms/legs positioning. Motion: Performing the action of <action label> by <action description>. Non-biometrics: A<color, type of clothing> and <other accessories>.

This prompt template is fed into the frozen VLM along with the key-frame, allowing the model to generate structured textual descriptions for each feature category. The output is then parsed into three distinct textual embeddings corresponding to biometrics, motion, and non-biometrics, ensuring explicit separation of identity-related and appearance-based cues.

Figure 20:
FIGS. 20-21 show examples of decomposed prompts for individual actions. Each of these figures illustrates a subject performing a particular action and the corresponding textual prompts generated by the system. In each example, the prompt is decomposed into a biometric portion (describing the person's inherent traits), a motion portion (describing the action or gait of the person), and a non-biometric portion (describing clothing or environmental context for that action).
Figure 21:

By incorporating structured textual supervision, this approach enhances feature disentanglement, enabling the model to learn identity-relevant representations while mitigating appearance bias. In FIGS. 20-21, we present examples of structured textual descriptions generated using a Vision-Language Model (VLM) from a given key-frame and its associated action label.

FIG. 20 depicts a representative still frame that the system uses to generate three distinct textual prompts from a video key-frame portraying the "cheer-up" gesture. A lean-built subject appears in an upright stance with both arms raised above the head and the legs slightly flexed while briefly lifting off the floor. Three dashed call-out boxes positioned to the right of the image hold the biometric text description 2002, the motion text description 2004, and the non-biometric text description 2006.

The biometric description 2002 records the subject's physical characteristics: "A lean-built person with upright posture, arms raised above head and legs slightly bent." The motion description 2004 conveys the action semantics: "Performing the action of 'cheer up' by raising both arms enthusiastically while slightly lifting off ground." The non-biometric description 2006 captures appearance context: "A black long-sleeved shirt and black pants with dark sneakers." Collectively, these modality-specific labels demonstrate how the system decomposes a single frame into discrete biometric, motion, and non-biometric textual components that serve as supervisory signals for the downstream disentangling transformer.

FIG. 21 shows a representative still frame that the system translates into three separate textual prompts for a video key-frame depicting the "neck-pain" gesture. A medium-built subject stands upright with one hand raised to the side of the neck while the head is slightly tilted. Three dashed call-out boxes to the right of the image present the biometric text description 2102, the motion text description 2104, and the non-biometric text description 2106.

The biometric description 2102 records the subject's physical attributes: "A medium-built person with upright posture, standing with one hand raised to the side of the neck." The motion description 2104 conveys the action semantics: "Performing the action of 'neck pain' by placing one hand on the neck while slightly tilting the head to one side." The non-biometric description 2106 captures appearance context: "A yellow graphic T-shirt and dark shorts with sports shoes featuring orange accents." Together, these modality-specific labels illustrate how the system decomposes a single frame into biometric, motion, and non-biometric textual components that serve as supervisory signals for the downstream disentangling transformer.

TABLE 21

| Model | Venue | NTU RGB-AB | | PKU MMD-AB | | Charades-AB | |
|---|---|---|---|---|---|---|---|
| | | Same | Cross | Same | Cross | Same | Cross |
| Models with only visual modality | | | | | | | |
| TSF | AAAI 20 | 72.9 | 70.3 | 78.5 | 73.5 | 38.2 | 32.1 |
| VKD | ECCV 20 | 68.9 | 69.2 | 80.0 | 74.3 | 38.9 | 34.4 |
| BiCnet-TKS | CVPR 21 | 75.7 | 70.7 | 83.0 | 78.7 | 41.9 | 40.6 |
| PSTA | ICCV 21 | 69.7 | 67.7 | 79.1 | 74.0 | 45.0 | 40.5 |
| STMN | ICCV 21 | 74.8 | 71.9 | 79.6 | 73.3 | 41.3 | 35.3 |
| SINet | CVPR 22 | 71.1 | 69.1 | 82.2 | 78.0 | 42.3 | 38.7 |
| CAL | CVPR 22 | 78.6 | 76.5 | 86.0 | 81.2 | 48.2 | 45.3 |
| Video-CAL | CVPR 22 | 81.3 | 79.5 | 83.1 | 82.5 | 50.1 | 48.5 |
| PSTR | CVPR 22 | 71.2 | 69.3 | 85.2 | 80.0 | 40.2 | 37.2 |
| AIM | CVPR 23 | 73.4 | 71.8 | 83.5 | 80.4 | 42.1 | 37.6 |
| SCNet | ACM MM 23 | 71.9 | 70.3 | 81.4 | 74.9 | 34.5 | 30.2 |
| ABNet | CVPR 24 | 85.3 | 81.4 | 91.4 | 89.3 | 51.0 | 52.0 |
| Models with visual + language modality | | | | | | | |
| CLIP ReID | AAAI 23 | 79.2 | 77.3 | 85.0 | 83.2 | 46.6 | 44.6 |
| CCLNet | ACM MM 23 | 78.2 | 77.1 | 86.7 | 82.5 | 45.9 | 41.7 |

TABLE 21-continued

| Model | Venue | NTU RGB-AB | | PKU MMD-AB | | Charades-AB | |
|---|---|---|---|---|---|---|---|
| | | Same | Cross | Same | Cross | Same | Cross |
| TF-CLIP | AAAI 24 | 79.6 | 77.0 | 85.9 | 84.1 | 43.7 | 42.1 |
| TVI-LFM | NeurIPS 24 | 78.9 | 77.5 | 87.1 | 83.5 | 49.5 | 46.3 |
| Instruct-ReID | CVPR 24 | 81.1 | 79.6 | 87.3 | 83.5 | 47.9 | 43.1 |
| EVA-CLIP | | 75.4 | 72.8 | 77.2 | 72.1 | 41.3 | 33.8 |
| Ours | | 88.5 | 86.4 | 94.7 | 90.5 | 56.8 | 54.1 |

In Table 21 we present performance comparison of our method with existing works and report the rank 5 accuracy. We present the result of our model on the excluding same view evaluation protocol in Table 22.

TABLE 22

| | Eval | Model | Rank 1 | mAP |
|---|---|---|---|---|
| NTU | Same activity | ABNet | 77.8 | 38.8 |
| | | DisQF | 80.7 | 40.9 |
| | Cross activity | ABNet | 76.4 | 36.1 |
| | | DisQF | 79.3 | 37.6 |
| PKU | Same activity | ABNet | 81.4 | 51.7 |
| | | DisQF | 84.2 | 55.1 |
| | Cross activity | ABNet | 79.4 | 46.3 |
| | | DisQF | 82.4 | 50.5 |

From both of these tables, we observe that our model constantly outperforms all the existing models across all datasets.

Figure 22:
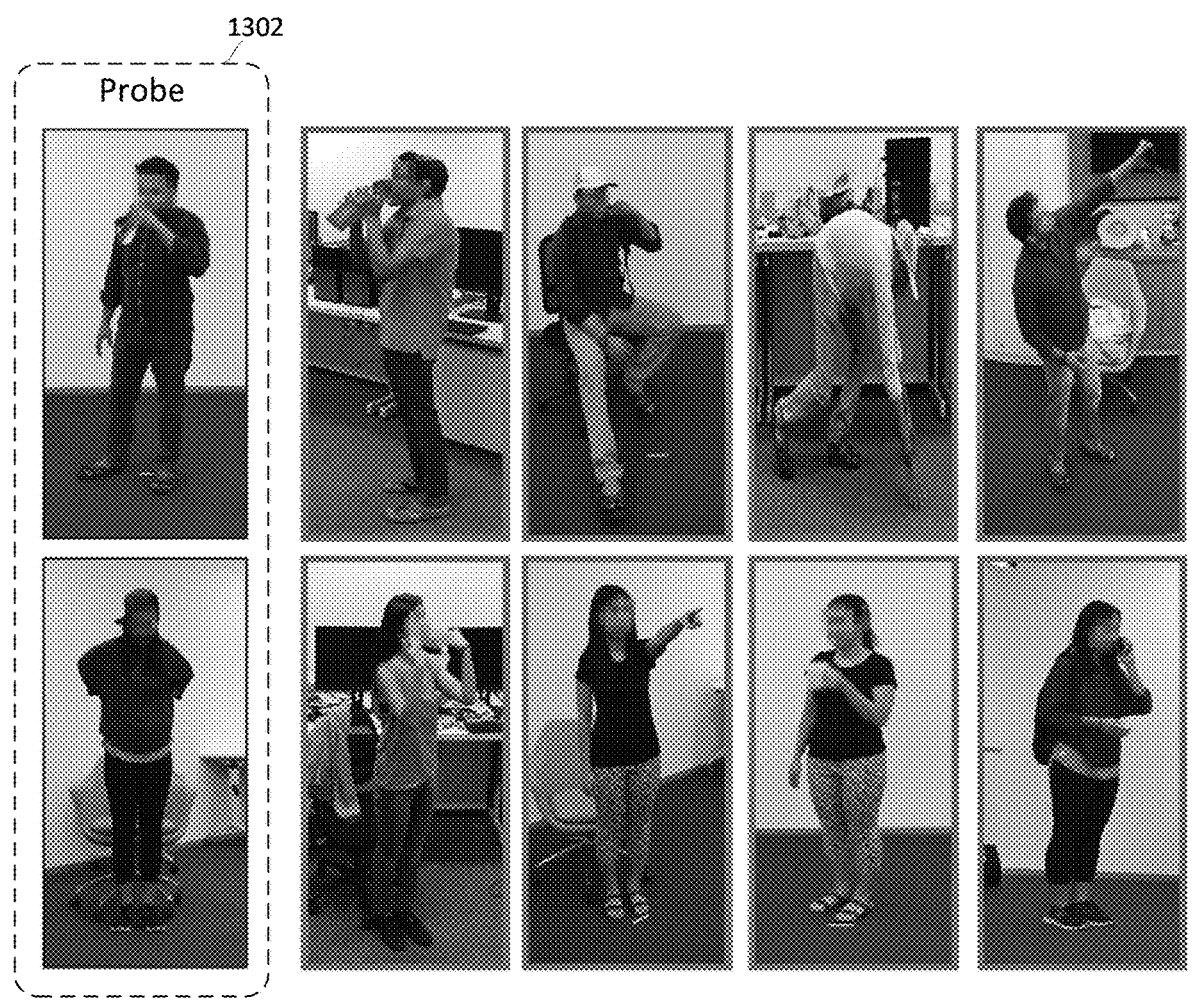
FIG. 22 illustrates a qualitative retrieval example using the DisenQ approach with disentangled outputs. In this example, a query input (e.g., an image of a person to be identified) is processed to produce separate biometric, motion, and non-biometric feature embeddings. The figure shows how these disentangled features are used to retrieve a matching result from a gallery: by combining similarities across the three feature types, the system accurately retrieves the correct identity match even when confounding factors such as pose or attire differ.

Qualitative Results. FIG. 22 illustrates the top 4 rank retrieval results for a given probe 1302 for NTU RGB-AB dataset in both same and cross-activity evaluation setting. This demonstrates the robustness of our model across diverse activities and significant appearance variations. Unlike traditional approaches that struggle with identity retention under clothing changes or motion variations, our method effectively disentangles biometrics, non-biometrics, and motion cues, ensuring accurate identification even when activities differ between the probe and gallery. The strong retrieval performance highlights the effectiveness of our approach in learning identity-consistent representations that generalize across diverse set of real-world activities.

Dataset Statistics. We evaluate performance under two evaluation protocols: same-activity and cross-activity. In the same-activity setting, all activities are present across both sets, ensuring that each individual is observed performing the same set of actions. In contrast, the cross-activity protocol introduces a more challenging scenario where individuals appear in different activities across the two sets, meaning that activities seen in one set are entirely absent in the other. For datasets with multiple viewpoints, such as NTU RGB-AB and PKU MMD-AB, we further assess two variations: including same view, where all viewpoints are available in both probe and gallery, and excluding same view, where probe viewpoint is excluded from gallery, increasing the difficulty of matching individuals across different perspectives. This allows us to analyze the model's robustness to viewpoint variations. However, for datasets like Charades-AB, which do not contain explicit viewpoints data, only the activity-based protocols are considered. Since, MEVID only contains one activity (e.g. walking), the evaluation of this dataset also falls under the same-activity setting. A detailed dataset statistics is presented in Table 23.

TABLE 23

| Dataset | Split | #actors | #activities | #samples |
|---|---|---|---|---|
| NTU RGB-AB | train | 85 | 94 | 70952 |
| | gallery | 21 | | 14192 |
| | probe | | | 3548 |
| PKU MMD-AB | train | 53 | 41 | 13634 |
| | gallery | 13 | | 2727 |
| | probe | | | 681 |
| Charades-AB | train | 214 | 157 | 45111 |
| | gallery | 53 | | 9022 |
| | probe | | | 2256 |
| MEVID | train | 104 | 1 | 6338 (tracklets) |
| | gallery | 52 | | 316 (tracklets) |
| | probe | 54 | | 1438 (tracklets) |

FIG. 13 compares a representative multimodal person-identification pipeline that lacks activity awareness (FIG. 13A, prior approach) with the activity-aware pipeline disclosed herein (FIG. 13B). In both panels a probe clip 1302 is first embedded by a conventional visual encoder 1306 and an accompanying textual encoder 1308. In the prior-art arrangement the textual input 1304 is limited to a static image caption, and the visual and textual embeddings are merged within an alignment module 1310 that produces a single, undifferentiated feature vector 1312. Because that vector entangles biometric appearance with pose-dependent motion cues, the subsequent similarity search returns mismatched identities 1314, as indicated by the cross-mark adjoining the result set.

By contrast, the disclosed system augments the probe with a richer, activity-aware textual description 1316 that captures both the subject's appearance and the action being performed. The alignment module is replaced by an align-and-disentangle block 1318 that separates the joint embedding into orthogonal sub-features: one dominated by activity or motion, one dominated by biometric structure, and one containing any residual context. The resulting disentangled representation 1320 is therefore insensitive to transient pose variations while retaining identity-specific morphology. When this representation is queried against the gallery, the top returns 1322 correspond to the correct individual even under substantial appearance change, as denoted by the check-mark.

Figure 14:
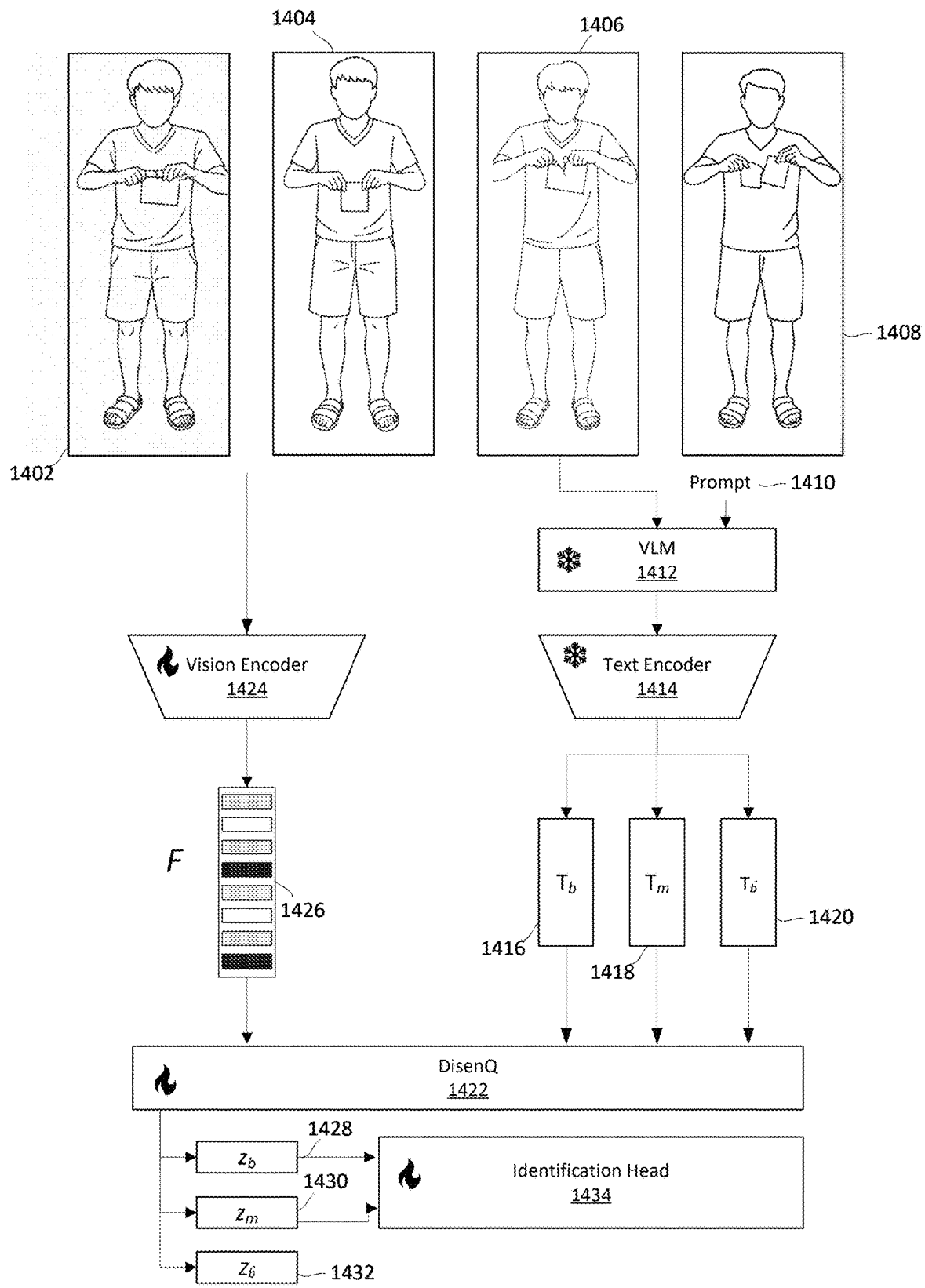
FIG. 14 is a diagrammatic illustration of a DisenQ-based visual-language alignment system. This figure shows how the Disentangling Q-Former (DisenQ) module aligns visual features from an input image with textual prompts corresponding to different feature categories (biometric, motion, and non-biometric cues).

FIG. 14 traces the end-to-end flow of the proposed vision-language disentanglement subsystem. A short video clip is sampled to obtain three representative frames 1402, 1404, and 1406. The three frames together constitute a key-frame set 1408 that is forwarded along two parallel paths.

Visual-feature path. The key-frame set 1408 enters a convolutional or transformer-based vision encoder 1424. Encoder 1424 emits a spatio-visual token sequence 1426— denoted F—whose elements jointly encode appearance, motion posture, and background context.

Prompt-generation path. The same key-frame set 1408 is supplied to a frozen vision-language model (VLM) 1412 that produces a natural-language prompt 1410 describing the depicted subject. A purpose-built text encoder 1414 decodes prompt 1410 into three disjoint query embeddings collected in block 1420. Specifically, embedding 1416 captures biometric traits such as body shape and limb proportion, embedding $T_m$ 1418 captures motion semantics or activity keywords, and embedding Tc 1420 (the "c" denotes context) captures non-biometric appearance such as clothing color or background objects.

Disentangling Q-Former. The visual token sequence 1426 and the three textual queries 1416, 1418, 1420 converge inside the DisenQ transformer 1422. Within DisenQ each textual query acts as a learnable set of query vectors that drives a dedicated cross-attention head to mine the corresponding portion of the visual feature map. The biometric head extracts an identity-centric embedding $z_b$ 1428, the motion head extracts an activity embedding $z_m$ 1430, and the context head extracts a residual appearance embedding $z_c$ 1432. Because the three heads share key and value tensors drawn from 1426 yet operate under orthogonal textual guidance, their outputs are naturally decorrelated: $z_b$ remains invariant to clothing and action, $z_m$ remains invariant to identity, and $z_c$ captures only background and garment information.

Identity inference. The disentangled vectors 1428, 1430, and 1432 are forwarded to an identification head 1434. Head 1434 concatenates $z_b$ with a gated version of $z_m$—the gate weight is learned so that motion cues are emphasized only when they improve discrimination—and disregards $z_c$ to avoid appearance bias. The resulting composite embedding is compared against a gallery of stored biometric vectors, completing the person-identification task.

By integrating a generative VLM 1412, a flexible text encoder 1414, and the cross-modal De-Q-Former 1422, the architecture shown in FIG. 14 learns to separate biometric, motion, and contextual information on the fly from a single set of video frames, thereby delivering activity-aware, appearance-invariant identification accuracy unavailable to prior art systems.

Figure 15:
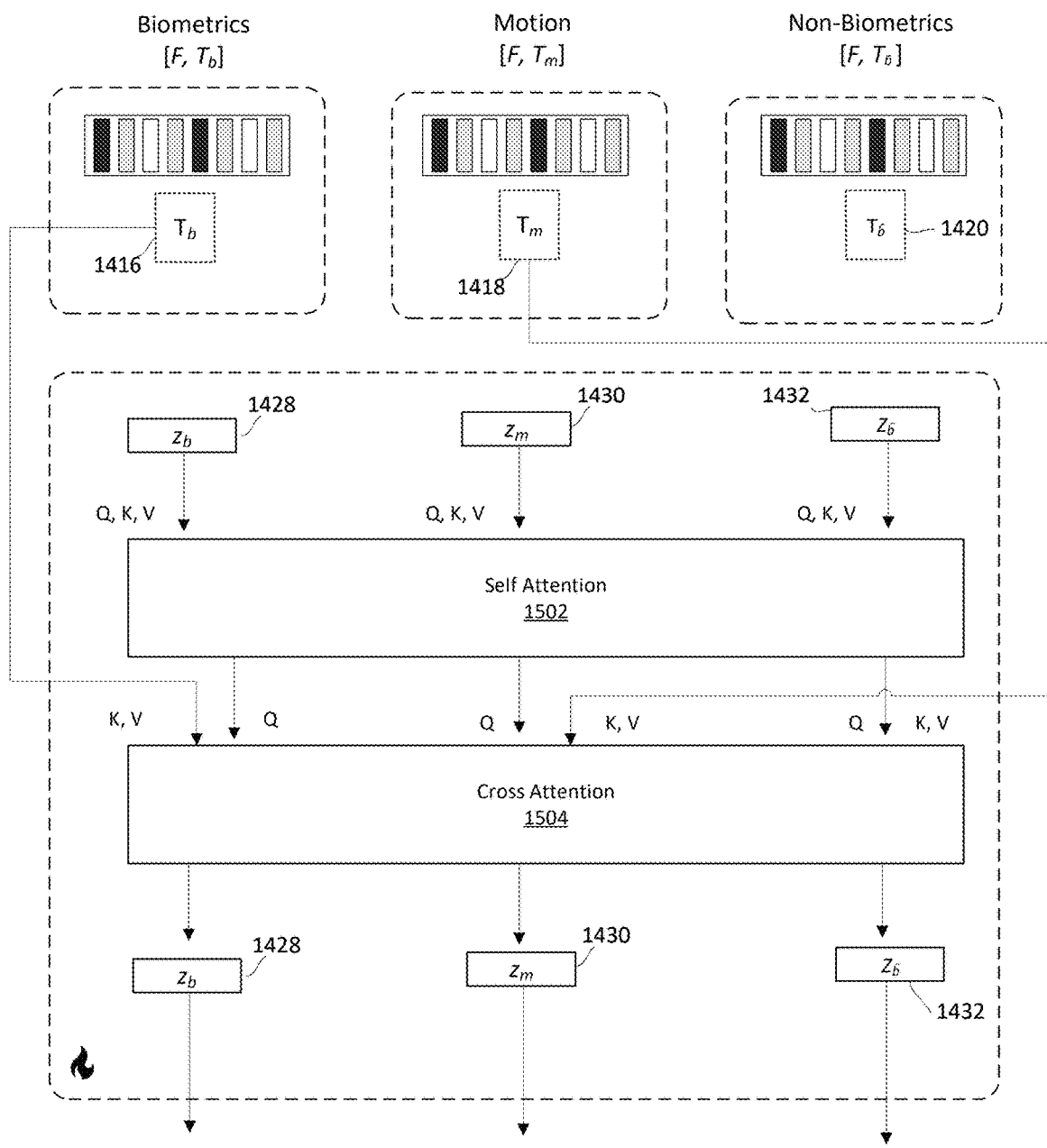
FIG. 15 is an architecture-level view of feature stream separation into three parallel attention heads (biometrics, motion, and non-biometric). Each head contains dedicated attention layers and processes one type of feature, illustrating how the DisenQ module isolates each feature stream and produces separate feature embeddings for each modality.

FIG. 15 details the internal operation of the Disentangling Q-Former. A shared visual token sequence F is broadcast to three prompt-conditioned branches. In the biometric branch the query set is formed by concatenating the visual tokens F with the biometric prompt embedding $T_b$ 1416; an identical procedure produces the motion query with Tm 1418 and the non-biometric query with Tc 1420. Within the dashed module each branch first conducts self-attention 1502, where its own tokens serve as Query, Key, and Value, thereby refining prompt-specific context without influence from the other branches. The resulting intermediate vectors act as Queries in a subsequent cross-attention block 1504 whose Keys and Values are drawn from the entire visual token pool F. This arrangement allows every branch to interrogate the same image while being steered toward a disjoint semantic target by its prompt.

The biometric pathway outputs a final identity embedding $z_b$ 1428 that captures person-specific morphology yet remains invariant to clothing and pose. The motion pathway yields an activity embedding $z_m$ 1430 dominated by temporal cues such as limb trajectory and overall gait. The non-biometric pathway returns a residual context embedding $z_c$ 1432 that encodes clothing texture, carried objects, and background color. Because each pathway employs an independent query stack while sharing Keys and Values from F, the learned attention weights decorrelate automatically: Keys correlating strongly with $T_b$ do not contribute to $T_m$ or To, and vice-versa. Orthogonality is further enforced during training by an explicit penalty that minimizes the dot product between $z_b$ and $z_c$.

Downstream, the identification head receives $z_b$ as its primary input and augments it with a gated version of $z_m$; the gate weight is learned so that activity cues are emphasized only when they improve discrimination. Embedding $z_c$ is excluded from similarity computation to suppress appearance bias. This architecture therefore preserves a stable biometric signature while isolating motion information and discarding non-discriminative appearance content, enabling robust identity retrieval across changes in activity, viewpoint, and wardrobe.

Figure 16:
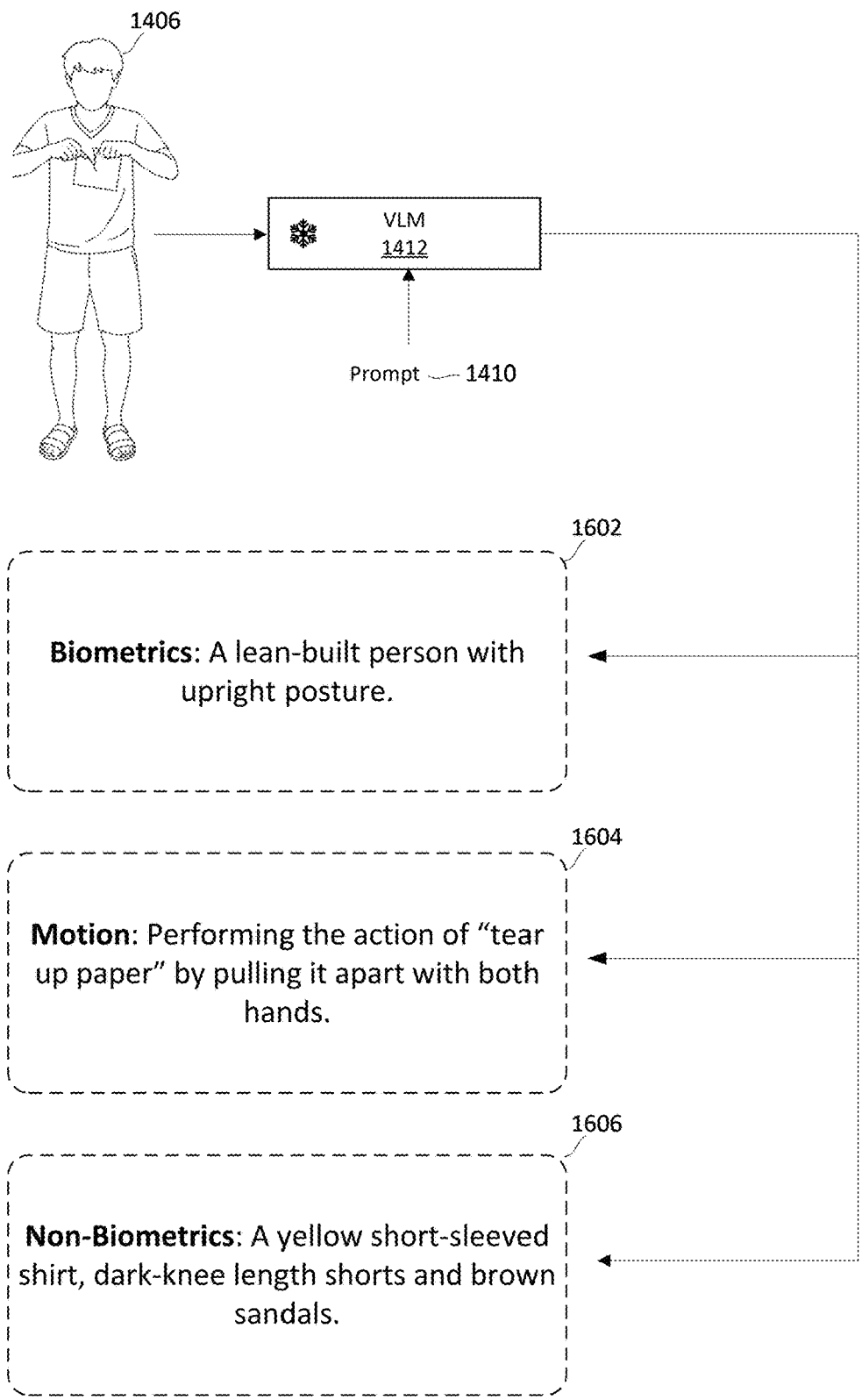
FIG. 16 depicts an example of prompt construction and semantic decomposition from vision-language model inputs. It shows an input (image or video frame) being described by a vision-language model, and how this description is split into distinct textual prompts: one capturing biometric attributes of the subject, one capturing motion or activity information, and one capturing non-biometric context or appearance details.

FIG. 16 illustrates an example of how a natural-language description of an input can be semantically decomposed into three prompts. In this example, an image/frame 1602 of a person engaged in an activity is first processed (e.g., by a pre-trained vision-language model) to obtain an initial semantic description 1604 of the scene. A prompt decomposition module 1606 then splits this description into distinct parts: a biometric prompt 1608 describing intrinsic properties of the person (for instance, "a tall man with short black hair"), a motion prompt 1610 describing the action or gait ("bending down to tie a shoelace"), and a non-biometric prompt 1612 describing auxiliary context or appearance ("wearing athletic clothing on a track field").

These prompt components (1608, 1610, 1612) are fed into the DisenQ module as the textual queries for the respective attention heads. By using such semantically focused prompts, the system guides each attention head to attend to the visual features relevant to that prompt's content. The result of this process is that each branch's output is aligned with a human-interpretable aspect of the input, which not only improves performance but also lends interpretability to the model's feature representations.

The DisenQ-based approach greatly improves feature disentanglement, as evidenced by the feature distribution visualization in FIG. 17. In this figure, the feature embeddings produced by the three branches are plotted (for example, using a dimensionality reduction technique for visualization). The biometric features cluster together in five separate parts of the space (clusters 1702), motion features form two separate clusters (1704), and non-biometric features form yet another cluster (1706). The clear separation of these clusters indicates that the model successfully learns orthogonal representations for identity, motion, and context. In other words, identity embeddings from different individuals are grouped by person (and are not mixed up by differences in pose or clothing), while motion embeddings are grouped by the type of action (and are invariant to who is performing it), etc. This demonstrates the effectiveness of DisenQ in disentangling the feature space.

Another advantage of the DisenQ architecture is the ability to inspect and interpret what the model focuses on for each feature type. FIG. 8 shows Performance analysis across activities (top 5 best and worst) on NTU RGB-AB. Here, bars and dots respectively represent person identification and action recognition accuracy. To examine the impact of different activities on person identification, we analyze performance across activity classes by identifying the five best and worst-performing actions. While activities involving significant body movements (e.g., running, jumping) provide distinctive motion patterns that aid recognition, they can introduce biases if overemphasized. Conversely, subtle activities (e.g., minor hand/head gestures) may lower accuracy due to weaker motion cues.

Our findings (FIG. 4) show that fixed weighting ($\alpha_1=\alpha_2=0.5$ in Equation 14) of biometric and motion features can negatively affect identification for low-motion activities, whereas adaptive weighting ensures motion features contribute only when beneficial, stabilizing performance. Notably, highly distinctive actions retain high person identification accuracy even without explicit motion cues, confirming that motion serves as a complementary rather than dominant factor. Likewise, challenging activities do not inherently degrade identification performance, as the model prioritizes biometrics features when necessary, ensuring balanced identification.

Figure 23:
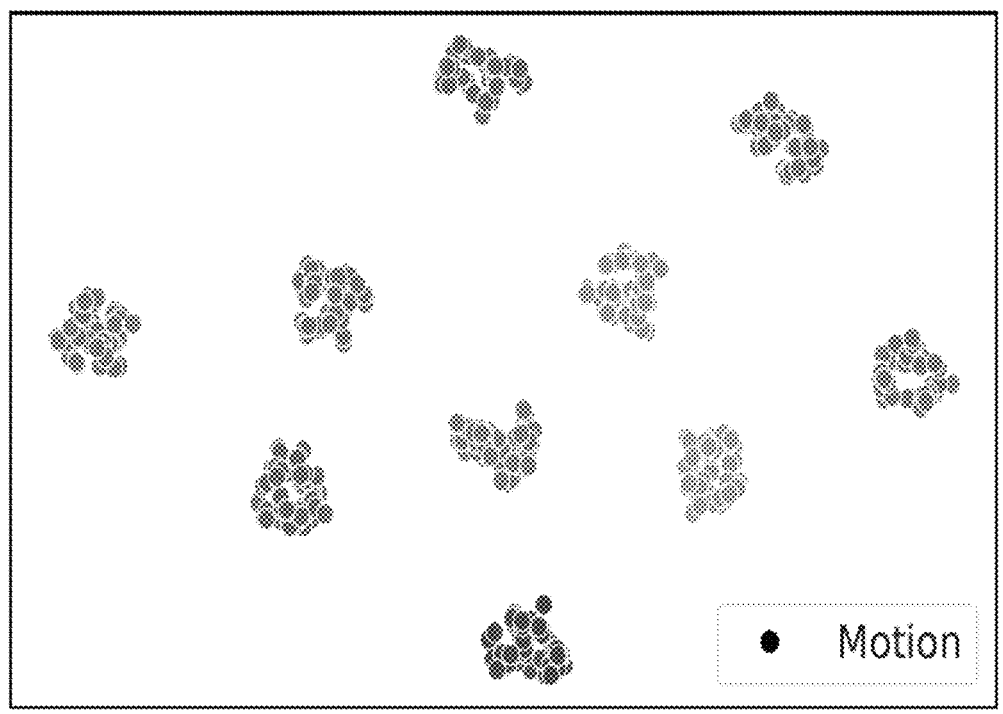
FIG. 23 illustrates feature space of generated motion prompts across multiple runs (NTU RGB-AB subset).

Biometrics descriptions remain highly stable, as indicated by high cosine similarity and low standard deviation, ensuring reliable identity representation. Non-biometrics descriptions also exhibit relative consistency, with minor variations. Motion descriptions exhibit the most variability, as different textual descriptions may be generated for the same action label. FIG. 23 confirms that semantically similar motion prompts still cluster in the same feature space, ensuring consistency in representation.

FIG. 22 shows a qualitative example of this retrieval process. A query input (probe) 1302 is processed by the DisenQ model which returns the top 4 rank retrieval results for a given probe for NTU RGB-AB dataset in both same and cross-activity evaluation setting. This demonstrates the robustness of our model across diverse activities and significant appearance variations. Unlike traditional approaches that struggle with identity retention under clothing changes or motion variations, our method effectively disentangles biometrics, non-biometrics, and motion cues, ensuring accurate identification even when activities differ between the probe and gallery. The strong retrieval performance highlights the effectiveness of our approach in learning identity consistent representations that generalize across diverse set of real-world activities.

Figure 24:
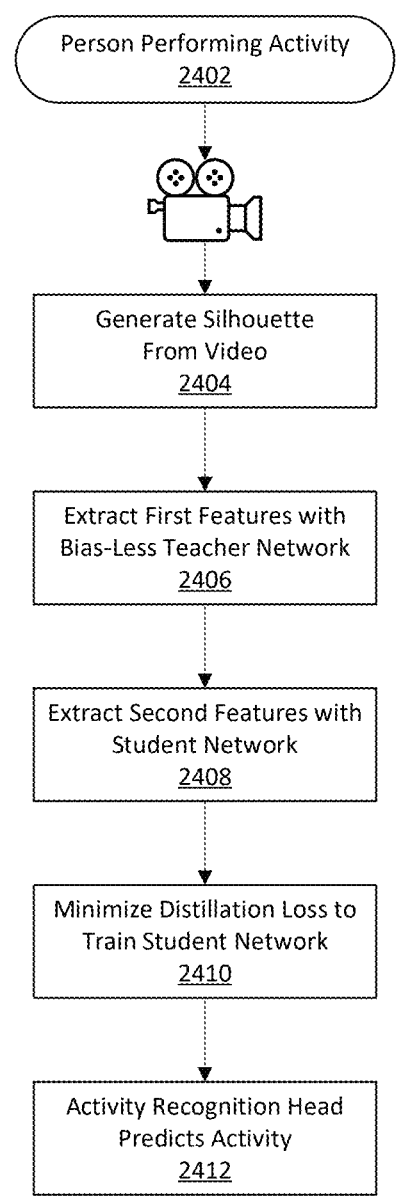
FIG. 24 is a flow-chart illustration of the silhouette-based embodiment of the invention.

FIG. 24 illustrates an embodiment of the invention wherein a silhouette-based distillation architecture is used to train a biometric feature extractor whose embeddings are informed by, yet invariant to, human activity context. At the top of the flow, a person performing an activity 2402 is recorded by a video camera, yielding an input sequence of RGB frames. A preprocessing module generates silhouette images from the video 2404, removing texture, color, and fine appearance cues so that only the subject's gross body shape and motion profile remain. The silhouette frames are passed to a bias-less teacher neural network 2406, which extracts first biometric features that encode static morphological characteristics (e.g., limb ratios, gait periodicity) without being confounded by clothing or illumination. In parallel, the original RGB frames are delivered to a student neural network 2408 that learns second biometric features. The parameters of the student are iteratively updated through a distillation-loss minimization stage 2410, which penalizes divergence between the teacher's first features and the student's second features, thereby forcing the student to emulate the teacher's appearance-invariant representation while still seeing full-fidelity video. Concurrently, the student network feeds an activity-recognition head 2412 that predicts the activity label for each sequence; gradients from this auxiliary task bias the shared backbone toward spatiotemporal patterns salient for action understanding. Collectively, elements 2402-2412 cooperate to produce a biometric embedding that remains stable across diverse activities while benefiting from activity-aware regularization, enabling robust person identification in subsequent deployment phases.

Figure 25:
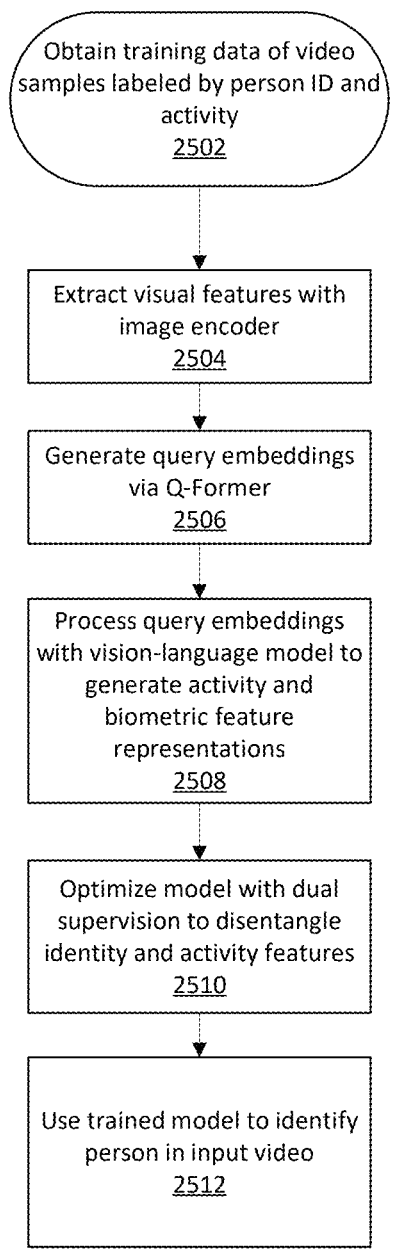
FIG. 25 is a flow-chart illustration of the language-based embodiment of the invention.

FIG. 25 illustrates an embodiment of the invention wherein a language-guided disentanglement architecture leverages multimodal supervision to separate identity cues from activity semantics during training and inference. An ingest pipeline first obtains training data comprising video samples labeled by person identity and activity 2502. Each video's frames are processed by an image encoder 2504 (e.g., a 3-D CNN or Vision Transformer) that extracts dense spatiotemporal visual features. These features are projected into a compact set of learnable tokens by a query-transformer (Q-Former) 2506, yielding query embeddings that summarize the video content. The embeddings are forwarded to a large-scale vision-language model 2508, which outputs two disjoint representations: (i) an activity feature vector capturing semantic hints drawn from pretrained language priors, and (ii) a biometric feature vector encoding appearance-based identity traits. A dual-branch optimization routine 2510 applies cross-entropy loss against the activity labels on the semantic branch and against the identity labels on the biometric branch, forcing the network to disentangle the two latent factors within the shared queries. After convergence, the trained system can identify a person in an unseen input video 2512 by passing the video through elements 2504-2508, extracting the biometric representation, and comparing it against a reference gallery; because activity content is explicitly factored out, the identity embedding remains consistent irrespective of whether the subject is walking, running, or interacting with objects.

This approach outperforms traditional methods (such as the prior art ABNet, illustrated in FIG. 19 for comparison) where a single entangled embedding might be thrown off by changes in activity or appearance. Overall, the DisenQ-enhanced system achieves more reliable person identification by aligning visual features with semantically meaningful prompts and enforcing a structured separation of those features during both training and inference.

Hardware and Software Components

The present invention leverages computer and software technology to enable accurate and efficient person identification based on daily activities. The invention employs a blend of hardware and software components essential to its functionality. This detailed description outlines the technology and tools, integrating the various aspects of video encoders, machine learning frameworks, data storage, and processing.

Embodiments of the present invention may be implemented in hardware, firmware, software, or any combination thereof. The invention can be realized as instructions stored on a machine-readable medium, readable and executable by one or more processors. A machine-readable medium includes any mechanism for storing or transmitting information in a form readable by a machine, such as computing devices. Examples of machine-readable media include read-only memory (ROM), random access memory (RAM), magnetic disk storage media, optical storage media, flash memory devices, and electrical, optical, acoustical, or other forms of propagated signals like carrier waves, infrared signals, and digital signals.

Data storage and processing play a significant role in the functionality of the invention. The system requires robust data storage solutions capable of handling large datasets necessary for training and inference. Storage solutions can be on-premise or cloud-based, provided by vendors such as MICROSOFT AZURE, AMAZON WEB SERVICES, RACKSPACE, and KAMATERA. These platforms offer the scalability and reliability needed for storing and processing vast amounts of video data.

The software component of the invention involves machine learning frameworks and programming languages. Machine-readable program code for carrying out operations can be written in various programming languages, including object-oriented languages like Java, C #, C++, and Visual Basic, as well as conventional procedural programming languages such as C. Additionally, scripting languages like Python, Lua, and Perl may be utilized for specific tasks within the system.

The machine-readable medium may be electronic, magnetic, optical, electromagnetic, infrared, or semiconductor-based systems, apparatuses, or devices. Examples include electrical connections with wires, portable computer diskettes, hard disks, RAM, ROM, erasable programmable read-only memories (EPROM or Flash memory), optical fibers, portable compact disc read-only memories (CD-ROM), optical storage devices, and magnetic storage devices. In this context, a computer-readable storage medium refers to any non-transitory, tangible medium that can contain or store a program for use by or in connection with an instruction execution system, apparatus, or device.

Machine-readable signal media may include propagated data signals with machine-readable program code embodied in them, such as baseband or part of a carrier wave. These propagated signals can take various forms, including electromagnetic, optical, or combinations thereof. A machine-readable signal medium can communicate, propagate, or transport a program for use by or in connection with an instruction execution system, apparatus, or device.

Firmware, software, and routines are described as performing certain actions, but these actions result from computing devices, processors, controllers, or other devices executing the firmware, software, and routines. Program code on a machine-readable medium can be transmitted using various media, including wireless, wire-line, optical fiber cable, and radio frequency, or combinations thereof.

The machine learning framework used in this invention may be implemented using PyTorch, a popular deep learning library. The video encoder backbone is based on ResNet3D-50, which provides the capability to process and analyze video data effectively. The teacher network may be GaitGL for the silhouette encoder, extracting silhouettes from RGB videos using Mask2Former.

Training the model involves creating RGB video clips from the original videos by randomly selecting frames, resizing them, and processing them in batches. The training process uses the Adam optimizer with specific parameters for weight decay and learning rate, running for a set number of epochs with decay factors applied periodically. The model's loss functions include cross-entropy loss, triplet loss, and distillation loss, which are combined to optimize the overall performance.

During inference, the activity features extracted by the model are concatenated with the biometric features to provide activity prior, enhancing the identification process. The evaluation protocol involves splitting the test set into gallery and probe sets and using different evaluation metrics like rank 1 accuracy, rank 5 accuracy, mean average precision (mAP), and TAR at 0.1% FAR to assess the model's performance.

Baseline methods for comparison include ResNet3D-50, MViTv2, and GaitGL. ABNet is evaluated through experiments on diverse datasets to validate its performance in person identification tasks based on daily activities.

Glossary of Claim Terms

Ablation means a systematic experimental procedure in which one or more functional components of the disclosed person-identification architecture are intentionally omitted, disabled, or replaced by a neutral placeholder to quantify that component's individual contribution to overall system performance. In the context of ABNet, ablation may target the bias-less distillation module, the distortion network, the activity head, the activity-prior concatenation step, or any combination thereof. For each ablated variant, the inventors retrain the remaining network on the same dataset partitions and evaluate it under identical protocols (same-activity, cross-activity, cross-view, and cross-subject). Comparisons of rank-1 accuracy, mean average precision, and true-accept rate across the ablated and full configurations reveal how the removed element affects robustness to appearance bias, generalization across viewpoints, and sensitivity to low-motion activities. For example, eliminating the bias-less distillation path typically increases the model's reliance on clothing color, as evidenced by a measurable drop in cross-activity accuracy. Similarly, removing the distortion branch reduces the network's ability to disentangle biometric structure from appearance, reflected in degraded performance on appearance-shifted probes. These quantitative degradations validate the necessity of each architectural element and document their synergistic benefits when combined.

Activity Features mean the subset of spatio-temporal descriptors extracted from a video sequence that encode what the subject is doing rather than who the subject is. They are produced by the activity head after the shared encoder processes the RGB input and therefore inherit view-invariant motion cues while remaining agnostic to superficial appearance attributes. Each feature vector captures temporal dynamics such as limb articulation frequency, body-part trajectory patterns, and gross posture changes occurring over the clip's duration. Unlike biometric embeddings, which remain stable across different behaviors, activity features vary predictably with the performed action (e.g., walking versus sitting) and thus provide semantic context. During training, they are supervised by categorical activity labels via an activity-classification loss; during inference, the finalized activity vector can be concatenated with the biometric vector to supply an activity prior that conditions the identity comparison on behavioral context. For instance, if the probe shows a subject climbing stairs, similarity scoring can emphasize embodiments of that same activity in the gallery, thereby discriminating between gait-shifted motion patterns of different individuals. Because activity features are learned jointly with biometric features from the same spatio-temporal tensor, they share a coherent embedding space that allows meaningful fusion without intermediate alignment.

Activity Head means the dedicated neural-network branch attached to the shared video encoder that specializes in transforming raw spatio-temporal features into discriminative activity embeddings and categorical activity predictions. Architecturally, the activity head may comprise a stack of temporal-attention layers, one-dimensional convolutional filters, or a transformer decoder configured to model long-range motion dependencies across frames. Its parameters are optimized with a supervised activity-classification loss that drives the head to differentiate among dozens—or in some datasets, hundreds—of action classes, ranging from mundane gestures (texting, drinking) to complex interactions (entering a vehicle, removing a jacket). By forcing the network to recognize these behaviors, the activity head compels the upstream encoder to learn motion-sensitive features that generalize across viewpoints and appearance. The resulting activity embedding not only yields an action label but also serves as a conditioning vector—an activity prior—that can be concatenated with the biometric embedding at inference time. This conditioning is especially beneficial when the biometric signal is weak, such as during low-motion activities, because it enables context-aware re-weighting of similarity metrics. Importantly, the activity head operates in parallel with the actor head; gradients from both losses are back-propagated through the shared encoder, leading to a richer, multi-task representation.

Activity Learning means the multi-task training paradigm through which the system simultaneously acquires the ability to classify human actions and to identify persons, leveraging shared spatio-temporal representations to reinforce each objective. Under activity learning, each training clip contributes two supervisory signals: a ground-truth activity label and a ground-truth identity label. The activity head processes the encoded feature sequence and is optimized via a categorical cross-entropy loss, whereas the actor head receives a parallel copy of the same sequence and is optimized via biometric and distillation-related losses. Because both heads update the encoder's weights, the encoder learns features that are jointly informative: motion dynamics necessary for activity recognition and structural cues necessary for identity discrimination. This joint optimization combats over-fitting to static appearance; the activity task forces the network to attend to movement patterns, while the identity task forces it to ignore appearance cues that vary with clothing. Moreover, the auxiliary activity objective provides regularization that speeds convergence and improves generalization to unseen subjects or actions. The outcome of activity learning is an activity-aware encoder whose latent space can be partitioned into complementary subspaces: one sensitive to behavior context (activity features) and one sensitive to biometric identity (biometric features). During inference, the recognized activity can be leveraged as a prior cue, improving rank-based retrieval in cross-activity scenarios.

Activity Loss means the objective function applied to outputs of the activity head during training to optimize recognition of the action being performed in each video clip. It is typically formulated as a multi-class cross-entropy loss operating over the head's softmax probabilities, although label-smoothing or focal-loss variants may be substituted where class imbalance exists. The ground-truth activity label for every clip is encoded as a one-hot target vector, and the activity head's logits are temperature-scaled when necessary to stabilize gradients. The loss contributes a back-propagated gradient that updates both the activity-head weights and the shared encoder weights, thereby forcing early layers to encode motion patterns that discriminate among hundreds of actions spanning locomotion, gestural, and interaction categories. In joint training the activity loss is weighted by a coefficient $\lambda_1$ in the composite loss expression $L=L_{Bio}+\lambda_1 L_{Ac}+\lambda_2 L_{KD}+\lambda_3 L_{Dis}$ to maintain proportional influence alongside biometric, distillation, and distortion objectives. During ablation trials the activity loss is set to zero to examine its effect; removing this term consistently degrades cross-activity identification accuracy, confirming that action supervision regularizes the encoder and reduces over-fitting to static appearance. Hyper-parameters such as class-sampling strategy, learning-rate schedule for activity-head layers, and warm-up duration are tuned by monitoring validation accuracy on held-out actors. Gradient clipping is applied to the activity-loss pathway to avoid dominance over biometric gradients in early epochs. The activity loss also implicitly calibrates the magnitude of the activity-feature vector used as an inference-time prior, ensuring numerical compatibility when concatenated with the biometric embedding for similarity scoring against the gallery.

Activity Prior means the auxiliary vector comprising either the logits or the normalized hidden representation $F_{Ac}$ produced by the activity head, concatenated with the biometric embedding $f_{bb}$ at inference. The concatenation dimension $d_{Ac}$ is scaled by temperature $\gamma$ to ensure numerical parity with $f_{bb}$ components. When matching against gallery embeddings, cosine similarity operates on the augmented vector, which encodes both identity and contextual action. The prior is especially effective when the probe action differs from most gallery actions; including activity cues shifts similarity rankings toward gallery clips depicting the same behavior while leaving heavily weighted biometric components intact. Ablation experiments removing activity prior reduce cross-activity rank-1 accuracy by up to 5%, validating its complementary role. The prior is lightweight—128-dimensional in implementation—and adds negligible computational overhead, as it reuses activations already computed during the forward pass.

Appearance Bias means the systematic tendency of a person-identification model to rely on superficial, non-biometric visual cues-such as clothing color, fabric texture, accessories, or background luminance—to distinguish individuals, thereby reducing robustness when such cues change. In the disclosed architecture appearance bias manifests when the biometric embedding correlates strongly with RGB chrominance or scene context, leading to subject-swap errors in cross-activity or cross-view testing. Mitigation in ABNet is achieved through three coordinated mechanisms. First, bias-less distillation from a silhouette-based teacher removes chromatic and textural information from the supervising signal, forcing the student actor head to emphasize shape and motion. Second, bias-learning via the distortion network explicitly teaches the appearance sub-embedding to cluster samples sharing the same clothing while pushing apart identity-bearing features, operationalized through the distortion loss. Third, data augmentations such as hue shifting randomize color channels frame-wise, weakening statistical dependencies between clothing hue and identity. Quantitative evidence of reduced appearance bias is provided by t-SNE plots where biometric clusters overlap across wardrobe changes while appearance clusters remain separable. Further confirmation comes from controlled experiments in which actors don identical garments: baseline models confuse subjects, whereas the bias-mitigated network maintains high rank-1 accuracy. Appearance bias is thus treated not merely as noise but as a learnable factor disentangled into a dedicated feature subspace whose influence on final similarity scores is suppressed during gallery matching.

Actor Head means the branch of the neural network that receives a duplicated copy of the encoder's spatio-temporal feature tensor and produces both an identity classification distribution and two latent embeddings: one representing biometric structure and one representing appearance attributes. Internally the head contains a multi-layer transformer decoder with positional encodings aligned to frame indices, permitting self-attention across temporal segments to capture gait cycles and limb coordination patterns. The decoder output is split via two linear projection heads—one trained under a biometric-loss objective, the other under a contrastive appearance objective—thereby implementing explicit bias disentanglement. A softmax layer tied to the biometric projection provides per-identity probabilities for cross-entropy supervision; concurrently, the projection vectors participate in triplet-loss mining across the batch to ensure intra-class compactness and inter-class separability. During distillation, the actor head's biometric logits are encouraged to mimic the silhouette-teacher logits through KL divergence, while its appearance sub-embedding is aligned to distorted-branch equivalents through the distortion loss. At inference the appearance embedding is discarded; the biometric embedding—optionally concatenated with the activity prior—constitutes the probe vector against which cosine similarity is computed versus gallery templates. Architectural hyper-parameters such as decoder depth, attention-head count, and feed-forward width are selected to balance latency with discriminative power and evaluated via ablation to verify incremental benefit over simpler convolutional heads.

Bias Disentanglement means the structured separation of biometric and appearance information within the latent representation learned by ABNet, achieved by architecturally partitioning embeddings and enforcing complementary loss constraints so that each partition captures mutually exclusive signal components. The encoder generates a unified spatio-temporal tensor containing mixed cues; the actor head splits this tensor into $f_{bb}$ (biometric) and $f_{ba}$ (appearance) via dual projection layers. Bias-less distillation constrains $f_{bb}$ to match teacher logits insensitive to clothing, while distortion loss constrains $f_{ba}$ to cluster same-garment instances even under identity-obscuring geometric warps. Simultaneously, triplet loss on $f_{bb}$ maximizes identity discrimination, whereas no identity supervision is applied to $f_{ba}$, preventing leakage of biometric content. Statistical orthogonality between sub-embeddings is encouraged by decorrelation regularizers that penalize cross-covariance between $f_{bb}$ and $f_{ba}$ across the batch. Evaluation metrics show negligible person-ID performance when matching solely on $f_{ba}$ and near-random garment prediction when matching on $f_{bb}$, confirming clean separation. The disentangled structure also enables interpretability: projecting gallery items into the $f_{ba}$ space reveals clusters matching wardrobe style, and projecting into $f_{bb}$ highlights gait similarity independent of outfit. Bias disentanglement therefore underpins robustness claims by ensuring that appearance variations in real deployments do not masquerade as identity cues.

Bias-Learning means the complementary training strategy in which the network explicitly models appearance factors by learning from pairs of original and distorted videos that share clothing and background while differing in biometric content. The distortion network, weight-shared with the main network, processes the warped video, producing distorted biometric and appearance embeddings. The contrastive distortion loss pulls the appearance embeddings together and pushes the biometric embeddings apart relative to their originals, thereby teaching the model to recognize and localize appearance information in a dedicated subspace. Unlike bias-suppression approaches that merely attempt to ignore appearance cues, bias-learning acknowledges their presence and trains the system to encode them separately, facilitating downstream disentanglement. Practical implementation involves an elastic-transform module parameterized by distortion magnitude a, tuned empirically to preserve garment textures yet obliterate shape cues; $\alpha=250$ yields optimal separation on multiple benchmarks. Mini-batch composition pairs each anchor clip with its distorted counterpart to guarantee positive-appearance and negative-biometric relationships. The appearance-focused branch receives no identity supervision, preventing contamination. Ablation removing bias-learning leads to measurable increases in false-accept rate when subjects wear identical uniforms, highlighting the technique's significance. The learned appearance embedding can optionally be exploited to detect clothing changes or forensically group individuals by attire, tasks orthogonal to identification.

Bias-Less Distillation means a cross-modal knowledge-transfer process in which a teacher network trained exclusively on binary silhouette video-devoid of color and fine texture-provides soft identity supervision to the RGB-based student network. The teacher's silhouette encoder produces logits yr that reflect identity decision boundaries immune to appearance bias. The student actor head outputs logits $y_S$ from RGB input; KL-divergence at temperature t forms the distillation loss term $L_{KD}=\tau^2$ $KL(y_T\|y_S)$. Minimizing this term forces the student's biometric embedding to internalize the teacher's appearance-invariant weighting of gait and body-shape cues, despite receiving full-color frames. The teacher's parameters are frozen, and only the student is updated, ensuring unidirectional knowledge flow. Optionally, intermediate feature maps from the teacher may be projected via a learned adapter and matched to student feature maps for deeper alignment. Experiments show that adding bias-less distillation consistently boosts cross-activity and cross-view rank-1 accuracy by 3-5 percentage points and reduces intra-class variance of $f_{bb}$ vectors across wardrobe changes. Because the teacher never observes garment color, its supervision implicitly penalizes student reliance on such cues. The process serves as a regularizer synergistic with bias-learning; when either is ablated, identification robustness declines, confirming complementary action.

Biometric means the intrinsic, identity-bearing physical or behavioral characteristics of an individual captured in video, primarily body shape, skeletal proportion, gait pattern, and multi-frame motion signatures, distinct from non-intrinsic attributes such as clothing or scene background. In the ABNet pipeline biometric properties manifest as invariant geometric and kinematic descriptors extracted by the encoder and refined into the $f_{bb}$ embedding. These descriptors remain stable across wardrobe changes, illumination shifts, and minor pose variations, enabling reliable discrimination of subjects in unconstrained environments where faces may be occluded. Biometric cues are learned through supervised identity classification, silhouette-guided distillation, and triplet-loss metric learning, culminating in an embedding space where Euclidean or cosine distance approximates true subject similarity. The confidentiality and protection of biometric information are considered in deployment: embeddings are L2-normalized and can be stored as anonymized vectors rather than raw imagery, reducing privacy risk. Biometric specificity is evaluated via genuine-impostor score distributions, and thresholds are set to achieve desired false-accept and false-reject rates. The claimed invention leverages biometrics to perform person identification during diverse daily activities, surpassing face-dependent systems in scenarios where facial visibility is low, by focusing on whole-body biometric cues.

Biometric Loss means the composite objective optimized to enhance identity discriminability of the biometric embedding. It comprises a categorical cross-entropy term over N training identities and a batch-hard triplet loss with margin m=0.3 that enforces relative distance constraints among anchor, positive, and negative samples within each mini-batch. Optionally, center loss or ArcFace angular-margin loss is added to tighten intra-class clusters. The biometric loss is combined with distillation, distortion, and activity losses under scalar weights to form the total training loss. Gradients from the biometric loss update encoder layers, projection heads, and transformer-decoder parameters, reinforcing feature filters that capture shape and periodic motion while penalizing reliance on clothing texture. Overfitting is mitigated through class-balanced sampling and label-smoothing. In the ablation table, removal of the triplet component markedly reduces mean average precision, indicating its critical role in fine-grained separation. The biometric-loss-driven embedding is further evaluated against unlabelled impostor data to characterize open-set performance and determine operating points for low false-accept rates.

Binary Silhouette Video means a sequence of frames in which each pixel is encoded as a single bit indicating foreground (subject) or background, produced by segmentation algorithms such as Mask2Former or Grounded-SAM applied to RGB video. The silhouette representation removes color, texture, and scene context, retaining only body outline and pose information, thus isolating biometric content. These videos serve as the exclusive input modality for the teacher network in bias-less distillation, ensuring that supervisory logits are free of appearance bias. Silhouette videos also enable efficient storage and accelerated inference in the teacher because binary images compress well and require fewer convolution channels. Quality of silhouette extraction influences distillation effectiveness; experiments comparing extractors show that higher-quality masks yield superior student performance, though the student remains robust to moderate silhouette noise. No silhouette video is required at runtime, simplifying deployment requirements.

Cross-Subject Evaluation means a testing protocol in which every individual appearing in the evaluation subset is absent from the training subset, thereby prohibiting identity overlap between the two partitions. Video clips from these unseen subjects are treated as probes or gallery items, and the model must match identities without having encountered them during optimization. Performance metrics (rank-1, rank-5, mAP, TAR@FAR) recorded under this protocol quantify generalization to novel identities rather than memorization of known actors. The split is deterministic: subject identifiers are pre-assigned to either training or testing per dataset documentation, ensuring reproducibility across experiments. Cross-subject evaluation exposes weaknesses in models that encode subject-specific appearance cues; such cues fail when clothing or context changes for new people. In the disclosed invention, ABNet is trained with bias-less distillation and bias-learning to emphasize gait and body morphology, allowing $f_{bb}$ embeddings to remain discriminative when tested on identities withheld during training. Tables 2 and 9 report separate cross-subject results to demonstrate the superiority of the claimed techniques over baselines that rely heavily on seen-subject statistics.

Cross-View Evaluation means a benchmark scenario in which camera viewpoints present during testing differ from those available in the training partition. For datasets with multiple calibrated cameras (e.g., NTU RGB-AB, PKU MMD-AB), one or more views are reserved exclusively for evaluation. The model must recognize subjects observed from azimuths, elevations, or optical axes not encountered during optimization, revealing its capacity for viewpoint invariance. Metrics are computed twice: "View+" when probe viewpoints are represented in the gallery and "View−" when they are not. Extensive drops between View+ and View−indicate over-reliance on view-specific cues. ABNet's transformer decoder captures long-range temporal dependencies that persist across projections, and silhouette-guided distillation further normalizes out pose-dependent appearances, producing smaller performance gaps across views than conventional CNN baselines. Cross-view evaluation is therefore the primary yardstick for camera-agnostic deployment readiness in multi-sensor surveillance environments.

Dataset means an organized collection of labeled video clips used for supervised training, validation, and evaluation of the disclosed system. Each dataset entry comprises: (i) an RGB video $v \in \mathbb{R}^{n \times C \times H \times W}$, (ii) a subject identity label $y_B$, and (iii) an activity label $y^A$. Certain datasets, such as NTU RGB-AB, add metadata for camera ID, viewpoint index, and setup identifier. During preprocessing, faces are blurred, resolution standardized to 256×128, and optional hue-shifting applied per frame. Datasets are partitioned into mutually exclusive training, gallery, and probe splits, adhering to cross-subject or cross-view criteria. Silhouette counterparts bs are generated via semantic-segmentation models for teacher-network ingestion. Distortion augmentation $\hat{v}$ is synthesized online from each RGB clip to support bias-learning. The disclosed evaluation uses five derived datasets (NTU RGB-AB, PKU MMD-AB, Charades-AB, ACC-MM1-Activities, BRIAR-BGC3), each differing in actor count, activity taxonomy, camera diversity, and recording environment, ensuring broad coverage of real-world operating conditions.

Distillation Loss means the Kullback-Leibler divergence—or equivalent probabilistic distance—between the identity-class probability distribution produced by the silhouette-based teacher network and the corresponding distribution produced by the RGB-based student network for the same temporal clip. A softmax temperature τ>1 smooths teacher logits to retain dark-knowledge similarities among non-maximal classes. The loss term L_KD=τ² KL(y_T∥y_S) is multiplied by scalar $\lambda_2$ before addition to the total objective. Gradients propagate only through the student; teacher parameters remain frozen. When feature-level distillation is used, an auxiliary $L_2$ penalty aligns intermediate embeddings after linear adaptation. The distillation loss guides the student's biometric subspace toward silhouette-derived decision boundaries that ignore clothing color and background, thereby suppressing appearance bias without discarding RGB input detail needed for other tasks.

Distortion of Video means the process of applying controlled, non-linear geometric transformations to an RGB video so as to perturb body-shape cues while preserving pixel-level color and texture associated with clothing and scene. An elastic-transform field—parameterized by distortion magnitude α—warps each frame independently yet ensures temporal coherence via shared random seeds across contiguous frames. The operation leaves garment chrominance unaltered, producing impostor-identity samples that retain identical appearance bias. Distorted clips $\hat{v}$ are paired with originals v in the mini-batch and processed by a weight-shared encoder branch, generating embeddings $$f\frac{D}{bb}$$

and $$f\frac{D}{ba}$$

that participate in bias-learning loss functions.

Distortion Loss means a contrastive objective that enforces similarity between appearance embeddings of original and distorted videos while enforcing dissimilarity between the corresponding biometric embeddings. Formally, L_Dis=max $$\left(0, D\left(f_{ba}, f\frac{D}{ba}\right) - D\left(f_{bb}, f\frac{D}{bb}\right) + m\right),$$

where D is Euclidean distance and m is a positive margin. The loss lowers when appearance-feature pairs converge and biometric-feature pairs diverge beyond m. Scalar $\lambda_3$ modulates its contribution in the overall loss. Hyper-parameter sweeps over $\alpha$ and m confirm $\alpha=250$ and $m=0.3$ yield optimal separation without corrupting appearance clustering. Distortion loss is disabled during inference.

Distortion Network means the auxiliary processing branch that ingests distorted video $\hat{i}$ using an encoder Ap sharing weights with the main encoder $S_\varphi$, followed downstream by its own actor-head projections producing $$f\frac{D}{bb}$$

and $$f\frac{D}{ba}$$

embeddings. No activity head is instantiated in this branch to avoid confounding motion semantics with identity perturbations. The distortion network participates only during training, supplying feature pairs required by distortion loss. At inference, it is disabled and imposes no computational burden. Weight sharing ensures gradients from distortion loss shape the same convolutional and transformer filters responsible for primary RGB inference.

Elastic Transform means a geometric-distortion operator that perturbs an image by sampling a smooth displacement field generated from two-dimensional Gaussian noise with standard deviation $\sigma$ and then warping pixel coordinates according to that field. In ABNet elastic transform is parameterized by distortion amount a, which scales displacement magnitude. Values $\alpha \in [200, 300]$ balance identity-destructive warping with appearance preservation; $\alpha=250$ is selected based on t-SNE visualization of feature separation. The transform is applied frame-wise using bicubic interpolation to avoid aliasing while maintaining high-frequency garment texture. The resulting distorted video $\hat{i}$ shares clothing color histograms with original v but exhibits altered limb lengths, torso proportions, and gait cadence, serving as hard negatives for bias-learning. Implementation leverages grid-sample operations for GPU efficiency and supports batch-level random seed synchronization to maintain temporal coherence of displacement across frames.

Encoder Network means the backbone module that transforms an input RGB or distorted video clip into a high-dimensional spatio-temporal tensor F_AB capturing motion and structural cues. Implemented as a ResNet3D-50 with inflation of 2D kernels to 3D, the encoder processes n=8 frames with temporal stride 4, yielding feature maps of reduced spatial resolution but enriched channel depth. Group-norm and GELU activations follow each convolution block to stabilize gradient flow across variable-duration clips. Positional encodings embedded along the temporal dimension preserve ordering. Encoder outputs feed both activity and actor heads, and identical weights are reused in the distortion branch. Gradients arising from biometric, activity, distillation, and distortion losses converge in the encoder, enforcing a feature hierarchy that simultaneously encodes gait periodicity, limb articulation, and fine-grained appearance cues segregated for bias disentanglement.

Gait Recognition means the subset of biometric-identification methodology that infers a person's identity based on periodic walking-pattern dynamics observable in video. In the disclosed system gait recognition is not an isolated subsystem but a natural emergent capability of the encoder-actor-head pathway trained on activities that include locomotion. When the subject is walking, the encoder's temporal filters capture stride frequency, joint angle trajectories, and center-of-mass translation, which the transformer decoder integrates across frames to form a stable biometric embedding. The silhouette-guided teacher supplies ground-truth logits reflecting pure gait cues devoid of clothing context, steering the student toward canonical gait representations that remain invariant across camera elevations and backgrounds. Distorted-video augmentation further emphasizes authenticity of gait by forcing embeddings derived from body-shape-warping warps to diverge in the biometric space. Evaluation on the BRIAR-BGC3 dataset, comprising structured and random walks, shows ABNet surpassing dedicated silhouette-only gait baselines, evidencing that gait recognition becomes a special case of the broader identity function when the model is properly regularized against appearance bias.

Hue Shifting means a color-space augmentation technique that rotates the hue channel of an RGB frame by a uniformly random offset while leaving saturation and value components unchanged. Implementation proceeds by converting each frame from RGB to HSV, adding an angle drawn from) U (0°, 360° to the hue component, modulo 360°, and then reconverting to RGB before tensor normalization. The augmentation is applied independently per frame during training with probability p=0.5, ensuring diverse color profiles even within a single video clip. Because clothing chroma often correlates spuriously with identity in uncontrolled footage, hue shifting decorrelates such cues from subject labels, compelling the network to focus on achromatic shape and motion. The procedure also simulates illumination-variation scenarios, enhancing robustness to camera white-balance drift. Ablative experiments that disable hue shifting reveal increased false-match rates for subjects wearing similar wardrobe colors, confirming that hue shifting effectively mitigates color-based appearance bias without perturbing temporal geometry critical to biometric extraction.

Identification Process means the operational sequence executed at inference in which a probe clip is converted to an identity decision. First, the encoder network ingests the RGB video and outputs a spatio-temporal tensor. Second, the actor head's transformer decoder derives two embeddings: $f_{bb}$ for biometrics and $f_{ba}$ for appearance. Third, the activity head produces activity vector $F_{Ac}$ if activity prior concatenation is enabled. Fourth, the biometric vector, or its concatenation with $F_{Ac}$ is l2-normalized to form a unit probe embedding $e_p$. Fifth, $e_p$ is compared via cosine similarity against a pre-computed gallery matrix $E_G$ whose rows are identity templates extracted in an identical manner from enrollment clips. Sixth, the top-k similarity scores are sorted; if an open-set threshold is defined, the highest score must exceed $\tau_{accept}$ to return an identity label; otherwise the system declares "unknown." Optionally, an appearance-mismatch filter discards gallery items whose $f_{ba}$ distance from the probe exceeds a garment-change threshold, improving resilience when attire differs radically. Timing benchmarks show the process requires <10 ms per clip on a modern GPU, dominated by encoder forward pass, enabling real-time surveillance deployment.

Joint Biometrics-Activity Learning means simultaneous optimization of identity and action objectives using a shared encoder whose gradients originate from both actor and activity heads. Mini-batches are assembled such that each contains multiple actors performing multiple actions, guaranteeing orthogonality of labels across the two tasks. The total loss aggregates biometric cross-entropy, triplet metric loss, activity cross-entropy, distillation KL divergence, and distortion contrastive loss under weights $\lambda_1 \ldots \lambda_3$. Backpropagation therefore updates early convolution kernels to extract features informative for both identity and action. The presence of the secondary activity objective regularizes the encoder against fixation on static texture, because motion descriptors useful for action must be preserved. When the activity head is ablatively detached, encoder filters drift toward frame-level appearance, and cross-activity identification accuracy falls; adding the head restores temporal attention maps, validating that joint learning enforces balanced representation of movement and structure.

Knowledge Distillation means supervised transfer of decision structure from a high-fidelity teacher network to a student network by minimizing a divergence metric between their output distributions. In ABNet the teacher operates on binary silhouettes, generating probability vector yr that highlights shape-correlated identity evidence. The student, processing full-color frames, generates probability vector $y_S$; temperature-scaled KL divergence guides it toward the teacher's bias-free distribution while retaining complementary cues present only in RGB. Distillation may also occur at intermediate layers: a linear adapter projects teacher feature maps into student dimensionality, and MSE loss aligns them. Hyper-parameter $\tau$ regulates soft-label sharpness, whereas $\lambda_2$ sets relative weight against biometric cross-entropy. Curriculum scheduling ramps $\lambda_2$ from zero to its final value over 20 epochs so early student layers learn coarse appearance-agnostic structure before fine distribution matching. Distillation convergence is monitored via Earth-Mover distance between silhouette-derived and RGB-derived embeddings, stabilizing when <0.05.

Negative Samples mean training exemplars labeled as different from a given anchor identity, used by metric losses to enforce inter-class margin in embedding space. In ABNet three negative sample types exist: (i) natural negatives, videos of other actors in the same batch; (ii) synthetic negatives, distorted clips of the anchor produced by elastic transform, which share appearance but not biometrics; (iii) hard negatives, selected online by ranking cosine similarity between anchor and batch embeddings and choosing those with highest accidental similarity. Triplet-loss formation pairs anchor a, positive p (another clip of same actor), and negative n, with loss max (0, D(a,p)−D(a,n)+m). Including synthetic negatives sharpens discrimination because they force the network to separate biometric cues from constant clothing, a scenario not addressed by natural negatives alone.

Object Morphology means geometric configuration and proportion of the human figure as projected onto video frames, encompassing limb length ratios, torso curvature, and silhouette contour. Morphology is central to biometric identity; however, it can be selectively distorted without affecting clothing appearance, enabling the creation of synthetic negatives. Elastic transform warps local pixel coordinates along smooth displacement fields, altering morphology while leaving color distribution intact. The encoder's early layers detect local edge orientation and curvature patterns associated with morphology; transformer attention integrates these into a holistic body-shape representation. Feature-space visualizations reveal distinct clusters along principal components corresponding to morphological attributes such as shoulder breadth-to-hip ratio and stride length-to-height ratio, demonstrating that morphology underlies embedding separability even when garment color overlaps.

RGB Video means a sequence of video frames in which each pixel is represented by red, green, and blue intensity components sampled by a camera sensor at standard frame rates. In the invention the RGB video constitutes the primary input modality for both training and inference, supplying rich chromatic and textural information alongside temporal motion. Pre-processing rescales frames to 256×128 pixels, applies Gaussian blur to faces, performs stochastic hue shifting, and normalizes channel means. The encoder consumes a short clip of n=8 frames with temporal stride 4, capturing roughly one second of action. RGB video contrasts with binary silhouette video, which is derived from it via segmentation; the former contains both biometric and appearance cues, whereas the latter provides appearance-free supervision. At inference the deployed model requires only RGB video, eliminating the need for external segmentation resources.

Silhouette Features mean the descriptors extracted by the teacher network from binary silhouette frames, capturing body outline dynamics without color or texture. The teacher employs a GaitGL backbone that produces a feature vector for each clip by integrating shape contours over a full gait or activity cycle. These vectors encode properties such as joint trajectory envelopes and silhouette energy maps. Their statistical distribution is used as a target for distillation because it is inherently invariant to clothing and illumination. Cosine similarity among silhouette features correlates strongly with human identity perception when appearance is hidden, providing a robust supervisory signal for learning appearance-agnostic biometric embeddings in the student.

Spatio-Temporal Features mean the multi-dimensional tensors output by the encoder that jointly encode spatial appearance and temporal motion across the n sampled frames. Each tensor cell corresponds to a receptive field region spanning height, width, and time. Early convolution layers emphasize local texture and edge motion; deeper layers capture abstract body-centric patterns. Positional encodings inject temporal ordering enabling the transformer decoder to attend across time indices. Pooling across spatial axes yields per-frame vectors aggregated downstream by self-attention into clip-level representations for the actor and activity heads. These spatio-temporal features form the shared backbone representation from which biometric and activity embeddings are projected.

Teacher Model means the pretrained identity-recognition network operating exclusively on binary silhouette input, trained on the same subject roster as the student but devoid of RGB color. Its architecture mirrors the student's encoder depth but replaces convolution kernel counts to accommodate single-channel input. Trained with cross-entropy and triplet losses on silhouette datasets, the teacher achieves appearance-invariant recognition accuracy exceeding 85% rank-1. During student training the teacher operates in evaluation mode to produce soft labels and intermediate feature maps consumed by the distillation loss. No gradients flow into the teacher; its weights remain fixed, enforcing a one-way knowledge-transfer regime.

Teacher Network means the specific set of convolution, normalization, and pooling layers, along with parameter tensors, that implement the teacher model. Layer index correspondence between teacher and student enables optional feature-level distillation; adapter layers align channel counts when necessary. The network accepts tensors of shape n×1×H×W, where H×W equals the student's spatial resolution. Implementation is provided in PyTorch; batch-normalization layers are frozen to maintain silhouette-specific statistics. Network forward pass latency averages 2 ms for n=8 frames on a single A100 GPU.

Trained Model means the final set of weights and architectural configuration obtained after optimizing the composite loss over the full training schedule. The trained model includes encoder, actor head, and activity head; the distortion branch and teacher are omitted. Inference code loads checkpoint files containing convolution kernels, transformer attention matrices, and projection-layer weight tensors. Validation metrics on held-out datasets are embedded in model metadata. The trained model operates at 90 fps per stream on an RTX 3080, supporting concurrent processing of multiple surveillance feeds.

Transformer Decoder means the sequence-modeling block inside the actor head composed of L stacked layers, each implementing multi-head self-attention followed by position-wise feed-forward networks with residual connections and layer normalization. Query, key, and value vectors derive from temporal tokens created by flattening spatial dimensions of encoder output and adding sine-cosine positional embeddings. Multi-head attention permits the decoder to integrate information across non-adjacent frames, aligning steps in a gait cycle or repeated gestures into a coherent identity pattern. Feed-forward sub-layers project attended tokens to higher-dimensional subspaces before residual addition. Layer depth L=4 and head count h=8 balance accuracy and runtime. The decoder's output token sequence is mean-pooled to generate a clip-level vector that feeds the biometric- and appearance-projection heads.

Weights mean the scalar parameters-convolution filter coefficients, fully-connected matrices, layer-normalization scale and shift terms, attention-projection matrices, and token embeddings—that define computation in the encoder, actor head, and activity head. During training these parameters are initialized using Kaiming normalization for convolutional layers and Xavier initialization for linear layers, then updated by Adam optimizer with base learning rate $3.5 \times 10^{-4}$, weight decay $5 \times 10^{-4}$, and cosine-annealing schedule. Gradient updates from biometric, activity, distillation, and distortion losses are accumulated per mini-batch; mixed-precision casting reduces memory footprint while maintaining numerical stability. After training weights are serialized into checkpoint files; at inference they are loaded as read-only tensors and remain fixed, guaranteeing deterministic service behavior.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A computer-implemented method for person identification using a language-guided disentanglement architecture, the method comprising:
   a. obtaining training data comprising video samples of persons performing various activities, each video sample being associated with a person identity label and an activity label;
   b. extracting visual features from frames of a video sample using an image encoder and providing the visual features to a query transformer module (Q-Former) that generates a set of query embeddings representing information in the video sample;
   c. processing the set of query embeddings with a vision-language model to produce an activity feature representation that captures semantic information about the activity depicted in the video sample, and concurrently to produce a biometric feature representation of the person that is distinct from the activity feature representation;
   d. optimizing parameters of the query transformer module and associated models by using the person identity label to supervise the biometric feature representation and using the activity label to supervise the activity feature representation, thereby disentangling identity-related features from activity-related features in the query embeddings; and
   e. after training, using the vision-language model in conjunction with the query transformer module to identify a person in an input video by extracting a biometric feature representation of the person that remains consistent regardless of the person's activity, and comparing the biometric feature representation to stored biometric references to recognize the person.

2. The method of claim 1, wherein the vision-language model is selected from the group consisting of a BLIP model, a CLIP model, a Flamingo model, and combinations thereof, to provide multi-modal processing of visual and textual information.

3. The method of claim 1, wherein producing the activity feature representation comprises generating, via the vision-language model, a natural-language description of the activity being performed in the video sample, and comparing the generated description to the ground-truth activity label or caption to compute an activity loss, such that the vision-language model is trained to accurately capture the semantics of the activity in textual form.

4. The method of claim 1, wherein the activity feature representation comprises a vector in a joint visual-text embedding space of the vision-language model, and the method further comprises obtaining a text embedding of the activity label from a text encoder of the vision-language model and applying a contrastive learning loss that maximizes the similarity between the activity feature representation and the text embedding of the correct activity label while minimizing similarity to text embeddings of other activities.

5. The method of claim 1, wherein the query transformer module comprises a plurality of learnable query vectors, and the method further comprises partitioning the query vectors into a first subset designated for extracting biometric attributes of the person and a second subset designated for extracting activity attributes from the visual features, such that during training the first subset of query vectors attends primarily to person-specific visual cues and the second subset of query vectors attends primarily to action-specific cues.

6. The method of claim 1, further comprising enforcing a disentanglement constraint between the biometric feature representation and the activity feature representation by penalizing predictive power or mutual information between them, wherein an auxiliary loss or adversarial training process is used to ensure that the biometric feature representation does not encode information sufficient to predict the activity label and that the activity feature representation does not encode identity-discriminative information, thereby achieving a separation of identity and activity features.

7. The method of claim 1, wherein supervising the biometric feature representation using the person identity label comprises applying a classification loss over a set of known person identities and/or a metric learning loss that encourages video samples of the same person to have closer biometric feature representations than samples of different persons, thus training the model to produce discriminative identity embeddings, and wherein supervising the activity feature representation using the activity label comprises applying an activity classification or captioning loss that guides the vision-language model to represent the correct activity.

8. The method of claim 1, wherein the vision-language model comprises an image encoder for processing the visual features and a language model for processing text, and the query transformer module is configured to interface between the image encoder and the language model by providing the set of query embeddings as input to the language model, such that the language model can interpret visual content of the video sample and produce the activity feature representation in a semantic latent space.

9. A system for person identification using a language-guided disentanglement architecture, the system comprising: one or more processors and a memory storing program instructions that, when executed by the one or more processors, configure the system to:
   a. receive an input video of a person engaged in an activity;
   b. extract visual features from the input video and generate, via a query transformer module, a set of query embeddings representing content of the video;
   c. process the set of query embeddings using a vision-language model to obtain an activity feature representation descriptive of the activity in the video and a biometric feature representation of the person that is invariant with respect to the activity; and
   d. identify the person by comparing the biometric feature representation to biometric representations of known individuals stored in a database, thereby recognizing the person regardless of the performed activity.

10. The system of claim 9, wherein the vision-language model comprises an image feature encoder and a language model, and the query transformer module is configured to mediate between the image feature encoder and the language model by inputting the set of query embeddings to the language model, such that the language model processes visual information from the input video in a textual semantic domain to derive the activity feature representation.

11. The system of claim 9, wherein the query transformer module includes a first set of query vectors configured to extract identity-related features and a second set of query vectors configured to extract activity-related features from the visual features, the system being configured to train the query transformer module such that the first set of query vectors produces the biometric feature representation of the person and the second set produces the activity feature representation, with minimal overlap between the information carried by the two representations.

12. The system of claim 9, further comprising a data storage storing biometric feature representations of a plurality of known persons, wherein identifying the person comprises comparing the biometric feature representation of the input video to the stored biometric feature representations and determining a matching identity based on similarity.

13. The system of claim 9, wherein the memory stores instructions that cause the system to apply a regularization during training such that the activity feature representation cannot be used to reliably predict the person's identity and the biometric feature representation cannot be used to predict the activity label, thereby enforcing disentanglement by ensuring that each representation exclusively encodes information for its respective task.

* * * * *